| United States Patent [19]
Scribner

[11] 3,873,566
[45] Mar. 25, 1975

[54] 3-PYRAZOLIDINONES AND PYRAZOLIDINES
[75] Inventor: Richard M. Scribner, Wilmington, Del.
[73] Assignee: E. I. du Pont de Nemours and Company, Wilmington, Del.
[22] Filed: Oct. 30, 1973
[21] Appl. No.: 411,033

Related U.S. Application Data
[63] Continuation-in-part of Ser. No. 336,766, Feb. 28, 1973, abandoned, which is a continuation-in-part of Ser. No. 251,866, May 10, 1972, abandoned, and a continuation-in-part of Ser. No. 333,521, Feb. 20, 1973, abandoned.

[52] U.S. Cl. ......... 260/310 A, 252/542, 260/310 R, 260/310 D, 424/273
[51] Int. Cl. ................... C07d 49/02, C07d 49/04
[58] Field of Search ......... 260/310 A, 310 R, 310 D

[56] References Cited
UNITED STATES PATENTS
3,708,492   1/1973   Zaffaroni ........................... 260/309

FOREIGN PATENTS OR APPLICATIONS
2,229,225   12/1972   Germany
2,323,193   11/1973   Germany
1,031,490   6/1966    United Kingdom ............. 260/310 R OTHER PUBLICATIONS
De Marle et al., Chem. Abst. Vol. 64, 196Z6 (1966).
Dorn et al., Chem. Abst. Vol. 69, 59153 (1968).
Dorn et al., Chem. Abst. Vol. 69, 52445t (1968).
Dorn et al., Chem. Abst. Vol. 69, 43845w (1968).

*Primary Examiner*—Albert T. Meyers
*Assistant Examiner*—Donald B. Moyer

[57] ABSTRACT

3-Pyrazolidinones and pyrazolidines are disclosed which have substituted on one nuclear nitrogen an aliphatic carboxylic group consisting of alkanoate, alkenoate, alkynoate, or methylenephenylenealkanoate, and on the other nitrogen a hydroxy-substituted aliphatic hydrocarbyl or fluorohydrocarbyl group. The compounds are prepared by selective alkylation procedures with hydrocarbyl or halohydrocarbyl groups containing these functions. The new products are surfactants. They also have pharmaceutical activity either like the natural prostaglandins or as antagonists to the natural prostaglandins. Some of the compounds, like the prostaglandins, lower blood pressure, cause bronchodilation, inhibit gastric secretion, inhibit epinephrine induced lipolysis, or stimulate smooth muscles. Others inhibit the prostaglandin induced stimulation of smooth muscle.

74 Claims, No Drawings

3-PYRAZOLIDINONES AND PYRAZOLIDINES

CROSS-REFERENCE TO RELATED APPLICATIONS

This application is a continuation-in-part of (a) my copending patent application Ser. No. 336,766, filed Feb. 28, 1973, which is a continuation-in-part of application Ser. No. 251,866, filed May 10, 1972 (both now abandoned) and (b) my copending patent application Ser. No. 333,521, filed Feb. 20, 1973 (now abandoned).

BACKGROUND OF THE INVENTION

1. Field of the Invention

This invention relates to pyrazolidinones and pyrazolidines having on nuclear nitrogen different aliphatic substituents which generally have oxygen present in each. The compounds are obtained by selective alkylation of the nitrogen atoms of pyrazole or 3-pyrazolidinone. They resemble prostaglandins and their derivatives. The natural prostaglandins of the E, F, and A series have several centers of asymmetry and are difficult to synthesize. The compounds of the present invention, however, have fewer centers of asymmetry in that they have two trivalent nitrogen atoms in the ring rather than two asymmetric carbon atoms and therefore fewer isomers are obtained.

2. Description of the Prior Art

It is known [Dorn & Zubeck, Z, Chem. 6, 218 (1968)] that 2-methyl-5-pyrazolidinone can be prepared by first forming the 1-benzoyl derivative, alkylating with methyl sulfate and removing the benzoyl group by acid hydrolysis. Recently Dorn and Dilcher [Journal fur prakt. Chemie, 313, 229-335 (1971)] reacted benzyl chloroformate with 3-pyrazolidinone hydrochloride to give 1-benzyloxycarbonyl-3-pyrazolidinone. The latter was reacted with formaldehyde and morpholine to give 2-morpholinomethyl-1-benzyloxycarbonyl-3-pyrazolidinone. However, the latter when subjected to hydrogenation (with platinum oxide catalyst) lost the morpholinomethyl group but not the benzyloxycarboxyl group. No reference has been found to a prostaglandin-like structure with nitrogen as a hetero atom in the ring.

DESCRIPTION OF THE INVENTION

The invention is a compound having the formula

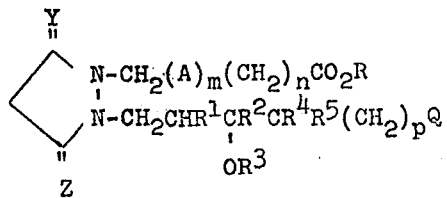

wherein
A is CH=CH, C ≡ C, or $C_6H_4$;
R is H, alkali metal, amine salt, and alkyl and cycloalkyl each of up to 12 carbons;
$m$ is 0 or 1;
$n$ is 0 to 6;
$p$ is 0 to 6;
Y and Z are 0 or $H_2$, with the proviso that where one is 0, the other is $H_2$;
$R^1$ is H $CH_3$ or $C_2H_5$;
$R^2$ is H, $CH_3$, $C_2H_5$, CH=$CH_2$ or C ≡ CH;
$R^3$ is H or alkanoyl of 2 to 4 carbon atoms;
$R^4$ is H, F, $CH_3$ or $C_2H_5$;
$R^5$ is H, F, $CH_3$ or $C_2H_5$; and
Q is H, $CH_3$, $CF_2CH_3$ or $CF_3$;
with the proviso that $R^1$, $R^4$ and $R^5$ are H when $R_2$ is other than H.

Pharmaceutically acceptable acid addition salts of the compounds are also included within the scope of the invention.

Preferred compounds are those where p is 3 to 5. Within this group are those where Q is $CH_3$, $R^1$, $R^3$, $R^4$ and $R^5$ are each H, $R^2$ is H or $CH_3$, $m = 0$ and $n$ is 4 to 6. Also within the group of preferred compounds are those above, except that $m = 1$, A is $C_6H_4$ and $n = 0$-4.

The new compounds wherein Y = 0 and Z = $H_2$ are obtained by reacting (a) a 3-pyrazolidinone having on the 1position a blocking group that is removable under mild conditions such as by hydrogenation, with an omega-halocarboxylate, i.e., an omega-haloalkanoic acid ester, an omega-halo-alkynoic acid ester, or an o-mega-halo(methylenephenylene)alkanoic ester, wherein the halogen preferably is bromine or iodine, (b) removing the blocking group, and (c) alkylating the 1-position with a vinyl ketone or with an acetylenic ketone followed by reduction. By choice of reactants or further conversions, the products of this invention are obtained.

The compounds wherein Z = 0 and Y = $H_2$ are obtained by reacting (a) a vinyl ketone,

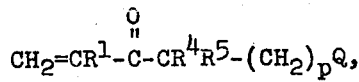

or an acetylenic ketone

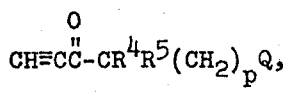

with a 3-pyrazolidinone having on the 1-position a blocking group that is removable under mild conditions such as by hydrogenation, (b) removing the blocking group, and (c) reacting the pyrazolidinone with an omega-halocarboxylate as above.

The compounds wherein both Y and Z are $H_2$ are obtained by reacting pyrazole with the above stated omega-halocarboxylates or unsaturated ketones. No blocking group is needed since only one nitrogen atom of pyrazole is alkylated under the conditions employed. For example, pyrazole is reacted with an omega-halocarboxylate in the presence of a strong base to give an N-alkylated pyrazole. Reduction of the ring double bonds yields an N-alkylated pyrazolidine which is then reacted with an unsaturated ketone to alkylate the second nitrogen atom in the ring. The order of reaction may be reversed in that the pyrazole may be reacted first with the unsaturated ketone to give the N-alkylated pyrazole which is then reacted with an omega-halocarboxylate to give the N,N'-dialkylpyrazolium salt, which is reduced to give an N,N'-dialkylpyrazolidine.

The novel compounds of this invention have been named with the pyrazolidine ring as the important feature, but a compound of Example 1, for instance, can be named as a prostanoic acid derivative, e.g., d,1-15-hydroxy-9-keto-8,12-diazaprostanoic acid, or as a prostaglandin, 15(R,S)-tetrahydro-8,12-diaza prostaglandin $A_1$.

SPECIFIC EMBODIMENTS OF THE INVENTION

In the following illustrative examples all parts and percentages are by weight unless otherwise stated.

EXAMPLE 1

7[3'-Oxo-1'(3''-hydroxy-n-octyl)pyrazolidin-2'-yl]-heptanoates; Y=O, Z = $H_2$, $m$=0, $n$=5, R=$t$Bu; H; Na; $R^1$=$R^2$=$R^3$=$R^4$=$R^5$=H, Q=H, p=4 (a) 1-Benzyloxycarbonyl-3-pyrazolidinone (1)

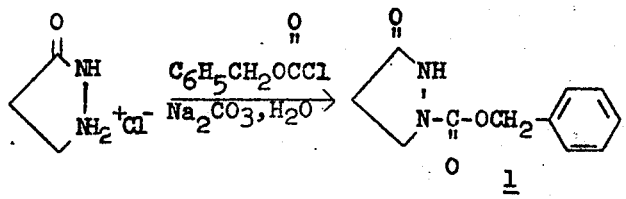

A solution of 106 g (1 mole) of sodium carbonate in 1 l. of water is cooled in an ice bath and stirred with a paddle stirrer while 124 g (1 mole) of 3-pyrazolidinone hydrochloride is added in portions. To the resulting solution is added dropwise over a period of 2-3 hrs with continued cooling and vigorous stirring 174 g (1.02 mole of benzylchloroformate. The mixture is stirred without cooling for 2 hours, by which time it is neutral. The solid is collected by filtration and is transferred to a 2 l. Erlenmeyer flask with 300 ml of water. Then 800 ml of 5 percent NaOH solution is added to the slurry over about 10 min. The mixture is stirred for 0.5 hr, by which time most of the solid dissolves leaving some insoluble oil. The aqueous mixture is filtered to remove the insoluble oil. The clear filtrate is then cooled in an ice bath while with vigorous stirring 100 cc of concentrated hydrochloric acid is added dropwise. The white solid is collected by filtration, washed with water, and dried at 75° under a high vacuum for 24 hrs. This gives 141 g (64 percent) of 1-benzyloxycarbonyl-3-pyrazolidinone (3-oxopyrazolidine-1-carboxylic acid benzyl ester) (1) m.p. 98°-98.5°.

Anal. Calcd. for $C_{11}H_{12}N_2O_3$: C, 59.99; H, 5,49; N, 12.72; Found: C, 60.35; H, 5.64; N 12.83; $\lambda_{max}$ ($CHCl_3$): 2.94, 3.15, 3.28, 3.32, 5.85, 6.31, 6.67, 14.45; pmr $CDCl_3$, TMS): 441 (5, phenyl), 312 (2, s, benzylic), 240 (2, t, J = 8.5, $Ch_2N$), (2, t, J = 8.5, $CH_2CO$) Hz at 60 MHz.

(b) 1-Benzyloxycarbonyl-2(6'-tert-butoxycarbonyl-hexyl)-3-pyrazolidinone (2)

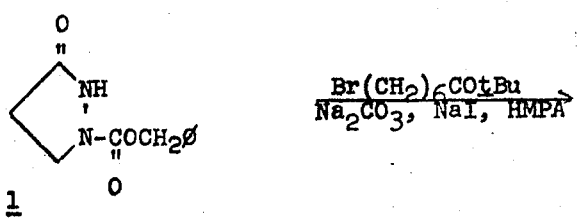

A mixture of 53 g (0.2 mole) of tert-butyl 7-bromoheptanoate 48 g (0.21 mole) of 1-benzyloxycarbonyl-3-pyrazolidinone, 50 g of sodium carbonate, and 2 g of sodium iodide in 200 ml of dry hexamethylphosphoric triamide (HMPA) is stirred at room temperature under nitrogen for 6-7 days. The mixture is poured into 1 l. of water, extracted with ether, and the ether washed three times with water, once with a little 5 percent NaOH, and then dried over $Na_2SO_4$ and evaporated, giving 80.6 g (100 percent) of crude product as an oil. The crude product (1-benzyloxycarbonyl-2(6'-tert-butoxycarbonylhexyl)-3-pyrazolidinone) is used directly in the subsequent hydrogenolysis step.

The corresponding ethyl ester similarly prepared from ethyl 7-bromoheptanoate, is characterized as follows. Evaporative distillation gives a colorless oil at 175°-180°.0.028 mm (84 percent). Anal. Calcd. for $C_{20}H_{28}N_2O_5$: C, 63.81; H, 7.50; N, 7.44; Found C, 63.78; H, 7.42; N, 7.61; HR mass spec. calcd 376.1998, observed 376.2031; $\lambda_{max}$ ($CHCl_3$): 3.31, 3.47, 5.8–5.9, 6.12 (weak), 6.29, 6.67$\mu$.

(c) 2(6'-tert-Butoxycarbonyl)hexyl-3-pyrazolidinone (3)

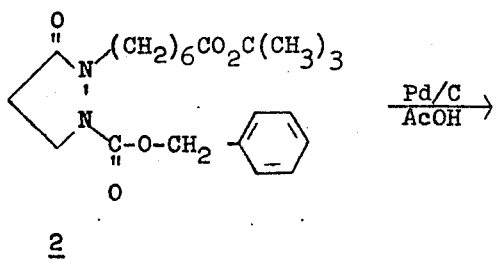

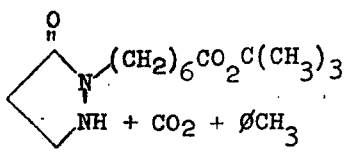

(3)
The tert-butyl ester is preferred to the ethyl ester because the latter tends to form some polymeric amide or lactam during high-temperature distillation.

A 500 cc hydrogenation bottle is loaded with 40 g (0.1 mole) or crude 1-benzyloxycarbonyl-2(6'-tert-butoxycarbonyl)hexyl-3-pyrazolidinone, 100 ml of ethanol, 8.0 ml of glacial acetic acid, and 3.0 g of 5 percent palladium on charcoal catalyst. The mixture is hydrogenated on a Parr shaker apparatus for 1.75–2.0 hrs; the total pressure drop in the bottle (isolated from the parr tank) is 45–55 psi. The bottle is vented cautiously and the contents are filtered through a M porosity funnel and concentrated in vacuo to about 75 ml (temp. less than 40°). The residual liquid is poured into a separatory funnel containing 13.0 ml of concd. HCl, 75 ml or $H_2O$, and 250 g of ice and extracted quickly with 150 ml and then 50 ml of ether. The ether is discarded. The aqueous layer is quickly transferred to a 1 liter beaker in an ice bath, 200 ml of fresh ether is added, and 25 g of $Na_2CO_3$ is added in a few portions with stirring. The cold alkaline solution is stirred for 5 min. after addition is completed and then transferred to a separatory funnel. The ether layer is separated and set aside. The aqueous layer is extracted again with two 100 -ml portions of fresh ether and the combined ether layers are dried over anhydrous $Na_2CO_3$. The ether is evaporated in vacuo (temp. less than 35°) to give 19 g of yellow oil, crude 2(6'-tert-butoxycarbonyl)hexyl-3-pyrazolidinone.

The crude ester is distilled from about 0.5 g of MgO in a Kugelrohr (bulb to bulb) evaporative distillation apparatus at about 150°–160°/.004 mm giving a colorless liquid which is stored under nitrogen. The yield of pure ester is about 13 g (48 percent) for the two steps, based on tert butyl 7-bromoheptanoate.

Anal. Calcd. for $C_{14}H_{26}N_2O_3$: C, 62.19; H, 9.69; N, 10.36. Found: C, 62.40; H, 9.38; N, 10.49. Liquid chromatography (ethanol-water) indicates this material to be 99.53 percent pure. Mass spectroscopy confirms the assigned molecular composition with m/e of $M^+$ at 270; major fragment ions m/e 214 (M-56), m/e 196 (M-56-$H_2O$), m/e 57 ($t$-$Bu^+$). $\lambda_{max}^{CHCl}$ 3: 2.95 (NH), 5.81, 5.95 (CO'S), 8.05, 8.68 $\mu$. With p-chlorophenylisothiocyanate the amine reacts to give a solid phenylthiourea derivative in 96 percent yield; two crystallizations from ethanol gives white plates, mp 114°–120°.

Anal. Calcd. for $C_{21}H_{30}ClN_3O_3S$: C, 57.1; H, 6.88; N, 9.55; Cl, 8.06; Found C, 57.14H, 6.84, N, 9.42, Cl, 8.39.

(d)
7[3'-oxo-1'(3''-oxo-n-oct-1''-enyl)pyrazolidin-2-yl]-heptanoic acid t-butyl ester, trans(4)

1-Octyn-3-one can be prepared by addition of acetylene to hexanal in the presence of potassium hydroxide powder and glyme [method of H. A. Stansbury, Jr., and W. R. Proops, J. Org. Chem., 27, 279 (1962)] to give amyl ethynyl carbinol, b.p. 80°/13 mm, which is then oxidized with Jones' reagent to give the 1-octyn-3-one, b.p. 66°/15 mm [see K. Bowden et al., J. Chem. Soc. 39, (1946)].

A solution of 2.704 g (10 mmoles) of amine 3 and 1.242 g (10 mmoles) of 1-octyn-3-one in about 75 ml of dried ethanol [R. H. Manske, J. Am. Chem. Soc. 53, 1106 (1931)] is heated at reflux temperature under a nitrogen atmosphere for 1.5 hrs. The mixture is cooled, diluted to 100 ml in a volumetric flask, and a 1.0 ml aliquot removed for ultraviolet absorption analysis ($\lambda_{max}^{EtOH}$ 322 nm; 16,500; when ordinary "absolute" ethanol is used $\epsilon$ is about 12,000).

Evaporation of the ethanolic solution under reduced pressure gives a dark red-amber oil. Its 220 and 60 MHz pmr spectra ($CDCl_3$, TMS) are consistent with nearly pure vinylogous hydrazide and show two doublet vinyl protons at 7.54 and 5.37 ppm (J = 13 Hz); high resol. mass spec. $M^+$m/e calcd. 394.2831, observed 394.2870; $\lambda_{max}$ ($CHCl_3$): 3.40, 3.49, 5.82, 5.92, 6.15 and 6.33 s (vinylogous amide), 10.35 (trans double bond) $\mu$.

Catalytic reduction of the enamino ketone can be carried out without isolating it.

(e)
7[3'-Oxo-1'(3''-oxo-n-octyl)pyrazolidin-2'-yl]-heptanoic acid t-butyl ester (5) and
7[3'-Oxo-1'(3''-hydroxyoctyl)pyrazolidin-2'-yl]heptanoic acid t-butyl ester (6)

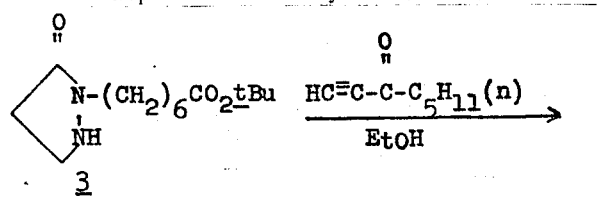

(e) (1) A solution of 2.70 g (10 millimoles) of the amine 3 and 1.24 g (10 mmoles) of 1-octyn-3-one in 75 ml of dry ethanol is heated at reflux temperature under a nitrogen atmosphere for 1.75 hrs and then cooled and transferred with 25 ml of dry ethanol into a hydrogenation bottle with 1.0 g of 5 percent platinum or carbon. Reduction in a Parr shaker with hydrogen is complete in about 25 min. After 2 -yl]under hydrogen the ethanolic solution of 7[3'-oxo-1'-(3''-oxo-n-octyl)pyrazolidin-2'-yl]heptanoic acid t-butyl ester (5) is filtered through M porosity sintered glass and the light yellow filtrate cooled in ice and treated all at once with 1.5 g of NaBH$_4$. The ethanolic solution is stirred for 0.5 hr with cooling and then for 1 hr with no cooling. It is then concentrated to about 30 cc in vacuo, poured into 200 cc of H$_2$O, and extracted with ether. The ether is washed with water, dried, over Na$_2$SO$_4$, and evaporated, giving a yellow oil which according to thin layer chromatology (TLC) (2:1 benzene-acetone on silica gel) is about 60 percent of the hydroxyoctylpyrazolidinone of formula (6) ($R_f = 0.38$).

The pyrazolidinone alcohol was characterized as follows using a sample from another, larger scale reaction but having same IR spectrum and Rf value. Chromatography of 5 g of crude amine alcohol on 150 g of basic III alumina and elution with hexane-benzene, benzene, and 1:1 ether-benzene gave in the latter eluate 2.41 g of 90 percent pure amino alcohol. One fraction which according to TLC was close to 100 percent pure was submitted for analysis: HRMS m/e of M$^+$ calcd. for C$_{22}$H$_{42}$N$_2$O$_4$ : 398.3144; observed 398.3146; $\lambda_{max}$ (CHCl$_3$) 3350 (intramolecular hydrogen bonded OH), 2380

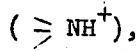

1720 (ester CO), 1675 (amide CO) cm$^{-1}$.

(e) (2) Alternative Procedure — A solution of 10.8 g of the amine 3 in 50 ml of dried ethanol with 6.0 g of 1-octyn-3-one is heated at reflux for 2 hrs., cooled to room temp., and diluted to 100 ml. The dark red solution is hydrogenated in a Parr shaker over 3.0 g of 5 percent rhodium on carbon at room temperature and at about 40 psi for 3 hrs. Catalyst is removed by filtration through sintered glass and to the yellow filtrate is added with stirring 3.5 g of sodium borohydride. After 3 hrs., the reaction mixture is concentrated in vacuo to about 25 cc, poured into 200 cc of water, and extracted three times with ether. The ether is washed three times with water, which is discarded. The ether is then washed twice with a total of 200 cc of ice-water containing 16 cc of concentrated hydrochloric acid, the aqueous extraction layer being run directly into excess solid sodium carbonate covered with ether. Evaporation of the ether containing the acid extracted material gave 2.07 g of the starting amine 3. The original ether layer remaining after the extraction with the 200 cc of aqueous acid is again extracted quickly three times with a total of 16 cc of concentrated hydrochloric acid in 200 cc of ice water and then with saturated sodium carbonate solution. Evaporation of the ether gave 9.6 g of crude amino alcohol 6 essentially free of amine 3.

The amino alcohol is much less readily extracted from the ether phase perhaps because the basic character of the amine nitrogen is reduced by intramolecular hydrogen bonding with the hydroxyl group, i.e.

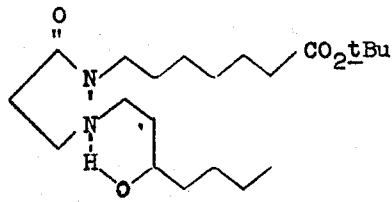

Chemical removal of the starting amine 3 is important because it is separated only with difficulty from the amino alcohol 6 by column chromatography. Starting amine 3 may originate from a reverse Mannich reaction during the catalytic hydrogenation step (5 → 3) or from hydrogenolysis of amino alcohol 6 by excess sodium borohydride in the ketone reduction step.

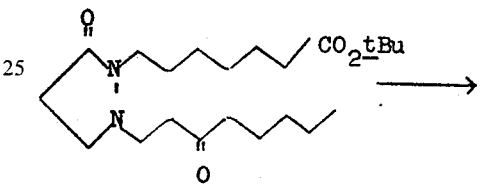

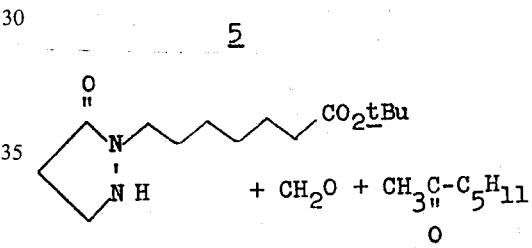

The 7.5 g of amino alcohol 6 can be further purified by chromatography on 230 g of basic, activity-grade IV alumina by elution with benzene, ether, and ethyl acetate. The latter solvent gave 3.4 g or pure amino alcohol 6 as a thick oil; HRMS calcd. m/e of M$^+$ for C$_{22}$H$_{42}$N$_2$O$_4$ : 398.3142; observed 398.3138; with virtually no 270 ion (amine); TLC (silica gel, 2:1 acetone, benzene, iodine visualization and sulfuric acid-charring visualization) showed the presence of only one component.

(e) (3) Alternate route to 4 and 6

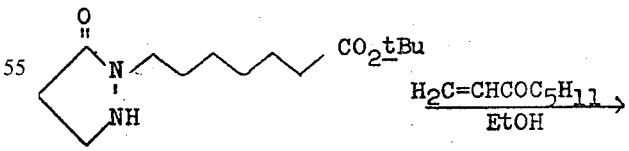

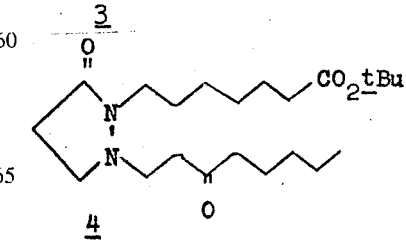

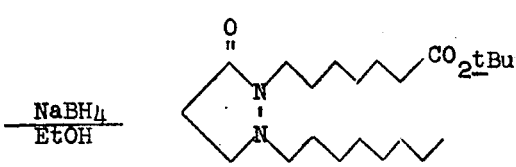

Amyl vinyl carbinol (b.p. 47°/15 mm) can be prepared by reaction of amylmagnesium bromide with acrolein. The carbinol can be oxidized to amyl vinyl ketone conveniently by the aqueous chromic acid/ether oxidation method of H. C. Brown (J. Org. Chem. 36, 387 (1971); a 25 percent excess of oxidant is employed and the reaction is carried out at 5°–10°. The ketone is fractionally distilled through a spinning band column and boils at 64°/16 mm. A polymerization inhibitor, e.g. p-methoxyhydroquinone, 0.2 percent by wt., is added to the distillate to prevent polymerization during storage.

A solution of 10.8 g (40 mmoles) of amine 3 and 6.56 g (52 mmoles) of amyl vinyl ketone in 50 ml of dried ethanol is stirred at room temperature for 4.25 hrs., by which time thin layer chromatography on silica gel (2:1 acetone-benzene; iodine visualization) indicates the presence of ketone 4 as a spot at $R_f$ 0.63 and less than 1 percent of the starting amine 3. To the well-stirred reaction mixture is added 2.0 g or sodium borohydride; after 2.75 hrs an additional 1.0 g of sodium borohydride is added. After a total reaction time of 3 hrs, the mixture is poured into a separatory funnel containing 200 g of ice water and some ether. After mixing, the ether layer is drained off and the aqueous layer extracted once with fresh ether. The combined ether layers are washed with water three times, dried over sodium sulfate, and evaporated to give about 18 g of a yellow oil, which according to thin layer chromatography is essentially pure amino alcohol 6 mixed only with a little amyl vinyl carbinol. A solution of the amino alcohol in hexane is applied to a chromatography column containing 500 g of basic activity grade IV alumina and eluted with benzene, ether, and ethyl acetate, in that order. Evaporation of the ethyl acetate gives 8.7 g of pure amino alcohol 6 (55 percent yield based on amine 3).

(f)
7[3'-oxo-1'(3''-hydroxy-n-octyl)pyrazolidin-2'-yl]heptanoic acid hydrochloride (7)

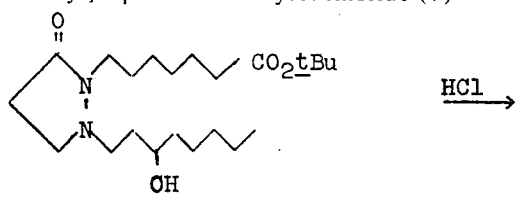

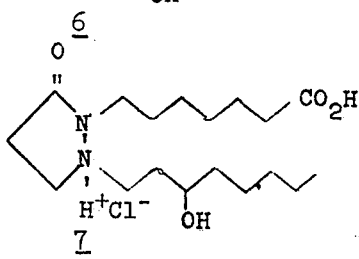

About 3.5 g of the amino alcohol 6 is dissolved in 25 ml of chloroform and gaseous hydrogen chloride is bubbled into the solution for 5 min. The mixture is allowed to stand at room temperature for 1 hr, and then a drop of water is added. An oil phase appears immediately. The mixture is stirred for 1 hour and then the chloroform is evaporated, giving 4.0 of the hydrochloride 7 as a tan glass, estimated to be about 90 percent pure.

This tan glass can be purified by being warmed on a steam bath with 35 ml of 2N hydrochloric acid until the temperature reaches 70°, and then diluting the mixture with 100 ml of distilled water, cooling, and extracting with ether twice. The clear, colorless aqueous layer is evaporated to dryness, giving 2.74 g of the above named hydrochloride (7) as a colorless glass. Silylation with N-trimethylsilylimidazole in pyridine gives the bis-trimethylsilyl derivative (of the free amine). Analysis by high resolution mass spectroscopy: m/e M+calcd. for $C_{24}H_{50}N_2O_4Si_2$ 486.3306; found 486.3319.

(g)
7[3'-Oxo-1'-(3''-hydroxy-n-octyl)pyrazolidin-2'-yl]heptanoic acid sodium salt (8)

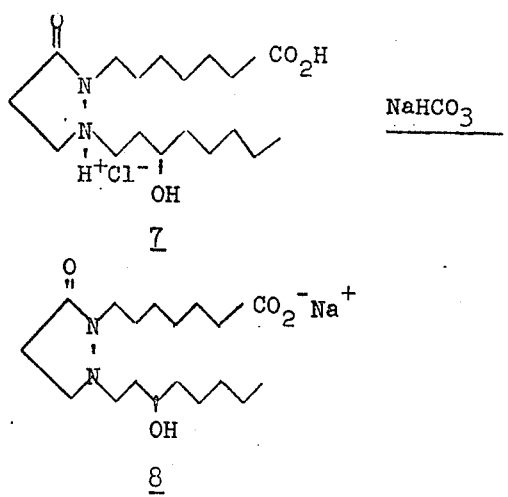

A solution of 1.56 g of pure acid hydrochloride 7 is dissolved in 29.6 ml of 5 percent aqueous sodium bicarbonate with gentle warming. The solution is cooled and filtered to remove a slight trace of flocculent material. The clear filtrate thus contains about 5 percent by weight of the above-named sodium salt (8) in a sodium bicarbonate buffered aqueous solution.

Acidification of the sodium salt with 1 equivalent of hydrochloric acid gives the carboxylic acid; use of 2 equivalents of acid gives the carboxylic acid amine salt as described before. The sodium salt, the carboxylic acid, and the carboxylic acid amine salts are substantially equivalent pharmacologically.

In Example 1 when the tert-butyl 7-bromoheptanoate of part 1(b) is substituted by a molar equivalent of the omega-halo ester of column A of Table I the product obtained is the ester shown in column B. Substitution of the ester of column B for an equivalent amount of 1-benzyloxycarbonyl-2(6'-tert-butoxycarbonyl)hexyl 3-pyrazolidinone (2) in Example 1(c) gives the product shown in column C. Reaction of the product of column C with an alkyl vinyl ketone of column D as in Example 1(e)(3) gives the ketoalkylpyrazolidinone of column E;

reduction of the latter with sodium borohydride as in Example 1(e)(3) gives the amino alcohol of column F. Treatment of the amino alcohol of column F with HCl gives the corresponding carboxylic acid hydrochloride salt and treatment of the salt of column F with NaHCO₃ as in Example 1(g) gives the salt of column G.

TABLE I

| Col. A (Omega-halo ester) | Col. B (Disubstituted Pyrazolidinone) |
|---|---|
| a) $ICH_2C \equiv C(CH_2)_3CO_2CH_3$ 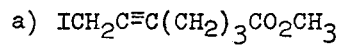 | a) 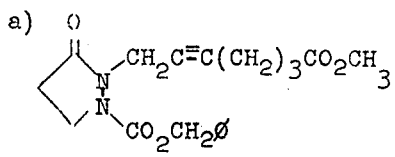 |
| b) " | b) " |
| c) " | c) " |
| d) $BrCH_2C \equiv CCH_2CO_2C_3H_7(n)$ 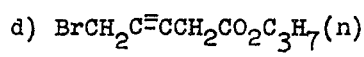 | d) 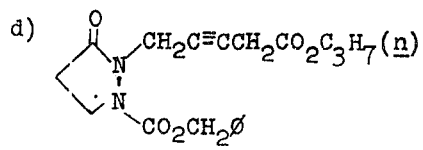 |
| e) " | e) " |
| f) " | f) " |
| g) $BrCH_2CH=CH(CH_2)_3CO_2C_2H_5$ 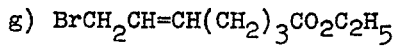 | g) 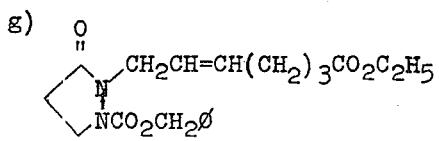 |
| h) " | h) " |
| i) " | i) " |
| j) $ICH_2CO_2C_{12}H_{25}(n)$ 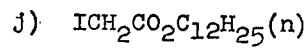 | j) 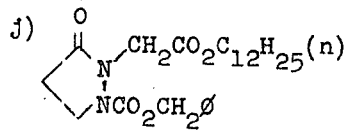 |
| k) " | k) " |
| l) $BrCH_2CH_2CO_2C_{10}H_{21}(n)$ 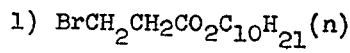 | l) 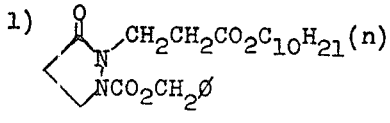 |
| m) " | m) " |
| n) $BrCH_2\text{-}\langle\text{-}\rangle\text{-}(CH_2)_4CO_2CH(CH_3)_2$ 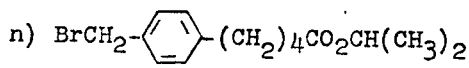 | n) 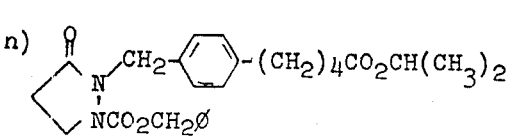 |
| o) " | o) " |

TABLE I (continued)
Col. A
p) 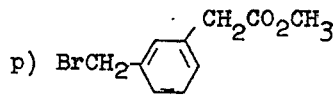
q) "
r) 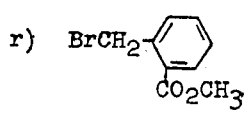
s) "
Col. B.
p) 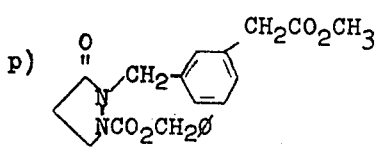
q) "
r) 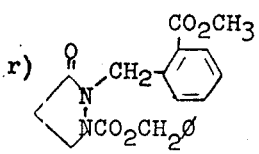
s) "
Col. C (Mono-substituted Pyrazolidinone)
a) 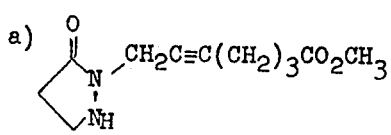
b) "
c) "
d) 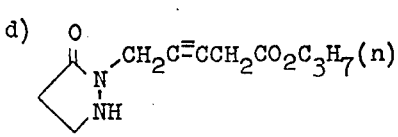
e) "
f) "
g) 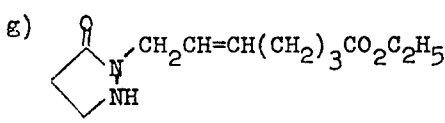
h) "
i) "
j) 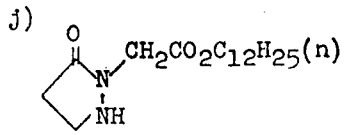
k) "
Col. D (Unsaturated Ketone)
a) $CH_2=CHCO(CH_2)_7CH_3$
b) $CH_2=CHCO(CH_2)_4CH_3$
c) $CH_2=CHCOCF_2CH_2CH_3$
d) $CH_2=CHCO(CH_2)_3CF_2CH_3$
e) $CH_2=CHCO(CH_2)_4CF_3$
f) $CH_2=\underset{\underset{C_2H_5}{|}}{C}-CO(CH_2)_6CH_3$
g) $CH_2=CHCO(CH_2)_4CF_3$
h) $CH_2=CHCO(CH_2)_6CH_3$
i) $CH_2=CHCOCF_2(CH_2)_4CH_3$
j) $CH_2=CHCOCHFCH_2CF_2CH_3$
k) $CH_2=CHCOCF_2CH_2CH_3$ TABLE I (continued)
| Col. C | Col. D |
|---|---|
| l) 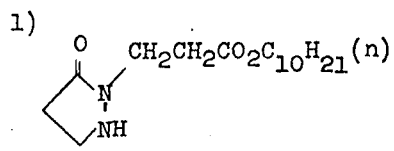 | l) 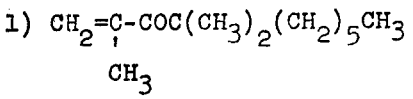 CH$_2$=C-COC(CH$_3$)$_2$(CH$_2$)$_5$CH$_3$ / CH$_3$ |
| m) " | m) CH$_2$=CHCOC(C$_2$H$_5$)$_2$CH$_2$CH$_3$ |
| n) 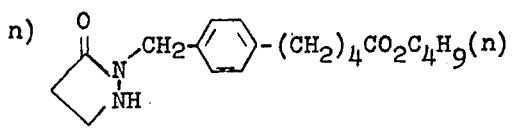 | n) CH$_2$=CHCOCH$_3$ |
| o) " | o) CH$_2$=CHCO(CH$_2$)$_4$CF$_3$ / CH$_3$ |
| p) 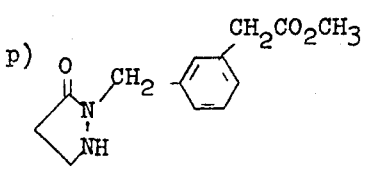 | p) CH$_2$=CHCO(CH$_2$)$_2$CF$_3$ |
| q) " | q) CH$_2$=CHCOCF$_2$C$_2$H$_5$ |
| r) 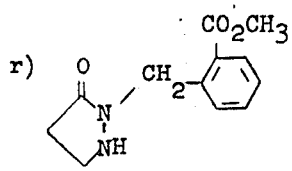 | r) CH$_2$=C-COCHF(CH$_2$)$_3$CF$_3$ / C$_2$H$_5$ |
| s) " | s) CH$_2$=CHCO(CH$_2$)$_4$CH$_3$ |
| Col. E (Keto alkylpyrazolidinone) | Col. F (Amino alcohol) |
|---|---|
| a) 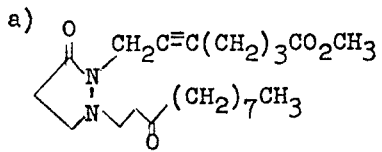 | a) 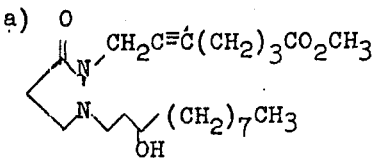 |
| b) 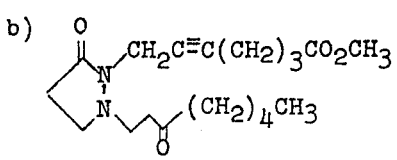 | b) 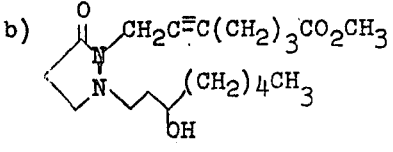 |
| c) 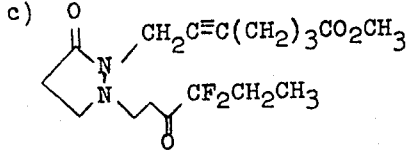 | c) 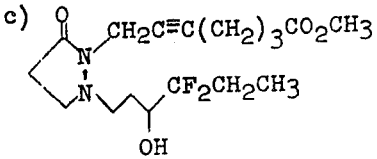 |

TABLE I (continued)
Col. E | Col. F
--- | ---
d) 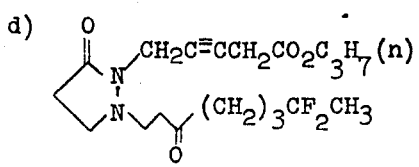 | d) 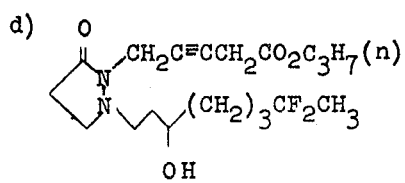
e) 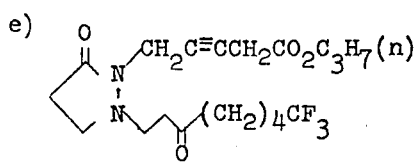 | e) 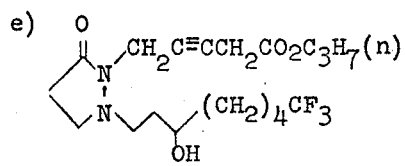
f) 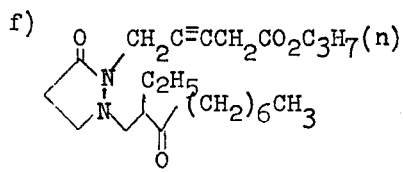 | f) 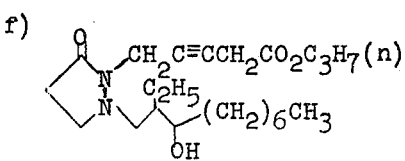
g) 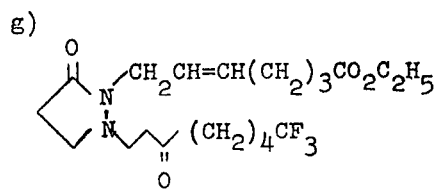 | g) 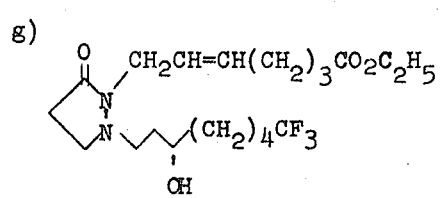
h) 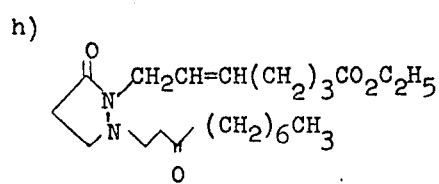 | h) 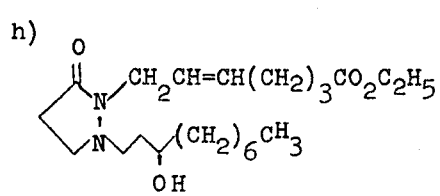
i) 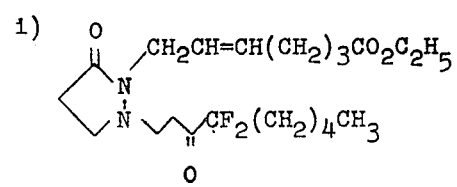 | i) 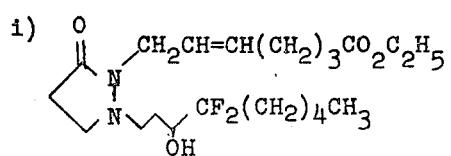
j) 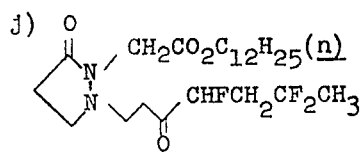 | j) 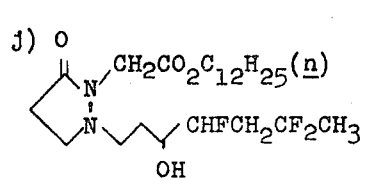
k) 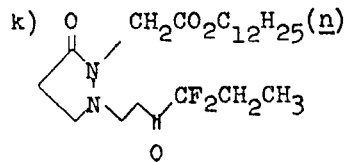 | k) 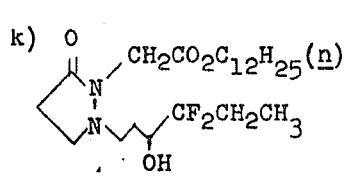

TABLE I (continued)
Col. E
1) 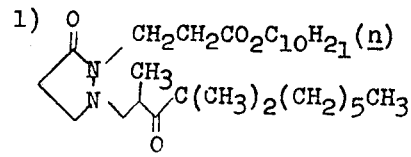
m) 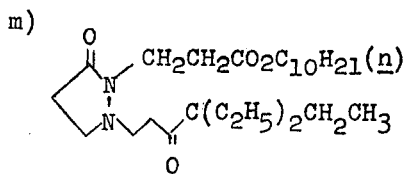
n) 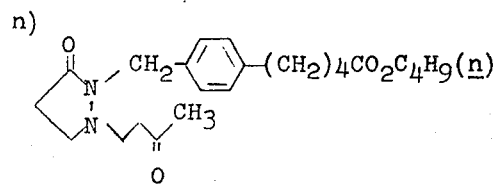
o) 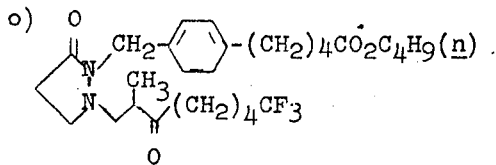
p) 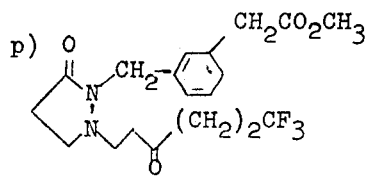
q) 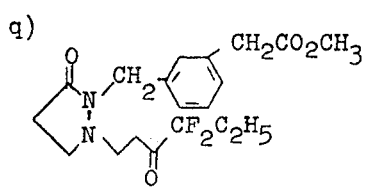
r) 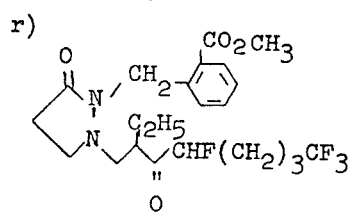
s) 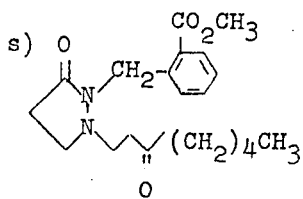
Col. F
1) 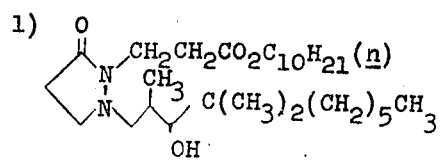
m) 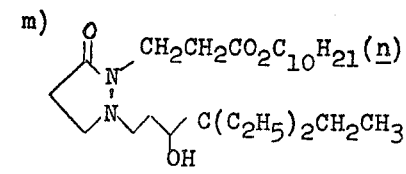
n) 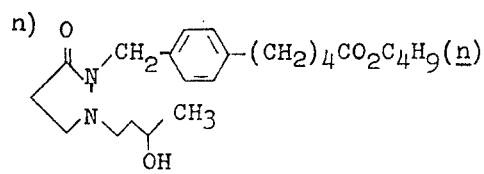
o) 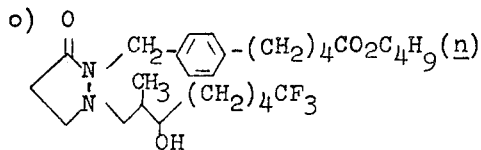
p) 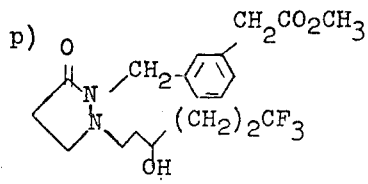
q) 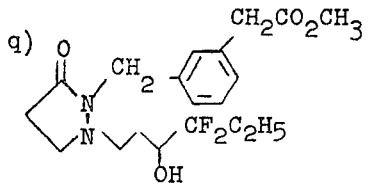
r) 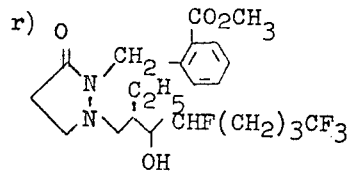
s) 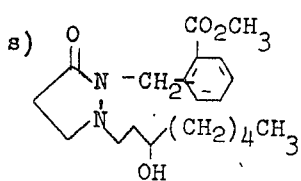

TABLE I
Col. G
a) 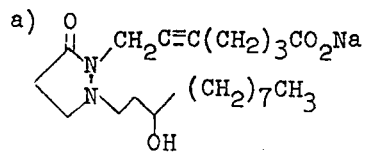
b) 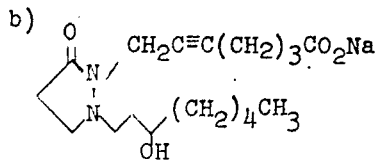
c) 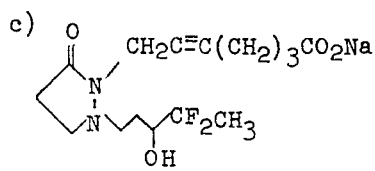
d) 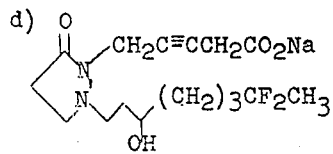
e) 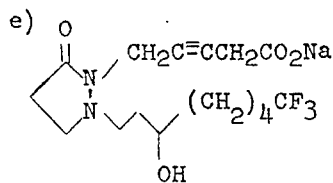
f) 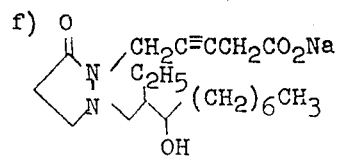
g) 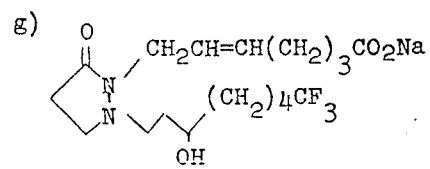
h) 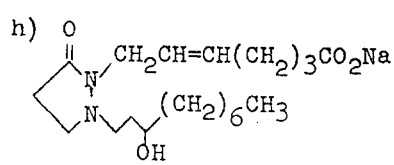
i) 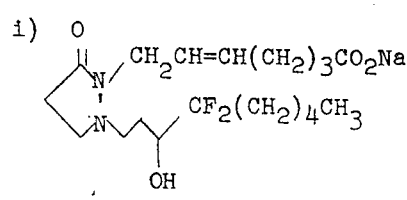
Col. G — Continued
j) 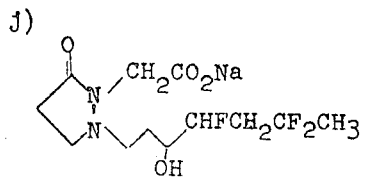
k) 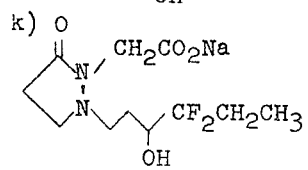
l) 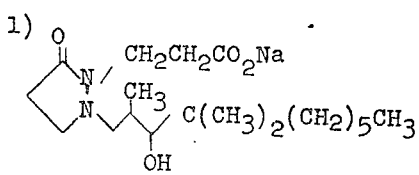
m) 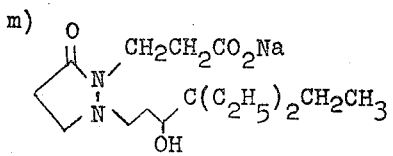
n) 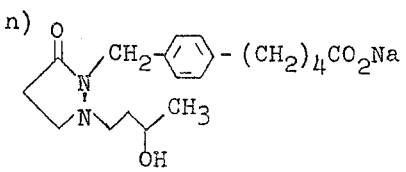
o) 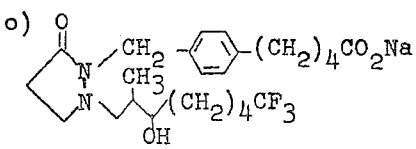
p) 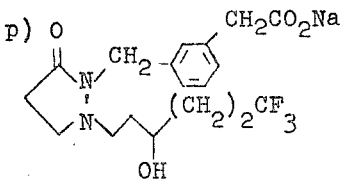
q) 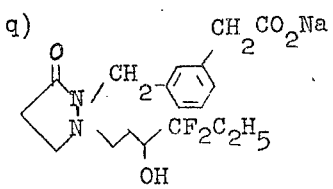
r) 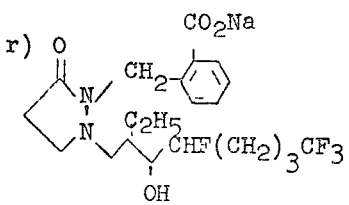

TABLE I (continued)
Col. G

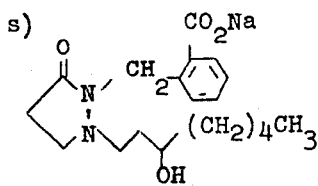

s)

EXAMPLE 2

7[3'-Oxo-1'-(3''-hydroxy-n-decyl)pyrazolidin-2'-yl]heptanoic acid t-butyl ester, Acid, and Sodium salt (9 a,b,c) Y=O, Z=H$_2$, m=O, n=5, R=tBu; H; Na; R$^1$=R$^2$=R$^3$=R$^4$=R$^5$=Q=H, p=6

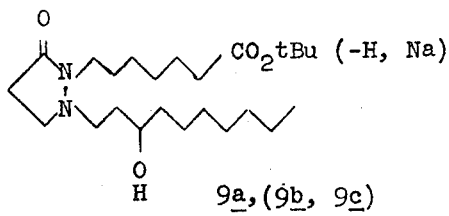

9a, (9b, 9c)

Following the procedure of Example 1, heptyl vinyl carbinol (b.p. 94°/5 mm) can be prepared by reaction of 1-bromoheptane with acrolein. Oxidation of the carbinol with Jones' reagent gives heptyl vinyl ketone (b.p. 90°-92°/10 mm). Treatment of 5.4 g of amine 3 with 3.5 g of heptyl vinyl ketone in 75 ml of ethanol at room temperature for 18 hrs gives 7[3'-oxo-1'-(3''-oxo-n-decyl)pyrazolidin-2'-yl]heptanoic acid t-butyl ester. Reduction of this ketone with sodium borohydride in ethanol, followed by chromatography on 450 g of basic IV alumina gives on elution with ether 7[3'-oxo-1'-(3''-hydroxy-n-decyl)pyrozolidin-2'-yl]heptanoic acid t-butyl ester (9a). Treatment of this ester with excess hydrogen chloride in moist chloroform gives the corresponding acid 7[3'-oxo-1'-(3''-hydroxy-n-decyl)pyrazolidin-2'-yl)]heptanoic acid (9b) which is converted to its sodium salt (9c) by treatment with one or more equivalents of sodium hydroxide or sodium acid phosphate. HRMS m/e calcd. for silylated HCl salt of the carboxylic acid C$_{26}$H$_{54}$N$_2$O$_4$Si$_2$ 514.3619; found: 514.3651.

EXAMPLE 3

(A)

1-Benzyloxycarbomyl-2(3'-oxo-n-octyl)-3-pyrazolidinone (10),
1-benzyloxycarbonyl-2(3'-hydroxy-n-octyl)3-pyrazolidinone (11), and
2-(3'-hydroxy-n-oxtyl)-3-pyrazolidinone (12)

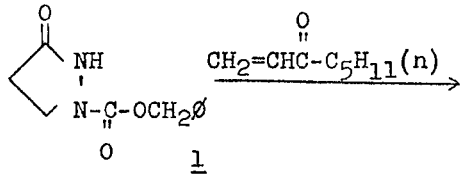

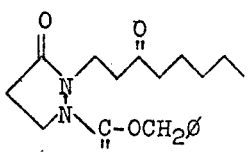

10

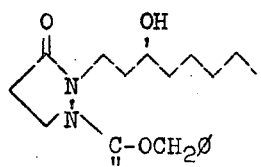

11

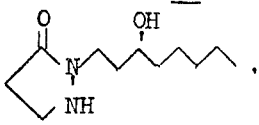

12

3ol-Octen-3ol is oxidized to amyl vinyl ketone (AVK) by Jones' CrO$_3$ reagent in acetone. It boils at 64°/16 mm and is stored with a trace of p-methoxyphenol to prevent polymerization.

To a suspension of 22 g (0.1 mole) of benzyloxycarbonyl-3-pyrazolidinone in 75 ml of anhydrous ethanol at 45° is added 13.0 g (15.6 ml, 0.103 mole) of amyl vinyl ketone and then 0.20 ml of 40 percent tetramethyl ammonium hydroxide (Triton-B) in methanol. The reaction mixture is heated at reflux temperature for 1 hr, cooled, and 2 drops of glacial acetic acid are added. This ethanolic solution contains nearly pure 10. An aliquot which, after isolation of product by successive treatment with water, ether, and 5 percent NaHCO$_3$, shows by TLC a single component (silica gel, 2:1 acetone-benzene development, R$_f$ = 0.63 by iodine visualization); $\lambda_{max}$ (neat) 1720 broad, 1500 cm$^{-1}$; pmr (CDCl$_3$) 447 Hz (singlet, phenyl) 316 (singlet, area 2, OCH$_2\phi$) etc. at 60 MHz; HRMS m/e calcd. for C$_{19}$H$_{26}$N$_2$O$_4$:346.1889; measured 346.19333. The remainder of the ethanolic solution of 10 is in an ice bath and stirred while 1.6 g of sodium borohydride is added. The reaction mixture is stirred with cooling for 0.5 hr then with no cooling for 1 hr and poured into 300 ml of ice water. This aqueous mixture is extracted twice with two 150 ml portions of ethyl acetate, which in turn is washed with 5 percent NaHCO$_3$, dried over sodium sulfate, and evaporated to give 33 g (96 percent) of nearly pure 11; R$_f$ = approx. 0.58, TLC under the same conditions described above for 10; $\lambda_{max}$ (neat)3400 cm$^{-1}$ (OH); pmr agrees with expected; HRMS m/e calcd. for C$_{19}$H$_{28}$N$_2$O$_4$:348.2047, found 348.2076, with no 346 ion. A solution of 32 g of this oil in 75 ml of ethanol with 10 ml of glacial acetic acid is then hydrogenated in a Parr shaker over 3.0 g of 5 percent Pd on carbon. After the rapid hydrogen uptake ceases, the ethanolic solution is filtered and the filtrate concentrated to about 40 ml under reduced pressure (temp. less than 40°). The residual liquid is poured into 150 ml of ice water containing 10 ml of concentrated HCl and extracted twice with ether, which is discarded. The cold aqueous phase is then topped with about 100 ml of ethyl acetate and basified, with stirring, by adding Na₂CO₃ to pH 9. The ethyl acetate is drawn off, and the aqueous phase is extracted twice again with a total of 250 ml of ethyl acetate. The combined ethyl acetate solutions are dried over Na₂SO₄ and evaporated in vacuo to give 13.6 g (69 percent) of nearly pure 12 as a slightly air-sensitive, light yellow oil. This oil is insoluble in ether. Pure 12 is isolated by a bulb to bulb distillation giving 12 g of a thick, colorless or very light yellow oil at 130°–140°/0.017 mm.

Anal. Calcd. for $C_{11}H_{22}N_2O_2$: C, 61.65; H, 13.07; N, 13.07
Found: C, 66.69; H, 10.13; N, 13.29

HRMS calcd. 214.1863, measured 214.1703; $\lambda_{max}$ (CHCl₃) 2.95, 3.09, 3.39, 3.49, 5.96 (C=O), 9.25 (CHOH) μ; $R_f$ = 0.20 on silica gel, 2:1 acetone-benzene, iodine visualization.

A solution of 12 in isopropanol reacts with p-chlorophenyl isothiocyanate to give a p-chlorophenylthiourea derivative, m.p. 104°–197°. This derivative is identical (by mixed m.p. and IR) with the p-chlorophenylthioureide of 4 obtained by the alternate synthesis described in Part (B) below.

(B) 1(β, β, β-Trichloroethoxycarbonyl)2-(3'-oxo-n-octyl)-3 pyrazolidinone (14), 1(β,β,β-Trichloroethoxycarbonyl)-2-(3-hydroxy-n-octyl)-3-pyrazolidinone (15), and an alternate route to (12)

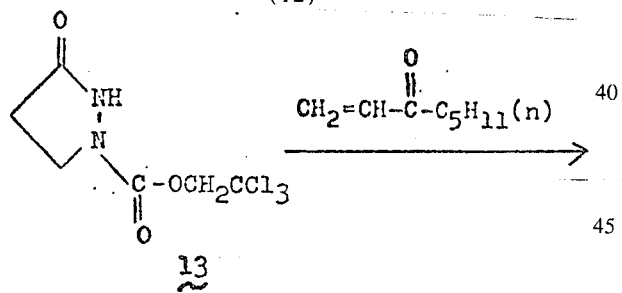

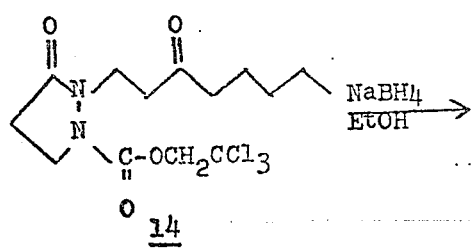

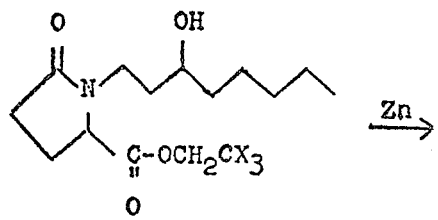

X = Cl (15) or H (16)

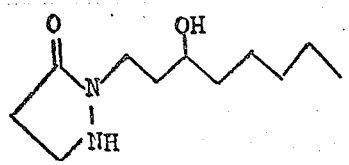

12

A solution of 26.2 g (0.1 mole) of 1(β,β,β-trichloroethoxycarbonyl)-3-pyrazolidinone (13) in 75 ml of ethanol is treated with 15.6 ml of amyl vinyl ketone and tetramethyl ammonium hydroxide and heated to reflux. After 1 hr at reflux, the reaction mixture is treated with 0.15 ml of glacial acetic acid, giving a solution of nearly pure 1(β,β,β-trichloroethoxycarbonyl)-2-(3-oxo-n-octyl)-3-pyrazolidinone (14); TLC of an aliquot on silica gel, 1:1 acetone-benzene, $R_f$ = 0.67 with visualization by H₂SO₄ charring. The alcoholic solution of 14 is cooled and kept at 15°–20° while 3.0 g of sodium borohydride is added. After 1 hr the reaction mixture is poured into 500 ml of ice water and extracted with ether. The ether is washed with water and 5 percent HCl, dried over sodium sulfate, and evaporated, giving 22.5 g of oil, a mixture of 15 and 16; TLC $R_f$ = 0.47 and 0.54 under the conditions described for the TLC of 14; HRMS: calcd. for $C_{14}H_{23}N_2O_4Cl_3$ 388.0724, measured 388.0725; calcd. for $C_{14}H_{26}N_2O_4$ 286, found 286 (more intense). Treatment of 3.9 g of 15 and 16 with 4.0 g of zinc dust in 20 ml of 90 percent acetic acid for 2 hrs at 25° gives 0.54 g (25 percent) of 12 as an oil, isolated by means of its water-soluble hydrochloride and identified as its derivative with p-chlorophenylisothiocyanate, m.p. 106°–110° (isopropanol).

Anal. Calcd. for $C_{18}H_{26}N_3SO_2Cl$: C, 56.2; H, 7.96; N, 10.94.
Found: C, 56.15; H, 7.18; N, 11.10.

1-(β,β,β-Trichloroethyloxycarbonyl)-3-pyrazolidinone is prepared as described earlier.

(C) 7[3'-Oxo-2'(3''-hydroxy-n-octyl)pyrazolidin-1'-yl]heptanoic acid ethyl ester (17) and its hydrochloride (17a) Y=H₂ Z=O, m=O, n=5, R=Et, R¹=R₂=R₃=R⁴=R⁵=H, Q=CH₃ p=3. ethyl

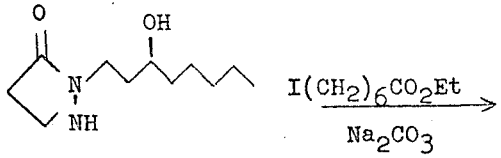

12

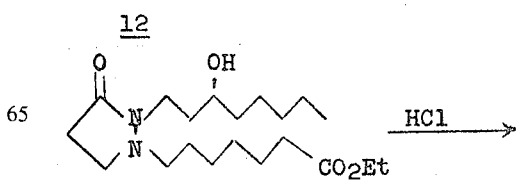

17

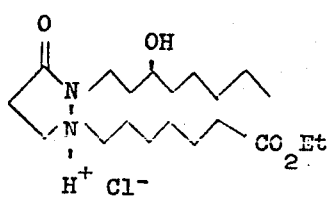

17a

A mixture of 8.56 g (40 mmoles) of pyrazolidinone 12, 12.5 g ethyl 7-iodoheptanoate (44 mmoles) and 10 g of anhydrous sodium carbonate in 75 ml of tetramethylenesulfone is stirred at room temperature in a stoppered flask for 7 days and then heated at 80°–85° for 1.5 hours. The reaction mixture is cooled, poured into 500 ml of 5 percent NaHCO$_3$ solution and extracted twice with ether. The ether is washed with water three times and then dried thoroughly over anhydrous sodium sulfate. The dry ether solution (300 ml) is filtered into a separatory funnel and excess dry gaseous HCl bubbled in, giving an insoluble heavy oil, the hydrochloride of 7[3'-oxo-2'-(3''-hydroxy-n-octyl)pyrazolidin-1'-yl]heptanoic acid ethyl ester (17a). After 5 min. the supernatant ether layer is removed by decantation and centrifuged to remove a small amount of hydrochloride which is added back to the separatory funnel with the major portion of the hydrochloride. The hydrochloride is washed with fresh ether and the ether removed by decantation and centrifuged as before. To the hydrochloride in the separatory funnel is than added excess saturated NaHCO$_3$ solution and about 250 ml of fresh ether. After agitation, the ether layer is drawn off, washed with 5 percent NaHCO$_3$, dried over anhydrous sodium sulfate, and evaporated giving 8.37 g (57 percent yield) of nearly pure 17; TLC (silica gel, 2:1 acetone-benzene, iodine visualization (R$_f$ = 0.59; for another sample prepared on a smaller scale $\lambda_{max}$ (neat) 3400 (OH) 1725 (CO$_2$Et), 1675 (CON) cm$^{-1}$; HRMS. Calcd. for C$_{20}$H$_{38}$N$_2$O$_4$:370.2829, measured 370.2824.

An alternate procedure for 17 is as follows: A mixture of 8.6 g (40 mmoles), of pyrazolidinone 12, 13 g of ethyl 7-iodoheptanoate (46 mmoles), 10 g of sodium bicarbonate, and 75 ml of tetramethylenesulfone is heated with stirring at 60°±1° for 48 hours. The reaction mixture is cooled, poured in 500 ml of 5 percent NaHCO$_3$ solution and extracted twice with ether. The ether is washed with water three times, dried over anhydrous sodium sulfate and filtered into a separatory funnel. Excess dry HCl is bubbled in, giving an insoluble heavy oil, the hydrochloride (17a) of ester 17. After 15 min. the supernatant ether layer is withdrawn with a syringe and the oil partitioned between 200 ml of ether and excess saturated NaHCO$_3$ solution. The ether is dried over Na$_2$SO$_4$ and evaporated, giving 7.37 g of ester 17, $\lambda_{max}$ 2.95, 3.40, 3.49, 5.78, 5.9, 6.0$\mu$.

EXAMPLE 4

7[3'-Oxo-2'(3''-hydroxy-n-octyl)pyrazolidin-1'-yl]heptanoic acid sodium salt (18) Y=H$_2$, Z=O, m=O, n=5, R=Na, R$^1$=R$^2$=R$^3$=R$^4$=R$^5$=H, Q=CH$_3$, p=3

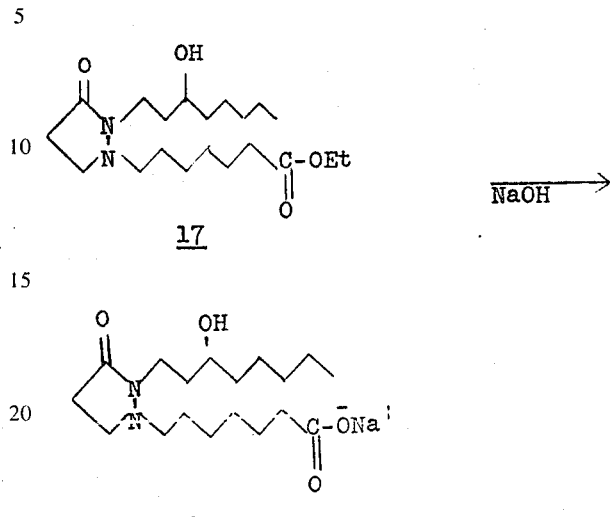

A solution of 4.69 (12.6 mmoles) of ester 17 with 14.0 ml of 1.0N aqueous sodium hydroxide in 75 ml of ethanol is stirred at room temperature under nitrogen for 4 days and then evaporated to dryness in vacuo. The residue is taken up in 82 ml of 0.1M Na$_2$HPO$_4$ and the pH adjusted to about 8 with a few drops of 2N HCl, giving a solution of the sodium salt 18 suitable for biological use.

When the amyl vinyl ketone in Example 3(A) or 3(B) is substituted by an equivalent amount of the alkyl vinyl ketone of Col. A of Table II (and after reduction with NaBH$_4$ and with hydrogen over palladium), there is obtained the mono-substituted pyrazolidinone of Col. B.

When the compound of Col. B of Table II is reacted with an equivalent amount of the omega-halo ester of Col. C [according to the procedure of Example 3(C)], or with the halomethylphenylenealkanoic esters of Col. C [according to Examples 12-17], the pyrazolidinyl ester of Col. D is obtained. Oxidation of an ester of Col. D with chromic acid in acetone, or preferably with CrO$_3$-pyridine complex in methylene chloride [J. Org. Chem. 35, 4000 (1970)], gives the corresponding ketone. The use of some of these ketones is described in Tables III and IV — see items (f)-(i) and (n)-(q). Treatment of the ester of Col. D with gaseous HCl gives the corresponding hydrochloride. If an equivalent amount of an ester of Col. D is substituted for 7[3'-oxo-2'(3''-hydroxy-n-octyl)-pyrazolidin-1'-yl]heptanoic acid ethyl ester in Example 4 and an equivalent amount of aqueous tetramethylammonium hydroxide is substituted for the aqueous sodium hydroxide, the amine salt of Col. E is obtained. Or, if an ester of Col. D is saponified with an equivalent of aqueous KOH, the potassium salt of Col. F is obtained.

TABLE II
| Col. A (Alkyl Vinyl Ketone) | Col. B (Mono-substituted Pyrazolidinone) |
|---|---|
| a) $CH_2=CHCO(CH_2)_7CH_3$ 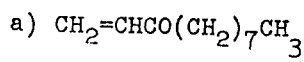 | a) 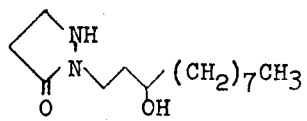 |
| b) $CH_2=CHCO(CH_2)_4CH_3$ 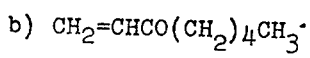 | b) 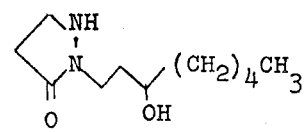 |
| c) $CH_2=CHCOCF_2CH_2CH_3$ 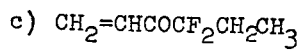 | c) 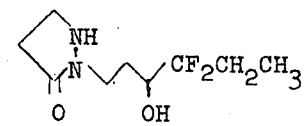 |
| d) $CH_2=CHCO(CH_2)_3CF_2CH_3$ 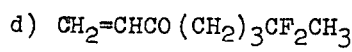 | d) 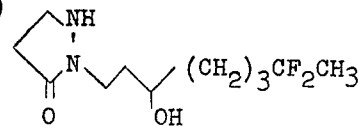 |
| e) $CH_2=CHCO(CH_2)_4CF_3$ 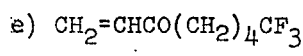 | e) 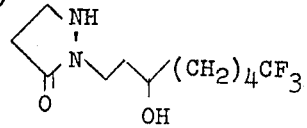 |
| f) $CH_2=C-CO(CH_2)_6CH_3$<br>$\quad\;\;\; C_2H_5$ 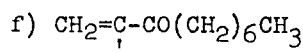 | f) 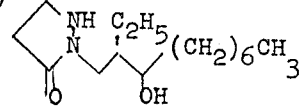 |
| g) $CH_2=CHCO(CH_2)_4CF_3$ 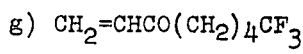 | g) 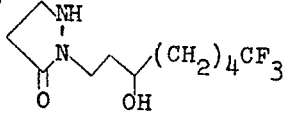 |
| h) $CH_2=CHCO(CH_2)_6CH_3$ 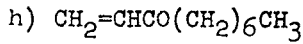 | h) 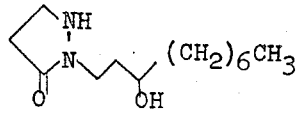 |
| i) $CH_2=CHCOCF_2(CH_2)_4CH_3$ 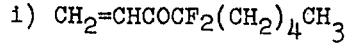 | i) 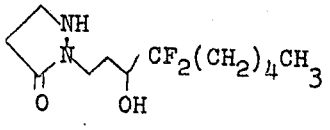 |

TABLE II (continued)
| Col. A | Col. B |
|---|---|
| j) $CH_2=CHCOCHFCH_2CF_2CH_3$ | j) 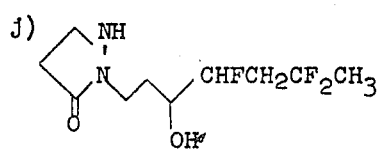 |
| k) $CH_2=CHCOCF_2CH_2CH_3$ | k) 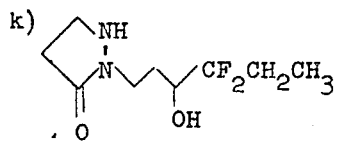 |
| l) $CH_2=\underset{CH_3}{C}-COC(CH_3)_2(CH_2)_5CH_3$ | l) 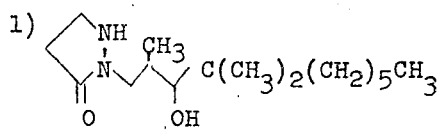 |
| m) $CH_2=CHCOC(C_2H_5)_2CH_2CH_3$ | m) 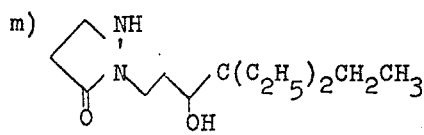 |
| n) $CH_2=CHCOCH_3$ | n) 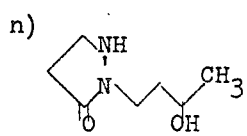 |
| o) $CH_2=\underset{CH_3}{C}HCO(CH_2)_4CF_3$ | o) 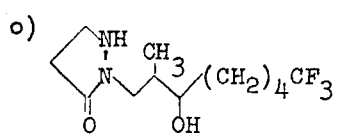 |
| p) $CH_2=CHCO(CH_2)CF_3$ | p) 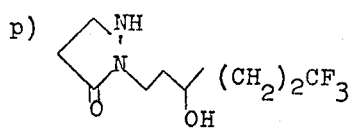 |
| q) $CH_2=CHCOCF_2C_2H_5$ | q) 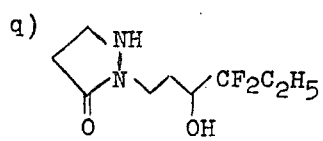 |
| r) $CH_2=\underset{C_2H_5}{C}-COCHF(CH_2)_3CF_3$ | r) 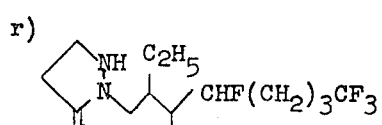 |
| s) $CH_2=CHCO(CH_2)_4CH_3$ | s) 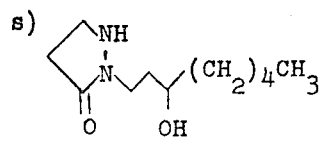 |

TABLE II (continued)
| Col. C (Omega-Halo Ester) | Col. D (Di-substituted Pyrazolidinone) |
|---|---|
| a) $ICH_2C{\equiv}C(CH_2)_3CO_2Et$ 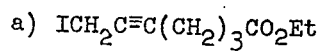 | a) 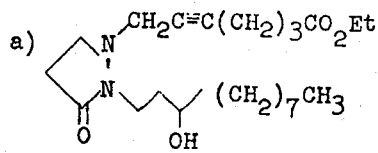 |
| b) $BrCH_2CH{=}C(CH_2)_3CO_2CH_3$ 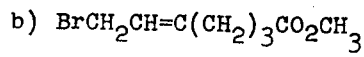 | b) 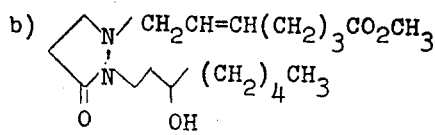 |
| c) $BrCH_2CH{=}CH(CH_2)_3CO_2\underline{t}Bu$ 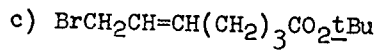 | c) 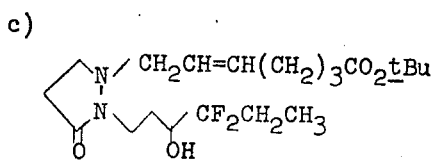 |
| d) $BrCH_2CH{=}CH(CH_2)_3CO_2\underline{t}Bu$ 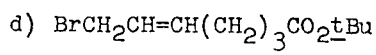 | d) 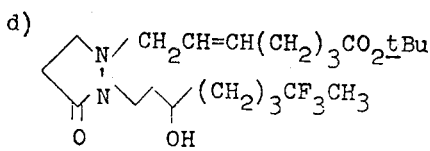 |
| e) "  | e) 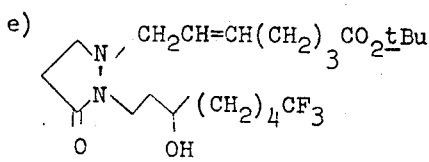 |
| f) $BrCH_2(CH_2)_5CO_2$-⟨⟩ 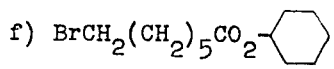 | f) 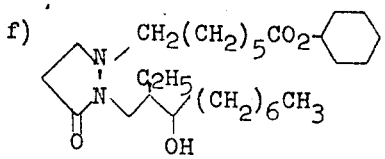 |
| g) "  | g) 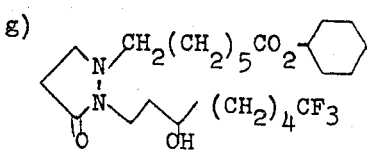 |
| h) $I(CH_2)_7CO_2\underline{t}Bu$ 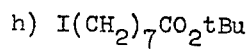 | h) 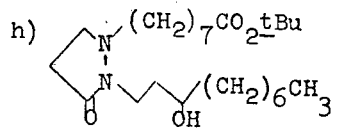 |
| i) "  | i) 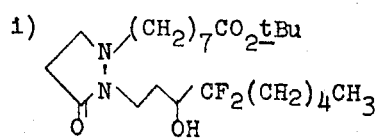 |

TABLE II (continued)
| Col. C | Col. D |
|---|---|
| j) Br(CH$_2$)$_3$CO$_2$C$_5$H$_{11}$(n) | j) 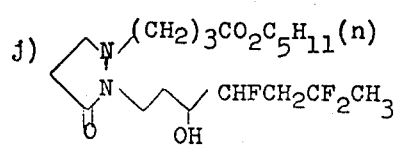 |
| k) " | k) 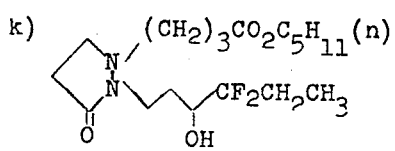 |
| l) BrCH$_2$C≡C-CH$_2$CO$_2$CH(CH$_3$)$_2$ | l) 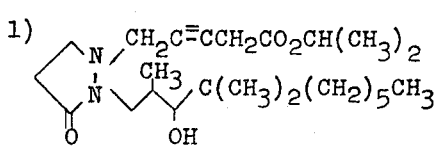 |
| m) " | m) 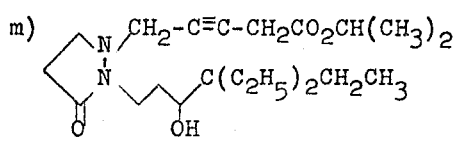 |
| n) 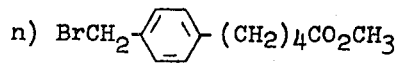 BrCH$_2$-⟨⟩-(CH$_2$)$_4$CO$_2$CH$_3$ | n) 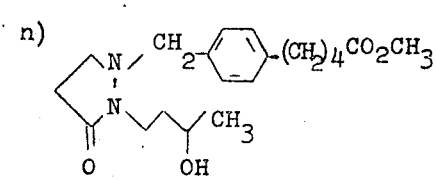 |
| o) " | o) 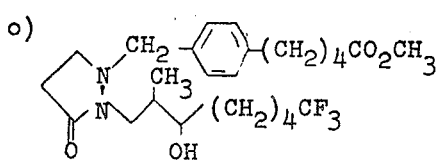 |
| p) 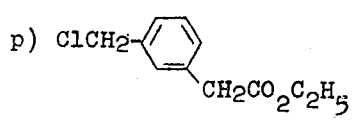 ClCH$_2$-⟨⟩-CH$_2$CO$_2$C$_2$H$_5$ | p) 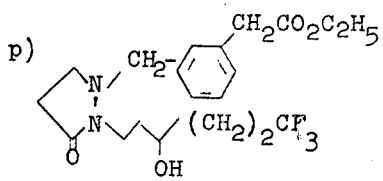 |
| q) " | q) 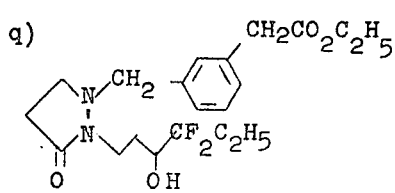 |
| r) 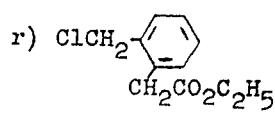 ClCH$_2$-⟨⟩-CH$_2$CO$_2$C$_2$H$_5$ | r) 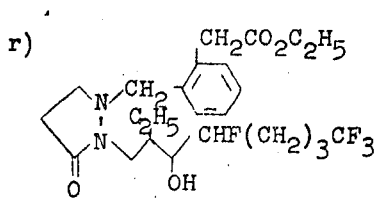 |

TABLE II (continued)
| Col. C | Col. D |
|---|---|
| s) " | s) 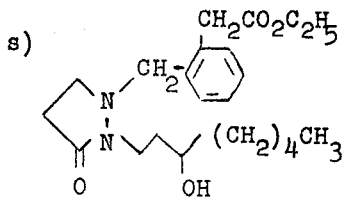 |
| Col. E (Amine Salt) | Col. F (Potassium Salt) |
|---|---|
| a) * 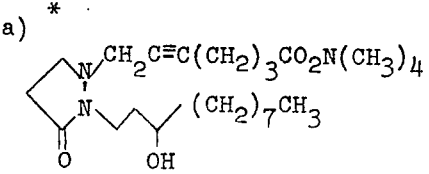 | b) * 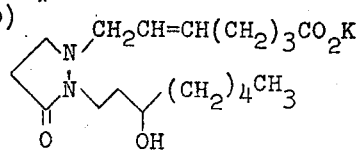 |
| c) 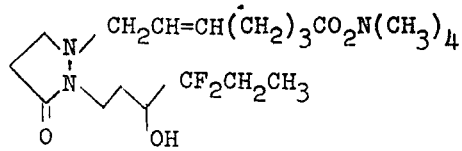 | d) 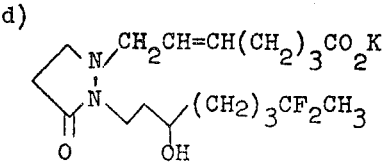 |
| e) 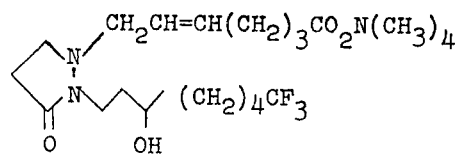 | f) 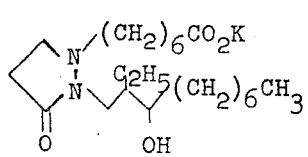 |
| g) 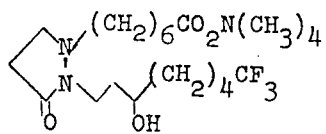 | h) 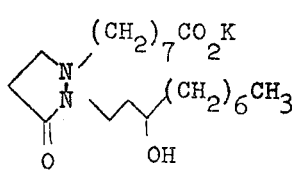 |
| i) 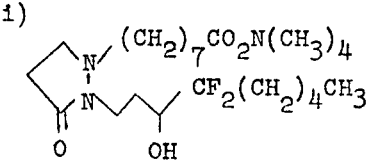 | j) 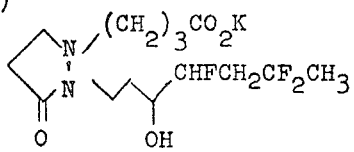 |
| n) 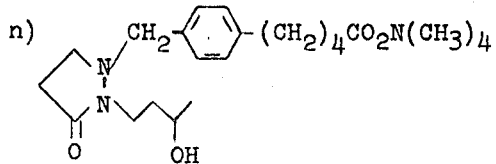 | o) 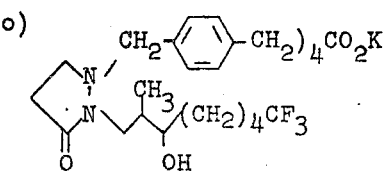 |
| p) 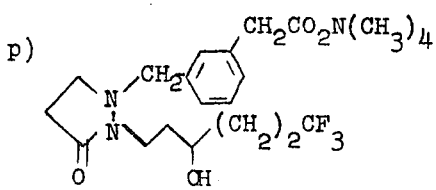 | q) 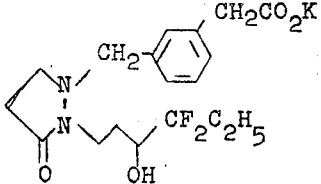 |

TABLE II (continued)

Col. E r) 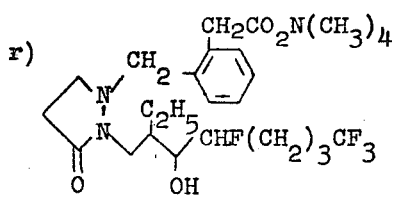

Col. F s) 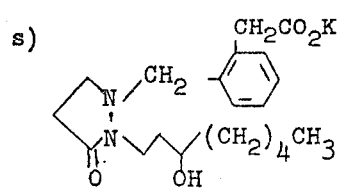

\* In Cols. E and F, the letters a), b), etc. correspond to the precursor in Col. D.

EXAMPLE 5

5[3'-Oxo-2'(3''-hydroxy-n-octyl)pyrazolidin-1'-yl]pentanoic acid, ethyl ester (19) and its hydrochloride salt (19a) Y=$H_2$, Z=O, m=O, n=3, R=Et, $R^1=R^2=R^3=R^4=R^5$=H, Q=$CH_3$, p=3

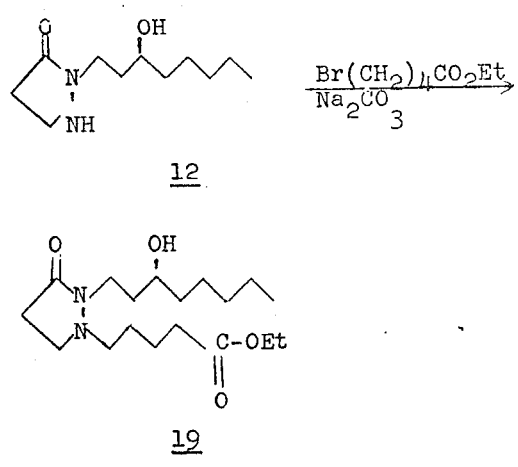

A mixture of 2.14 g (10 mmoles) of amine 12, 3.0 g (14.4 mmoles) of ethyl 5-bromovalerate, 1.0 g of anhydrous sodium carbonate, and 20 ml of anhydrous tetramethylenesulfone is heated on a steam bath for 16.5 hrs, cooled, and poured into 150 ml of 5 percent NaHCO$_3$. Extraction with ether, two portions each 100 ml, washing of the ether with water, drying, and addition of gaseous HCl as described for the synthesis of ester 17, gives the hydrochloride salt (19a) as a heavy oil. This oil is partitioned between excess saturated NaHCO$_3$ and ether, giving in the latter phase after drying 1.4 g of ester 19; single component by TLC (silica gel, 2:1 acetone-benzene, iodine visualization) R$_f$= 0.5; $\lambda_{max}$ (neat) 2.95 (OH), 3.40, 3.49, 5.75 (ester), 5.95 (CON); HRMS calcd. for $C_{18}C_{34}N_2O_4$, 342.2250, measured 342.2547.

EXAMPLE 6

4[3'-Oxo-2'(3''-hydroxy-n-octyl)pyrazolidin-1'-yl]butyric acid, ethyl ester (20) and its hydrochloride salt Y=$H_2$, Z=O, m=O, n=2, R=Et, $R^1=R^2=R^3=R^4=R^5$=H, Q=$CH_3$, p=3

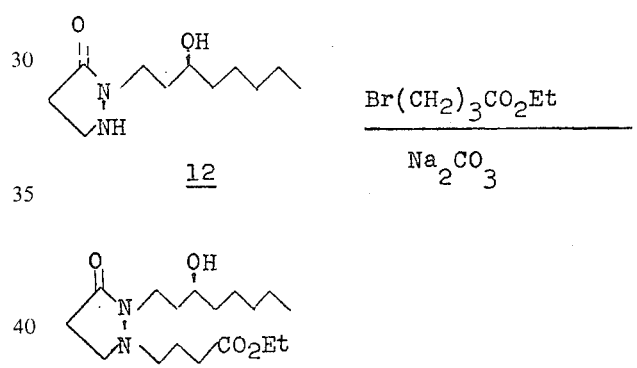

The above named ester (20) and its hydrochloride salt are prepared from 4.28 of amine 12, 7.0 g of ethyl 4-bromobutyrate 0.5 g of sodium iodide, 40 ml of tetramethylenesulfone, and 4 g of anhydrous sodium carbonate at 60° for 4 days, giving 1.90 g of ester 20 (28 percent); HRMS calcd. for $C_{17}H_{32}N_2O_4$ 328.2360, measured 328.2370.

EXAMPLE 7

7[3'-Oxo-2'(3''-hydroxy-n-octyl)pyrazolidin-1'-yl]heptanoic acid, tert-butyl ester (21) and its hydrochloric salt Y=$H_2$, Z=O, m=O, n=5, R=tBu, $R^1=R^2=R^3=R^4=R^5$=H, Q=$CH_3$, p=3

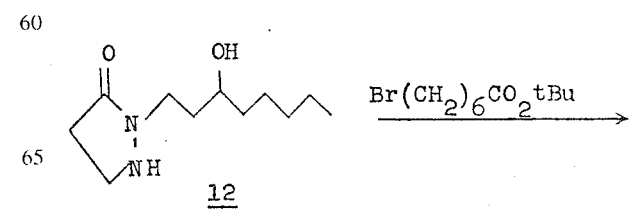

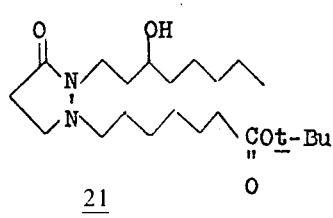

A mixture of 2.14 g or amine 3, 2.9 g of tertbutyl-7-bromoheptanoate, 25 ml of tetramethylenesulfone, 2.0 g of sodium carbonate and 0.5 g of sodium iodide is stirred in a stoppered flask at room temperature for 9 days. The resulting ester 21, and the hydrochloride salt, are isolated as in the example given above (for 20); TLC of the ester on silica gel (2:1 acetone benzene) indicated a single component $R_f = 0.6$; HRMS m/e of M$^+$ calcd. for $C_{22}H_{42}N_2O_4$: 398.3142, measured 398.3142 $\lambda_{max}$ (CHCl$_3$) 2.93, 5.81, 5.95, 7.17, 7.30, 8.68μ.

EXAMPLE 8

7[3'-Oxo-1'-(3''-hydroxy-3''-methyl-n-octyl)pyrazolidin-2'-yl]heptanoic acid, t-butyl ester (22) Y=O, Z=H$_2$, m=0, n=5, R=tBu, R$^1$=R$^3$=R$^4$=R$^5$=H, R$^2$=CH$_3$, Q=CH$_3$, p=3

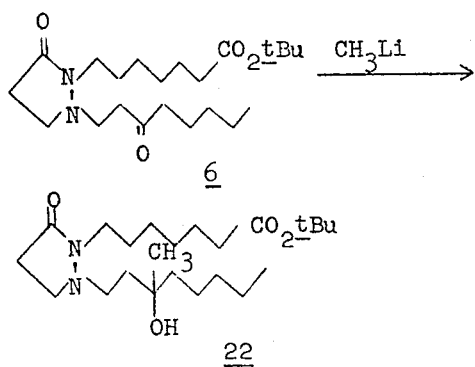

A mixture of 1.38 g (11 mmoles) of amyl vinyl ketone and 2.70 g (10 mmoles) of 2(6'-tert-butoxycarbonyl)-hexyl-3-pyrazolidone is stirred at room temperature for 18 hours, giving 7[3'-oxo-1'(3''-oxo-n-octyl)pyrazolidin-2'-yl]heptanoic acid-t-butyl ester (5). This oil is dissolved in 75 ml of dry ether and the solution cooled in an ice bath while 10 ml of 1.6 molar methyl lithium in ether is added with stirring. The ice bath is removed after 15 min. and the reaction mixture is stirred at room temperature overnight. The reaction mixture is then poured into 10 percent aqueous ammonium chloride and extracted with ether twice. The ether is washed with 5 percent aqueous NaHCO$_3$ twice, dried, and evaporated, giving 3.92 g or oil. Chromatography of the oil on 110 g of basic activity grade IV alumina, eluting with ether and ether-ethyl acetate mixtures gives in the 1:1 ether-ethyl acetate eluate about 0.9 g of an oil that is crystallized from petroleum ether to give 7[3'-oxo-1'-(3''-hydroxy-3''-methyl-n-octyl)pyrazolidin-2'-yl]heptanoic acid t-butyl ester (22), m.p. 41°–42°; HRMS Calcd. for $C_{23}H_{44}N_2O_4$: 412.3299; measured 412.3305.

The t-butyl ester is converted to the corresponding carboxylic acid alkali metal salt by refluxing with 1 equivalent of alkali metal hydroxide in a solvent such as ethanol.

If, instead of 7[3'-oxo-1'-(3''-oxo-n-octyl)-pyrazolidin-2-yl]heptanoic acid t-butyl ester, the ketones of col. A, of Table III, prepared as described in Examples 1 and 3 are treated with methyllithium, the methyl tertiary carbinols of Col. B are obtained. When the ketones of Col. A are not tert-butyl esters, but rather less hindered esters such as methyl or ethyl esters, the methyl tertiary carbinols of Col. B are obtained in better yields by using Grignard reagents such as methylmagnesium bromide and somewhat lower reaction temperatures, e.g., 0°. If for methyllithium, ethyllithium or ethylmagnesium bromide are substituted in the reactions with the ketones of Col. A, the ethyl tertiary carbinols of Col. C are obtained.

TABLE III

| Col. A | Col. B |
|---|---|
| a) Ketone (a), Table I, Col. E | a) 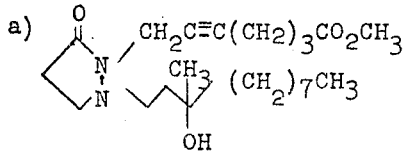 |
| b) Ketone (d), Table I, Col. E | b) 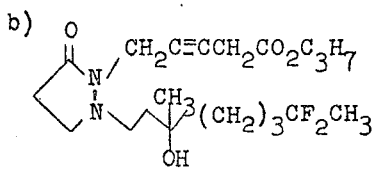 |
| c) Ketone (g), Table I, Col. E | c) 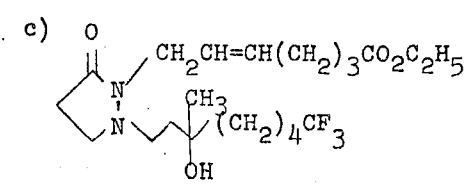 |

TABLE III (continued)
Col. A
d) Ketone (n), Table I, Col. E
e) Ketone(s), Table I, Col. E
f) 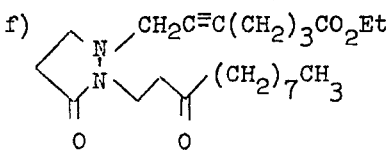
g) 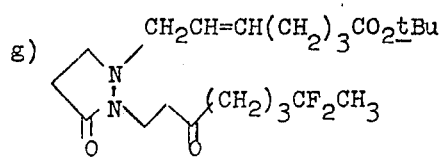
h) 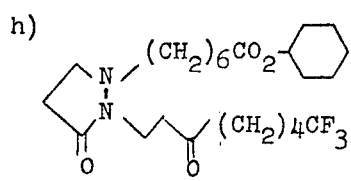
i) 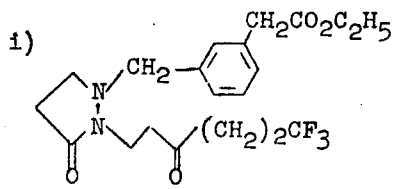
j) Ketone (b), Table I, Col. E
k) Ketone (e), Table I, Col. E
Col. B
d) 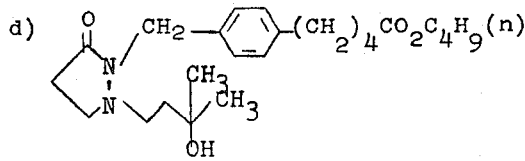
e) 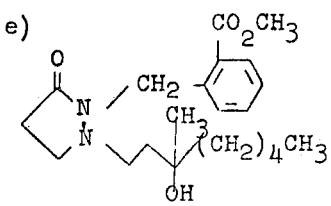
f) 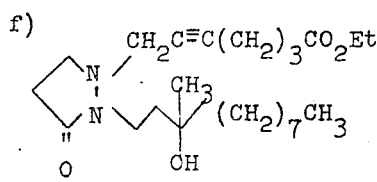
g) 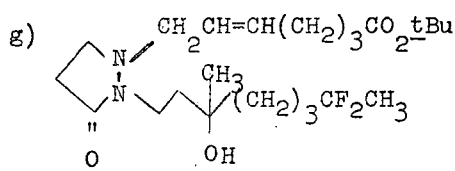
h) 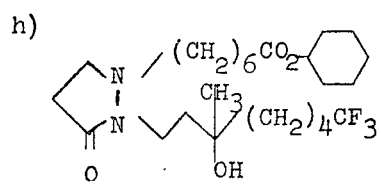
i) 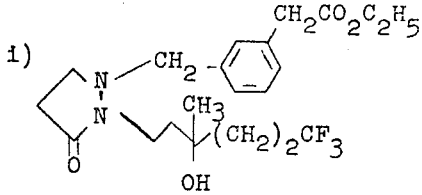
j) 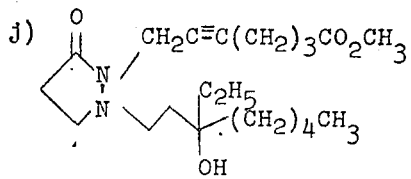
k) 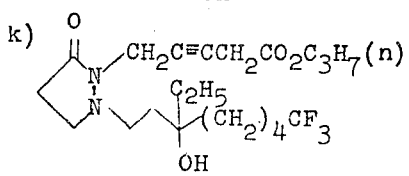

TABLE III (continued)
| Col. A | Col. B |
|---|---|
| l) Ketone (h), Table I, Col. E | l) 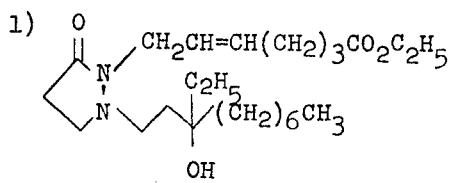 |
| Col. A | Col. C |
|---|---|
| m) Ketone (p), Table I, Col. E | m) 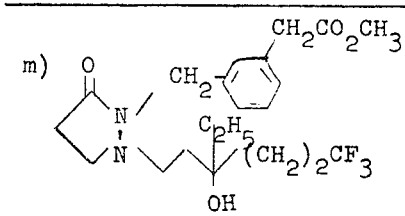 |
| n) 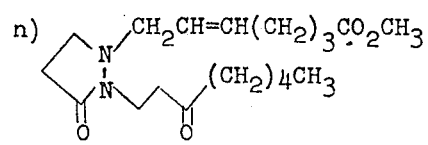 | n) 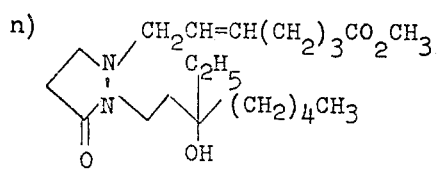 |
| o) 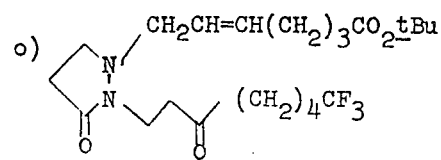 | o) 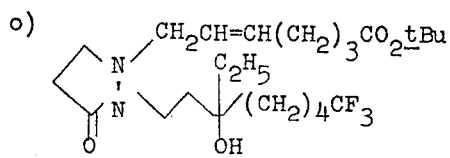 |
| p) 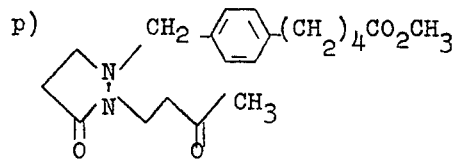 | p) 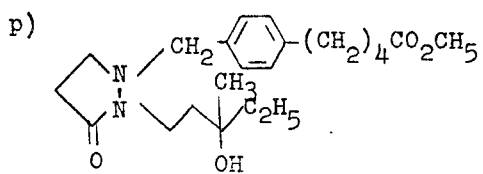 |
| q) 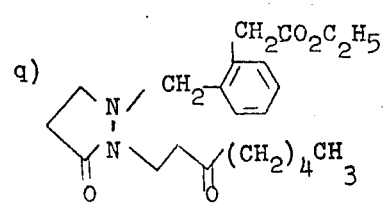 | q) 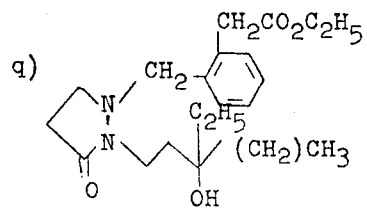 |

EXAMPLE 9

7[3'-oxo-1'(3''-hydroxy-3''-methyl-n-decyl)pyrazolidin-2'-yl]heptanoic acid t-butyl ester (24) Y=O, Z=H$_2$, m=O, n=5, R=tBu, R$^1$=R$^3$=R$^4$=R$^5$=H, R$^2$=CH$_3$, Q=CH$_3$ and p=5

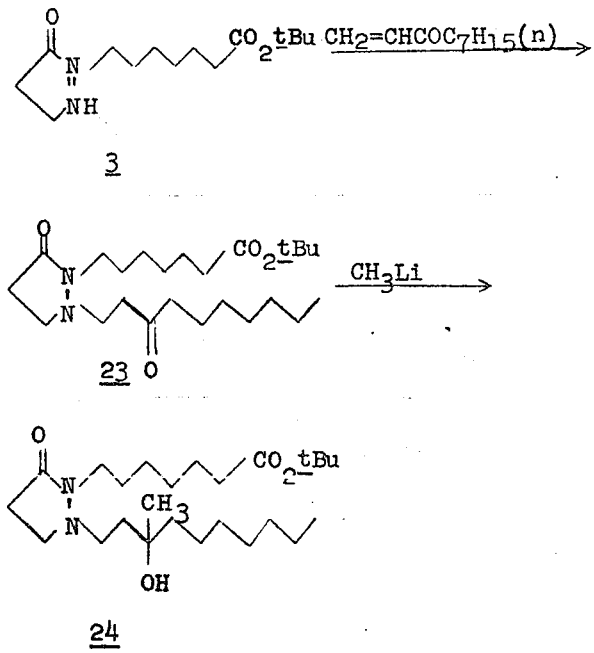

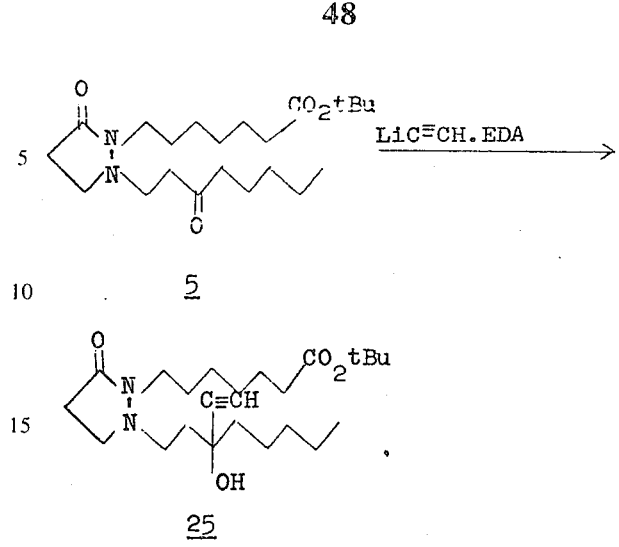

A solution of 3.39 g (22 mmoles) of heptyl vinyl ketone and 5.4 g (20 mmoles) of 2(6'-tert-butoxycarbonyl)-hexyl-3-pyrazolidone in 50 ml of dry ethyleneglycol dimethyl ether is stirred at room temperature for 2 1/2 days, giving a solution of 7[3'-oxo-1(3''-oxo-n-decyl)pyrazolidin-2'-yl]-heptanoic acid tert-butyl ester (23). To this with cooling at about −30° is added methyl lithium in ether (about 40 mmoles) and then the reaction mixture allowed to warm to room temperature and is stirred for 2.5 hrs. The reaction mixture is processed similarly to the procedure used for 22, giving 6.7 g of crude 24 which is purified by chromatography on 180 g of basic, activity grade IV alumina. HRMS calcd. for C$_{25}$H$_{48}$N$_2$O$_4$: 440.3611; measured 440.3633.

EXAMPLE 10

7[3'-oxo-1'(3''-ethynyl-3''-hydroxy-n-octyl)pyrazolidin-2'-yl]heptanoic acid t-butyl ester (25) Y=O, Z=H$_2$, m=O, n=5, R=t-Bu, R$^1$=R$^3$=R$^4$=R$^5$=H, R$^2$=C≡CH, Q=CH$_3$, p=3

To a solution of 5 mmoles of 7[3'-oxo-1'(3''-oxo-n-octyl)pyrazolin-2'-yl]heptanoic acid t-butyl ester (5) in 25 ml of dry ethyleneglycol dimethyl ether saturated with acetylene is added 0.60 g of lithium acetylide ethylenediamine complex. The mixture is stirred with ice cooling for 20 min. and then kept at room temperature for 2.5 days. The mixture is then heated at reflux temperature for 2 hrs. If thin layer chromatography indicates the presence of unchanged 5, about 10 cc of dimethylsulfoxide and 0.60 g more lithium acetylide EDA is added and the mixture stirred for another 18 hrs at room temperature before pouring it into water and extracting with ether. Evaporation of the ether gives 1.6 g of crude 25; HRMS calculated for C$_2$H$_{22}$N$_2$O$_4$: 422.3144; measured 422.3127.

If, for 7[3'-oxo-1'-3''-oxo-n-octyl)pyrazolin-2'-yl]heptanoic acid t-butyl ester the ketones of Col. A of Table IV are substituted in Example 10, the acetylenic tertiary carbinols of Col. B are obtained. Substitution of one equivalent of vinyl lithium for the lithium acetylide ethylene diamine complex and acetylene used in Example 10, gives on reaction with the ketones of Col. A, the corresponding vinyl tertiary carbinols of Col. C. With use of vinyl lithium, lower reaction temperatures, for example 0°, afford better yields of the vinyl tertiary carbinols, especially when the ketones of Col. A are not tertiary butyl esters but rather less hindered esters such as methyl or ethyl esters. Hydrolysis of the esters of Cols. B and C with alkali metal hydroxides as in Example 8 gives the corresponding alkali metal salts. Acidification of these salts with one equivalent of mineral acid gives the corresponding carboxylic acids.

TABLE IV

| Col. A | Col. B |
|---|---|
| a) Ketone (a), Table I, Col. E | a) 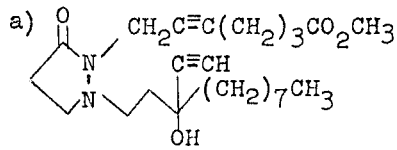 |

TABLE IV (continued)
| Col. A | Col. B |
|---|---|
| b) Ketone (d), Table I, Col. E | b) 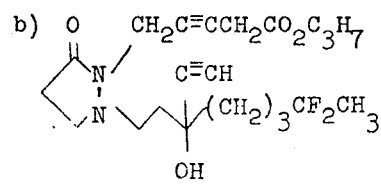 |
| c) Ketone (g), Table I, Col. E | c) 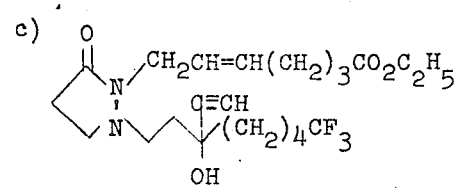 |
| d) Ketone (n), Table I, Col. E | d) 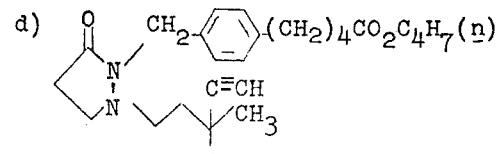 |
| e) Ketone (s), Table I, Col. E | e) 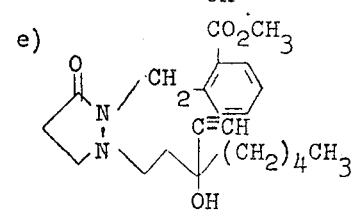 |
| f) 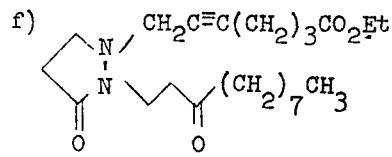 | f) 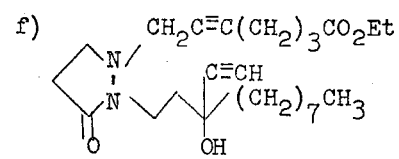 |
| g) 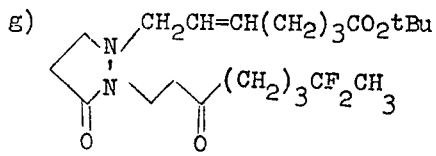 | g) 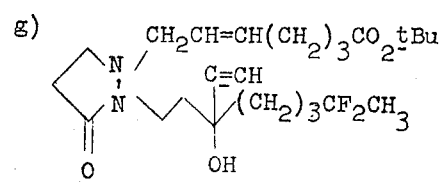 |
| h) 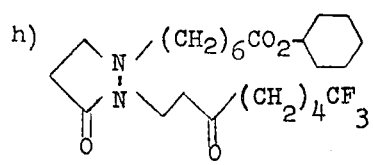 | h) 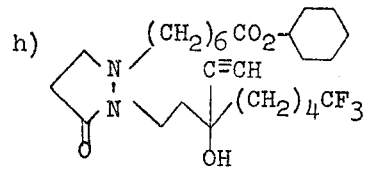 |

TABLE IV (continued)
Col. A
1) 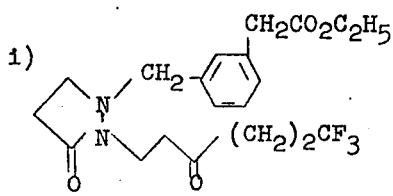
Col. A (cont.)
j) Ketone (b), Table I, Col. E
k) Ketone (e), Table I, Col. E
l) Ketone (h), Table I, Col. E
m) Ketone (p), Table I, Col. E
n) 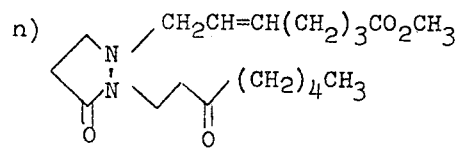
o) 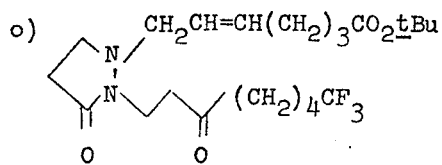
p) 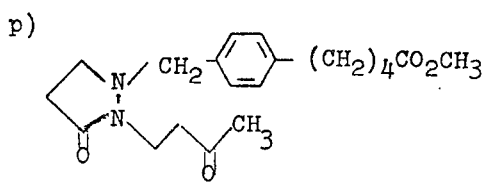
Col. B
1) 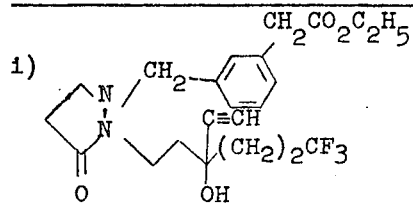
Col. C
j) 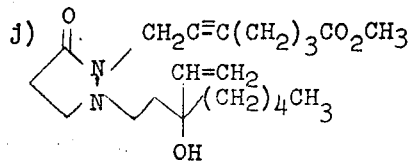
k) 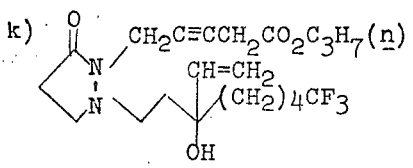
l) 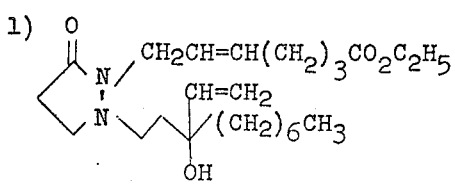
m) 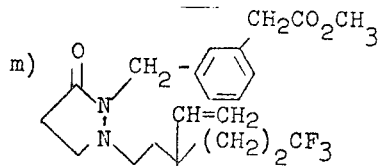
n) 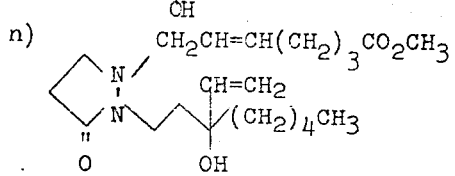
o) 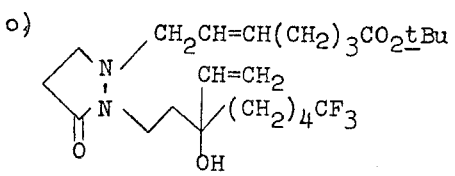
p) 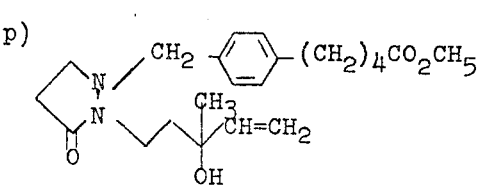

TABLE IV (continued)

Col. A q) 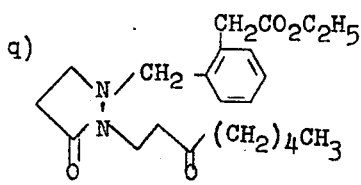

Col. C q) 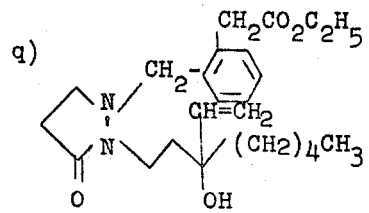

EXAMPLE 11

7[3'-Oxo-1'(3''-hydroxy-8'',8'',8''-trifluoro-n-octyl)-pyrazolidin-2'-yl]heptanoic acid, t-butyl ester (27)
Y=O, Z=H$_2$, m=O, n=5, R=t-Bu, H, Na,
R$^1$=R$^2$=R$^3$=R$^4$=R$^5$=H, Q=CF$_3$, p=3

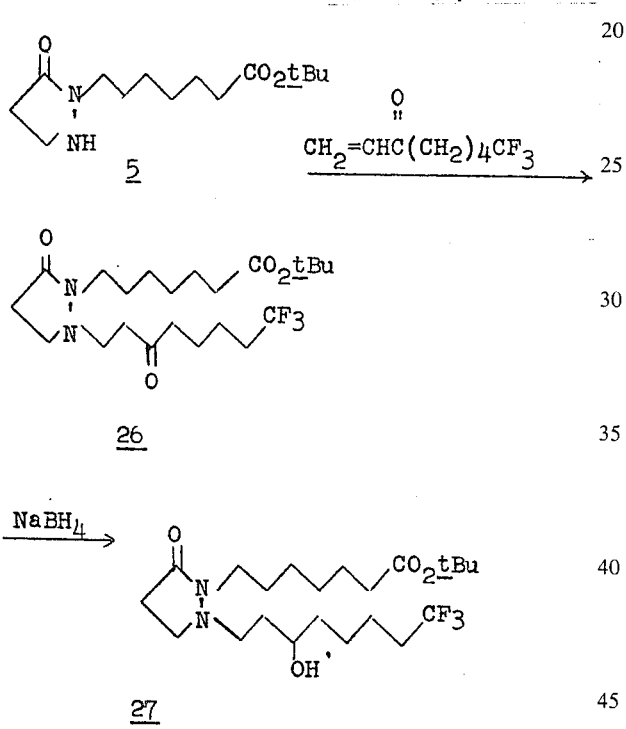

A solution of 5.4 g (20 mmoles) of 2(6'-tertbutoxycarbonyl)hexyl-3-pyrazolidinone and 4.5 g (25 mmoles) of 1,1,1-trifluoropent-5yl vinyl ketone in 75 ml of ethanol is stirred at room temperature overnight and then the solution of ketone 26 cooled in ice and treated with 1.6 g of sodium borohydride. The ice is allowed to slowly melt. The reaction mixture is stirred at room temperature for about 6 hrs. The mixture is poured into water, extracted with ether, and the ether evaporated to give an oil that is applied to 240 g of basic activity grade IV alumina. Elution with benzene and then ether gives in the latter 4.65 g of 7[3'-oxo-1'(3''-hydroxy-8'',8'',8''-trifluoro-n-octyl)heptanoic acid t-butyl ester (27); R$_f$=0.4 (silica gel, 2:1 acetone-benzene); HRMS calcd. for C$_{22}$H$_{39}$F$_3$N$_2$O$_4$ 452.2860, measured 452.2835.

(B)
7[3'-oxo-1'(3''-hydroxy-8'',8'',8''-trifluoro-n-octyl)]heptanoic acid hydrochloride (25) and sodium salt (29)

Into a mixture of 3.91 g of t-butyl ester 27, 0.25 ml of water, and about 50 ml of chloroform is bubbled gaseous hydrogen chloride for about 30 minutes. After about 10 minutes the mixture becomes cloudy and hydrochloride 28 appears as an oily phase. After the addition of HCl is completed, the mixture is stirred for an additional 2 hrs and then evaporated in a rotating evaporator, giving 4.37 g of 28 as a colorless glass; HRMS (of disilyl derivative of 28 prepared in pyridine) calcd C$_{24}$H$_{47}$F$_3$O$_4$N$_2$Si$_2$ 540.3004; measured 540.2988.

Treatment of 16 with water and enough Na$_3$PO$_4$ to give a solution having pH = 8 gives an aqueous solution of the sodium salt (29) buffered with phosphate.

The 1,1,1-trifluoropent-5-yl vinyl ketone used in the preparation of 26 is prepared as follows:

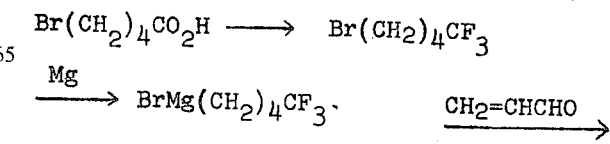

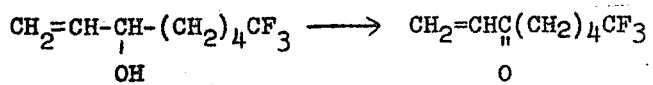

A 1 l. autoclave containing 100 g (0.55 mole) of 5-bromovaleric acid, 40 g (2.0 mole) of hydrogen fluoride, 180 g (1.65 mole) of sulfur tetrafluoride, and 200 ml of methylene chloride is agitated for 20 hrs at 28°–29°. The autoclave is vented and its contents poured into 1 l. of ice water. The aqueous mixture is extracted with methylene chloride, which in turn is washed with water twice and then with excess NaHCO$_3$ solution. The washed solution is dried over MgSO$_4$, filtered, and distilled to give 1,1,1-trifluoro-5-brompentane, 71 g (63 percent), boiling at 68°–70°/66 mm; $\lambda_{max}$ 1130, 1210, 1250, 1285 cm$^{-1}$; Anal. Calcd. for C$_5$H$_8$BrF$_3$: C, 29.3; H, 3.93; F, 27.8; Found, C, 29.79; H, 3.98, F, 28.3

1,1,1-Trifluoro-5-bromopentane is converted to the Grignard reagent by reaction with magnesium in ether. To this reagent is then added dropwise with stirring an ether solution of acrolein, keeping the temperature of the reaction at 10°–15° by external cooling. The reaction mixture is heated at reflux for 1 hr., cooled, and poured into 10 percent aq. NH$_4$Cl. Extraction with ether and distillation give trifluoropentyl vinyl carbinol, bp 78°–79°/6mm, n$_D{}^{25}$ 1.3910.

Oxidation of the above carbinol with chromic acid in acetone gives the ketone b.p. 56°/3 mm, n$_D{}^{25}$ 1.3900; HRMS calcd for C$_8$H$_{11}$F$_3$O 180.0761, measured 180.0770; $\lambda_{max}$ 3.27, 3.37, 3.44, 5.92, 6.15, 8.9, 10.13, 10.37 μ. p-Methoxyphenol (3 percent by wt.) is added to the distilled ketone to inhibit its polymerization.

EXAMPLE 12 p-[[3-Oxo-2(3'-hydroxy-n-octyl)pyrazolidin-1-yl]methyl]-benzoic acid, methyl ester (30), the methyl ester hydrochloride and the sodium salt (30a) Y=H$_2$, Z=O, A=p-C$_6$H$_4$, m=1, n=O, R=Me, Na, R$^1$=R$^2$=R$^3$=R$^4$=R$^5$=H, Q=CH$_3$, p=3

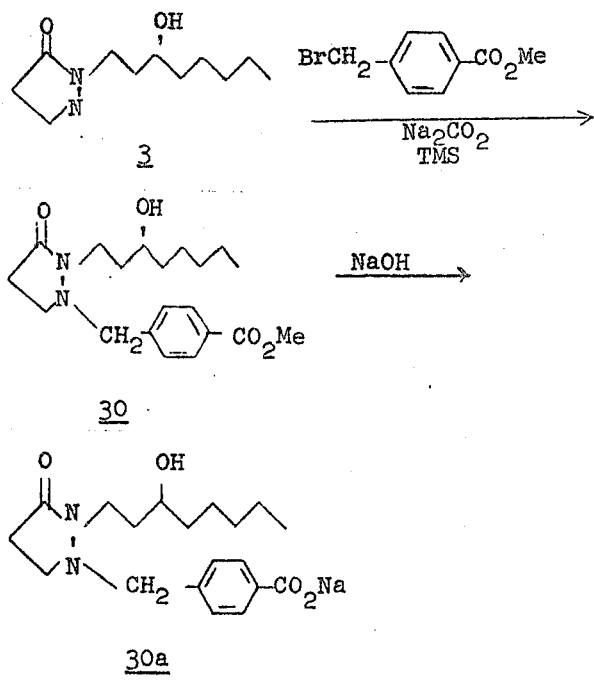

p-Bromoethylbenzoyl bromide is converted to p-bromomethylbenzoic acid methyl ester by refluxing in methanol; pmr (CDCl$_3$) 230 Hz (CO$_2$CH$_3$), 265 Hz (CH$_2$Br) at 60 MHz.

A solution of 4.3 g (20 mmoles) of 2-(3'-hydroxy-n-octyl)-3-pyrazolidinone (see 12 of Example 3) and 6.6 g (29 mmoles) of p-bromomethylbenzoic acid methyl ester in 25 ml of dry tetramethylenesulfone with 5.0 g of anhydrous sodium carbonate and 0.2 g of sodium iodide is stirred at room temperature for 4 days and then heated on a steam bath for 1.5 hrs. The mixture is cooled, poured into 150 ml of 5 percent, NaHCO$_3$, and extracted with ether (2 × 100 ml). The ether is washed with water (3 × 50 ml), dried over anhydrous Na$_2$SO$_4$, and filtered into a separatory funnel. Addition of excess gaseous hydrogen chloride causes the separation of the hydrochloride as an oil from which the supernatant ether layer is removed by decantation. The oil is washed with fresh ether which is removed by decantation giving the hydrochloride of ester 30. This oil is partitioned between excess saturated sodium bicarbonate solution and ether, giving on evaporation of the Na$_2$SO$_4$-dried ether layer 5.93 g (82%) of ester 30; single component by TLC (silica gel; 2:1 acetone-benzene; iodine visualization) R$_f$=0.58; $\lambda_{max}$ (neat); 2.93 (OH), 3.38, 3.40, 3.49, 5.79, 5.95, 6.19, 6.32, 7.82, 9.0, 9.78μ; HRMS calcd. for C$_{20}$H$_{30}$N$_2$O$_4$, 362.2226, measured 362.2212.

Saponification of ester 30 with one equivalent of 1.0N sodium hydroxide in ethanol gives a solution of sodium salt 30a.

EXAMPLE 13 p-[[3-Oxo-2(3'-hydroxy-n-octyl)pyrazolidin-1-yl]methyl]-phenylacetic acid, methyl ester (31) and the ester hydrochloride Y=H$_2$, Z=O, A=p-C$_6$H$_4$, m=n=1, R=Me, R$^1$=R$^2$=R$^3$=R$^4$=R$^5$=H, Q=CH$_3$, p=3

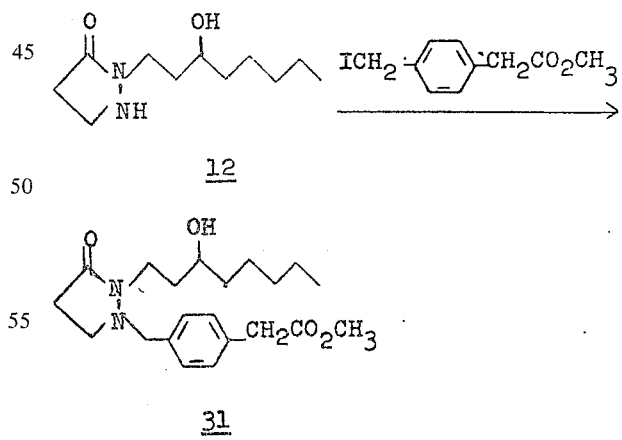

Phenylacetic acid is chloromethylated to give a mixture of ortho-, meta-, and para-(chloromethyl)-phenylacetic acids. Several recrystallizations from CCl$_4$ gives pure p-(chloromethyl) phenylacetic acid, m.p. 154°–156° [M. N Bogdanov, J. Gen. Chem. USSR (Engl. trans.) 1670 (1958)]. Treatment of this acid with methanol in the presense of dry HCl at room temperature overnight gives the p-(chloromethyl)phenylacetic acid methyl ester as colorless liquid. This in turn is treated with sodium iodide in acetone to give the solid p-(iodomethyl)phenylacetic acid methyl ester. This is used immediately in the following reaction.

A mixture of 4.07 g (19 mmoles) of amine 12, 5.8 g (20 mmoles) of p-(iodomethyl)phenylacetic acid methyl ester, 5.5 g of anhydrous sodium carbonate, and 50 ml of tetramethylenesulfone is stirred at room temperature in the dark for 2 days and then heated on the steam bath for 2 hrs. The mixture is cooled, poured into 250 ml of 5 percent NaHCO$_3$ and extracted with three 125 ml-portions of ether. The ether is washed three times with water, dried over anhydrous sodium sulfate, and filtered into a separatory funnel. Hydrogen chloride gas is bubbled into the ether until no more insoluble oil separates. After the oil settles out, the supernatant ether layer is drawn off with a syringe. The remaining oil (the hydrochloride) is than partitioned between excess 5% sodium bicarbonate and ether. The ether phase is dried over sodium sulfate and evaporated in vacuo, giving 5.29 g (71 percent) of the ester 31 as a light yellow oil, pure by TLC (silica gel, 2:1 acetone-benzene), R$_f$ 0.65, iodine visualization. The oil could be obtained colorless by eluting it from a column of basic alumina (Activity grade IV) with 3:1 benzene-ethylacetate; HRMS calcd. for C$_{21}$H$_{32}$N$_2$O$_4$ 376.2270, measured 376.2315; λ$_{max}$ (neat) 2.90, 5.72, 5.95, 6.58, 7.27, 8.66μ.

EXAMPLE 14 p-[3-Oxo-2-(3'-hydroxy-n-octyl)pyrazolidine-1-yl]methylphenyl acetic acid (32a) and the sodium salt (32) Y=H$_2$, Z=O, A=p-C$_6$H$_4$, m=n=1, R=H, Na, R$^1$=R$^2$=R$^3$=R$^4$=R$^5$=H, Q=CH$_3$, p=3

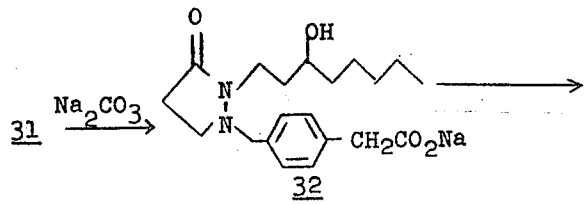

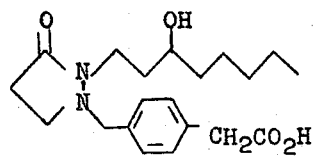

A solution of 5.53 g (14.7 mmoles) of ester 31 in 60 ml of methanol is cooled in ice and treated with a solution of 1.56 g (14.7 mmoles) of Na$_2$CO$_3$ in 55 ml of water. The mixture is stirred with cooling for 2.5 hrs and then at room temperature overnight. Then 100 ml of water is added and the solution extracted with two 100 ml portions of methylene chloride, which is then discarded. The aqueous phase, containing the sodium salt 32 is then carefully acidified with dilute HCl just to the point where the last drop causes the oily precipitate of 32a to start redissolving (pH about 6). The oil is extracted into 200 ml of methylene chloride. (Addition of a few more drops of dilute HCl to the clear aqueous layer remaining gives no cloudiness or oily precipitate if the acidification is carried out properly.) The methylene chloride layer is dried over Na$_2$SO$_4$ and evaporated, giving 4.51 g (80%) of the acid 32a as a light yellow glass after drying under a high vacuum at 50°; λ$_{max}$ (neat) 2.9–3.2 broad, 3.4, 3.5, 3.7–4.1 broad, 5.8, 6.0–6.1, 6.58 sh at 6.62, 6.85, 7.05, 13.6, 15.0 μ; HRMS calcd. for C$_{20}$H$_{30}$N$_2$O$_4$: 362.2204, measured 362.2204; for the bis-trimethylsilyl derivative calcd. 506.2994, measured 506.3028.

EXAMPLE 15

β-[p-[[3-Oxo-2(3'-hydroxy-n-octyl)pyrazolidine-1-yl]methyl]-phenyl]propionic acid (35a), its methyl ester (33), the ester hydrochloride (34) and the sodium salt (35) Y=H$_2$, Z=O, A=p-C$_6$H$_4$, m=1, n=2, R=CH$_3$, Na, H, R$^1$=R$^2$=R$^3$=R$^4$=R$^5$=H, Q=CH$_3$, p=3

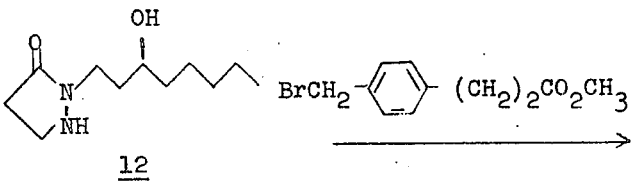

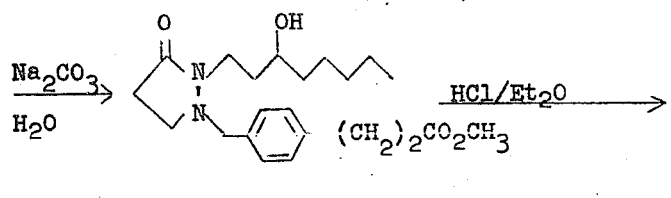

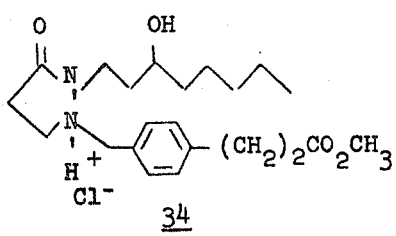

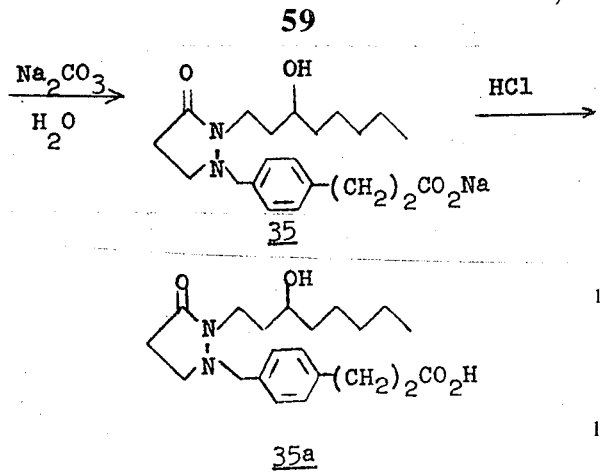

β-Phenylpropionic acid (150 g, 1.0 mole) is bromomethylated by passing HBr gas into a mixture of the acid, paraformaldehyde (40g), and 48 percent aqueous HBr (200 ml) at 50°–55° for 3.5 hrs. This gives a mixture of ortho, meta, and para-bromomethylphenylpropionic acids from which the para isomer can be isolated by recrystallization from CCl₄. The β(p-bromomethylphenyl)propionic acid obtained (100 g, 41 percent) melts at 133°–316°.

Anal. Calcd. for $C_{10}H_{11}BrO_2$: C, 49.4; H, 4.55; Br, 32.9.
Found: C, 49.67; H, 4.78; Br, 33.05.

The bromoacid (50 g) is converted to the methyl ester in methanol (300 ml) and methyl orthoformate (20 ml) with anhydrous HBr as the catalyst, giving β-(p-bromomethylphenyl) propionic acid methyl ester (42.5 g) m.p. 38°–42° (hexane); it contains about 20 percent β-(p-methoxymethylphenyl)propionic acid methyl ester, according to pmr spectroscopy.

A mixture of 10.7 g (50 mmoles) of pyrazolidinone 12, 16 g of the β(p-bromomethylphenyl)propionic acid methyl ester, 10 g of sodium carbonate, and 100 ml of tetramethylene sulfone is stirred at room temperature for 8 days and then heated in a steam bath for 4 hrs. The mixture is cooled, poured into 500 ml of water and extracted with ether. The hydrochloride 34 and the free ester 33 (14.3 g, 73 percent) are isolated by a procedure analogous to that used to prepare ester 30 and its hydrochloride.

Hydrolysis of ester 33 with sodium carbonate in ethanol-water gives the water-soluble sodium salt 35. An aqueous solution of salt 35 acidified to pH 6 and extracted with methylene chloride gives acid 35a; $\lambda_{max}$ 2.45, 3.40, 2.48, 3.5-4.0, 5.80, 6.00, 6.60μ; HRMS calcd. for $C_{21}H_{32}N_2O_4$ 376.2360, measured 376.2336 silylation gives an intense 520 m/c ion (376 + 2 TMS).

EXAMPLE 16

γ[p[[3-Oxo-2(3′-hydroxy-n-octyl)pyrazolidin-1-yl]-methyl]-phenyl] butyric acid methyl ester (36), its hydrochloride salt (37), sodium salt (38), and acid (39) Y=H₂, Z=O, A=p-C₆H₄, m=1, R=H, CH₃, Na, R¹=R²=R³=R⁴=R⁵=H, Q=CH₃, p=3, n = 3

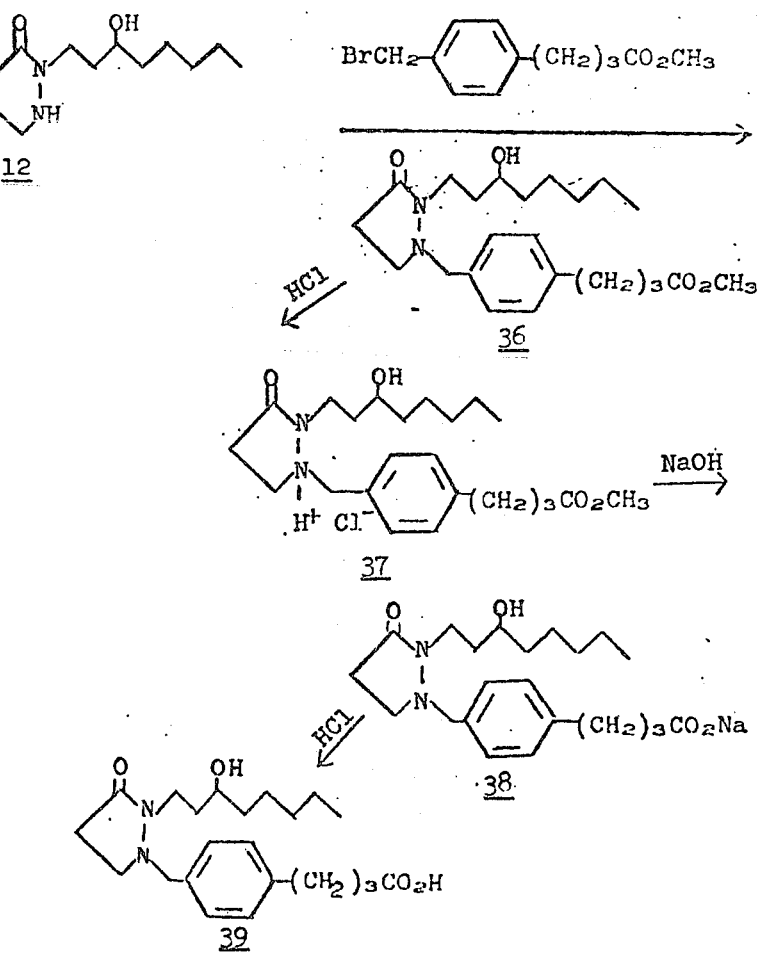

4-Phenylbutyric acid (150 g) is bromomethylated in 200ml of 48 precent HBr with 36 g paraformaldehyde and gaseous HBr for 3.5 hrs at 60°–65°, and then without addition of HBr for 1.5 hrs at 70°–75°, giving a mixture of ortho, meta, and para isomers from which pure 4-(p-bromomethylphenyl)butyric acid, m.p. 137°–138° is isolated by recrystallization from $CCl_4$. Treatment of the acid in ether-tetrahydrofuran with diazomethane gives the methyl ester of 4-(p-bromomethylphenyl)-butyric acid as a liquid.

Reaction of this compound with pyrazolidinone 12 gives the methyl ester 36 from which its hydrochloride salt (37) the sodium salt, (38), and the free acid 39 are readily obtained by the general procedures given in Example 14. For the acid 39 HRMS calcd. for $C_{22}H_{34}N_2O_4$ 390.2517; measured 390.2528.

EXAMPLE 17

γ-[p[[3-Oxo-2(3′-hydroxy-n-octyl)pyrazolidin-1-yl]-methyl]phenyl]butyric acid isopropyl ester (40) and its hydrochloride salt (41) Y=$H_2$, Z=O, A=p-$C_6H_4$, m=1, n=3, R=i-Pr, $R^1$=$R^2$=$R^3$=$R^4$=$R^5$=H, Q=$CH_3$, p=3

4-(p-Bromomethylphenyl)butyric acid is converted to its isopropyl ester in isopropanol containing anhydrous HBr. The reaction is carried out over 4A molecular seive at room temperature for 2 days. This ester is a colorless liquid.

Amine 12 (2.14 g) is allowed to react with 3.9 g of this ester in 25 ml of tetramethylenesulfone over 8.0 g of anhydrous sodium bicarbonate for 3 days at 50°. Processing the reaction mixture by a procedure analogous to that used in Example 15 gives the ester 40 and its hydrochloride 41. HRMS calcd. for $C_{25}H_{40}N_2O_4$ (ester 40) m/e 432.2986, found 432.3045.

EXAMPLE 18

β-[p-[[3-Oxo-1(3′-hydroxy-n-octyl)pyrazolidin-2-yl]-methyl]phenyl]propionates (45) and (46) (A)
β[p[1-(β′,β′,β′,trichloroethoxycarbonyl)-3-oxo-pyrazolidin-2-yl]methyl]phenylpropionic acid isopropyl ester (42)

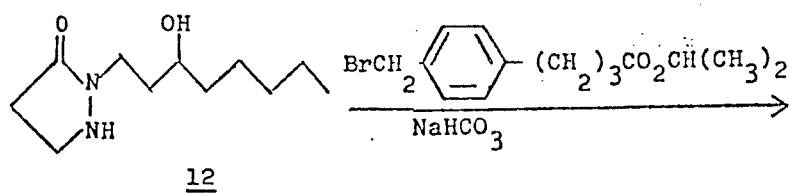

12

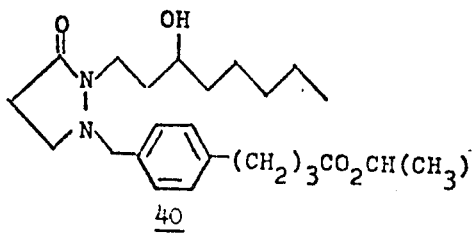

40

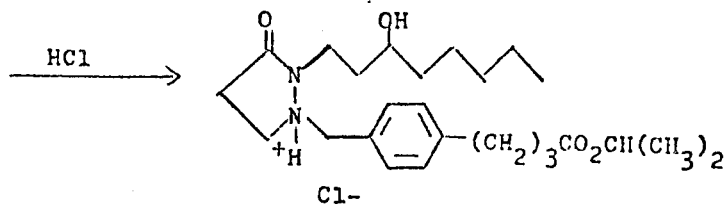

41

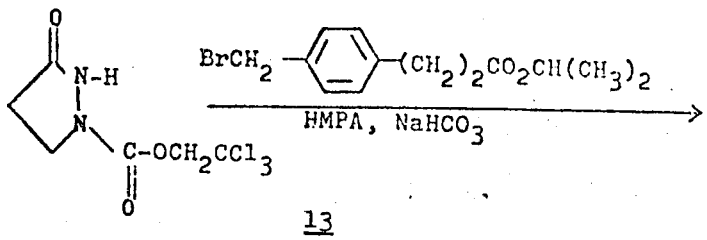

13

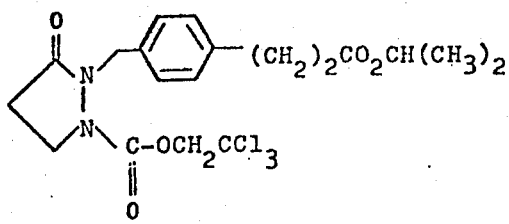

42

A mixture of 26.2 g of 1(β,β,β-trichloroethoxycarbonyl)-3-pyrazolidinone 13, 16 g of β-(p-bromomethylphenyl) propionic acid isopropyl ester in 100 ml of dry hexamethylphosphoric triamide and 20 g or anhydrous sodium bicarbonate is stirred at room temperature for 19 days and then poured into 500 ml of water. The aqueous mixture is extracted twice with ether and the ether extract is in turn washed with water, 5 percent NaHCO$_3$, and finally with 5 percent HCl. Evaporation of the ether gives 22.7 g of crude product. This is crystallized from about 100 ml of cyclohexane, giving β-[p[1(β',β',β'-trichloroethoxycarbonyl)-pyrazolidin-2-yl]methyl]-phenylpropionic acid isopropyl ester (42) m.p. 91°–92°. λ$_{max}$ CHCl$_3$, 3.36, 5.83, 6.20, 6.60, 12.23 μ.

Anal. Calcd. for C$_{19}$H$_{23}$N$_2$O$_5$Cl$_3$: C, 48.99; H, 4.98; N, 6.02; Cl, 22.84
Found: C, 48.99; H, 5.07 N, 6.15; Cl, 22.92

(B)
β-[p(3-oxopyrazolidin-2-yl)methyl]phenylpropionic acid isopropyl ester (43)

To a solution of 7.0 g of 42 in 50 ml of methanol is added 4 g of 20 mesh zinc granules that had previously been purified by washing with nitric acid-sulfuric acid. The mixture is heated at gentle reflux, whereupon a vigorous evolution of carbon dioxide takes place. When the reaction subsides the mixture is heated at reflux for an additional 0.75 hr. The reaction mixture is then cooled and filtered, and the filtrate is concentrated to about 20 ml in vacuo. The concentrate is then mixed with water and NaHCO$_3$ is added to pH 8. Extraction with ethyl acetate gives in the organic layer 4.1 g of 43 as an oil.

Alternatively 43 can be treated with zinc dust in 83 percent acetic acid at 0°–5° for 1 hr. By processing the reaction mixture by a procedure analogous to the procedure described above, colorless 43 is obtained in about 40 percent yield; HRMS calcd. for C$_{16}$H$_{22}$N$_2$O$_3$ 290.1629; measured m/e of M$^+$290.1630.

Treatment of 0.545 g of 43 in 3.0 ml of isopropyl alcohol with 0.32 g of p-chlorophenylisothiocyanate gives 0.75 g (87 percent) of the thioureide; m.p. after recrystallization from isopropanol 117°–118°; λ$_{max}$ 3.03, 3.37, 5.81, 6.30, 6.62 sh, 6.67, 12.09 μ.

Anal. Calcd. for C$_{23}$H$_{26}$ClN$_3$O$_3$S: C, 60.05; H, 5.70; N, 9.14
Found: C, 60.40; H, 5.51; N, 9.11

(C)
β-[p[[3-oxo-1(3'-hydroxy-n-octyl)pyrazolidin-2-yl]methyl]-phenyl]propionic acid isopropyl ester (45), and sodium salt (46) Y=O, Z=H$_2$, A=P.C$_6$H$_4$, m=1, n=2, p=3, R=i-Pr; Na; R$^1$=R$^2$=R$^3$=R$^4$=R$^5$=H, Q=CH$_3$.

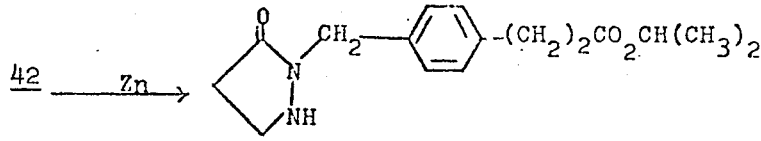

43

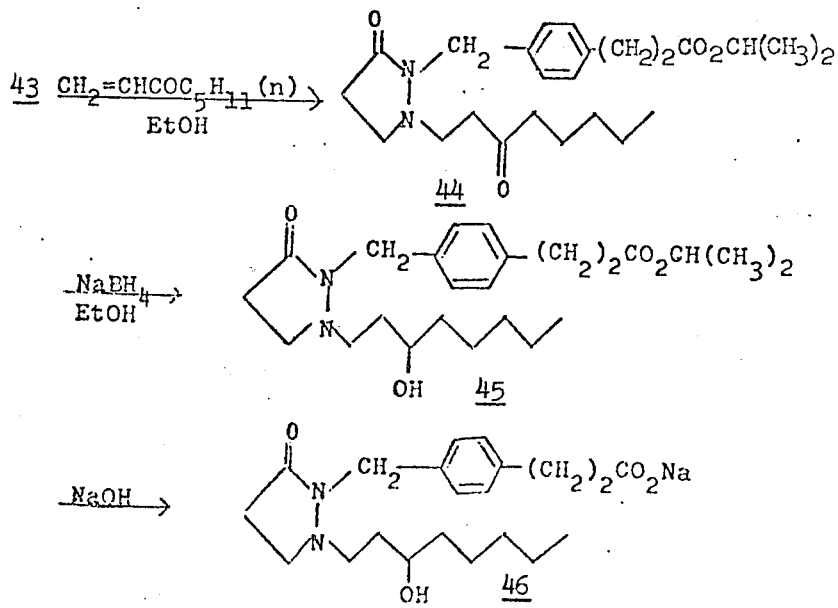

To a solution of 3.02 g of 43 in 25 ml ethanol is added 1.44 g of amyl vinyl ketone and the resulting solution is stirred at room temperature for about 16 hrs. This gives a solution of ketone 44 which is then cooled in ice and treated with 0.8 g of sodium borohydride. The reaction mixture is stirred in the cold for 1 hr and at room temperature for 2 hrs, and then poured into 200 ml of water. Extraction with ether and evaporation of the ether gives an oil that according to thin layer chromatography on silica gel contains ester 45 and some amine 43. This oil is redissolved in ether and washed with 0.5N HCl four times, which removes most of the HCl 43 and leaves most of 45 in the ether. Evaporation of the ether gives crude 45 which is further purified by elution from basic alumina of activity grade IV with 2:1 (vol/vol) benzene-ether. By thin layer chromatography on silica gel (2:1 acetone-benzene) the oil 45 is shown to be pure ($R_f = 0.72$); HRMS Calcd. for $C_{24}H_{38}N_4O_2$ 418.2829; measured 418.2823; $\lambda_{max}$ 3400, 1750, 1675, 1512, 1160, 820 cm$^{-1}$.

Saponification of an ethanolic solution of 45 with one equivalent of 1.0N sodium hydroxide at room temperature for several days gives the sodium salt 46.

EXAMPLE 19

N-(6-Carboethoxy-n-hexyl)-N'-(3'-hydroxy-n-octyl)pyrazolidine (50) Y=Z=H$_2$, m=0, n=5, R=Et, Na, H, R$^1$=R$^2$=R$^3$=R$^4$=R$^5$=H, Q=CH$_3$, p=3 A)
N(3-oxo-n-octyl)pyrazole (47) and
N(3-hydroxy-n-octyl)-pyrazole (48)

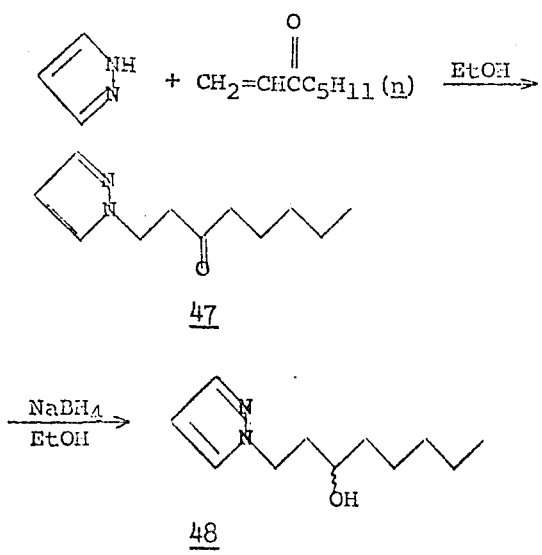

A solution of 17.0 g (0.25 mole) of pyrazole and 38.0 g (0.30 mole) of amyl vinyl ketone in 250 ml of ethanol is heated at reflux temperature for 5 hrs and then cooled in ice, giving a solution of N-(3-oxo-n-octyl) pyrazole (47). To this stirred solution kept at 20°-25° by external cooling is then added in portions 8.0 g of sodium borohydride. When the addition is complete the reaction mixture is allowed to stir for 2 hrs at 25° and then concentrated in vacuo to about 150 ml, poured into 600 ml of water, and extracted with ether. The ether is washed with three 200 ml portions of 5 percent aqueous HCl and the combined HCl layers are backwashed with fresh ether. The HCl solution is then basified with excess Na$_2$CO$_3$ to pH 9 and extracted with ether which, after drying (Na$_2$SO$_4$) and evaporation, gives 30 g (61 percent) of a colorless liquid. According to pmr spectroscopy this is nearly pure N(3-hydroxy-n-octyl)pyrazole (48): (CDCl$_3$, TMS) 449 (d, 1, J = 2, CHN), 445 (d, 1, J = 2, CHN) 373 (t, 1, J = 2, C=CH-C) 259 (t, 2, J = 7, CH$_2$N), 210 (m, 1, OH) Hz at 60 MHz. Distillation of this liquid gives a small foreshot of pyrazole and then 26.5 g of pure 48, bp 95°–100°/.005 Torr; $\lambda_{max}$ (neat) 2.98, 3.42, 3.49, 6.60, 7.27, 9.18 μ; HRMS m/e calcd for $C_{11}H_{20}N_2O$ 196.1575, measured 196.1573.

B)
N-(6-carboethoxy-n-hexyl)-N'(3'-hydroxy-n-octyl)-pyrazolium iodide (49)

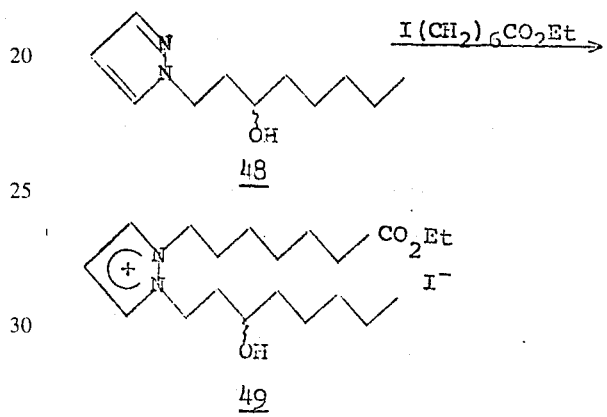

Tetramethylene sulfone or N,N-dimethylformamide can be used as solvents for this reaction, but acetonitrile gives a better yield than N,N-dimethylformamide and an easier workup than tetramethylene sulfone.

A solution of 5.88 g (30 mmoles) of pyrazole alcohol 48 and 10.0 g (35 mmoles) of ethyl 7-iodoheptanoate in 18 ml of dry acetonitrile is heated in a sealed, evacuated glass tube at 135° for 20 hrs. The light yellow reaction mixture is evaporated in vacuo (50°) to remove acetonitrile, giving crude pyrazolium salt 49, which by pmr spectroscopy, contains little or no unchanged 48. The crude product is mixed with 15 ml of 5 percent aq. NaHCO$_3$ and 75 ml of ether in a separatory funnel and the lower (3rd phase) drawn off. This heavy oil is dissolved in 100 ml of ethyl acetate and washed with a few ml of water containing a few crystals of Na$_2$S$_2$O$_3$ to remove iodine. The clear, colorless ethyl acetate solution is dried over anhydrous Na$_2$SO$_4$ and evaporated in vacuo, giving 10.8 g (75 percent) of the pyrazolium salt 49. TLC (silica gel, acetone) indicates a single polar component. The pmr spectrum is quite characteristic: (COCl$_3$, TMS) 516 (t[or two overlapping doublets] 2, J = 2.5, CH-N), 404 (t, 1, =2.5,−CH,−285 (m, 4, NCH$_2$), 240 (q, 2, J = 7, OCH$_2$), 73 (t, 3, J = 7 OCH$_2$CH$_3$) Hz at 60 MHz.

C)
N-(6-carboethoxy-n-hexyl)-N'-(3'-hydroxy-n-octyl)-pyrazolidine (50)

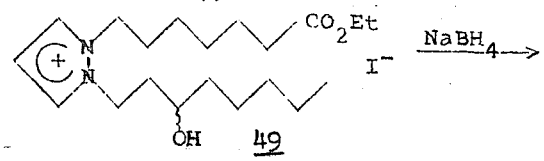

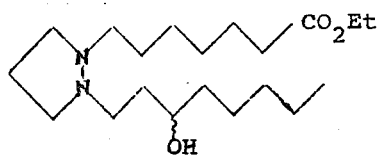

50

A solution of 5.8 g (12 mmoles) of the pyrazolium salt 49 in 100 ml of anhydrous ethyleneglycol dimethyl ether is stirred with 0.8 g (21 mmoles) of analytical grade sodium borohydride at room temperature for 16 hrs under nitrogen. The mixture is evaporated to dryness at 30° in vacuo, cautiously mixed with 100 ml of 2.5 percent aq. HCl, and mixed with ether in a separatory funnel. The ether layer is carefully separated and the aqueous layer together with the oily (third) phase basified with excess $Na_2CO_3$ to pH 9. Extraction with two 100 ml portions of ether and evaporation of the dried ether layer gives 2.5 g of oil that was applied to benzene to a column of 90 g of basic, activity grade IV alumina. Elution with benzene and then with 25:75 ether-benzene gives 1.56 g of a colorless mobile liquid, the pyrazolidine 50; $\lambda_{max}$ (neat) 3400 (OH), 1725 ($CO_2Et$) $cm^{-1}$; one component by TLC (silica gel, 2:1 acetone-benzene, iodine visualization) $R_f = 0.54$; HRMS calculated for $C_{20}H_{40}N_2O_3$ 356.3037, measured 356.3040.

Better yields of the pyrazolidine 50 can be obtained by addition of acid to the reduction mixture. The favorable effect of acid is believed due to protonation and subsequent reduction of a pyrazoline intermediate (51), e.g.

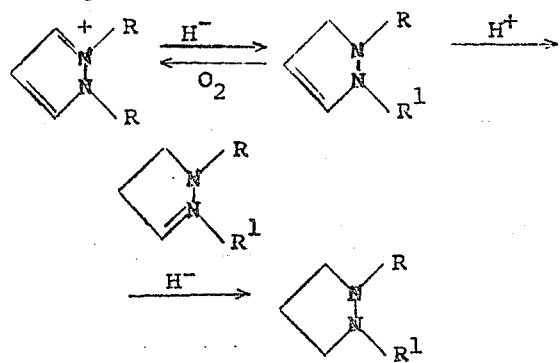

where R and $R^1$ are the side chains of pyrazolium salt 49 and pyrazolidine 50. Apparently in the absence of a sufficient proton source the pyrazolidine 51 is a major product of the reduction and it can be easily oxidized by air during the workup to give the original pyrazolium salt. An example of the improved reduction precedure follows:

A solution of 14.4 g (30 mmoles) of pyrazolium salt 49 in 100 ml of anhydrous ethyleneglycol dimethyl ether is stirred with 1.25 g (33 mmoles) of pure sodium borohydride at room temperature in a stoppered flask for 64 hrs. Glacial acetic acid (9.2 ml, 160 mmoles) is then added slowly with stirring and then 1.30 g of sodium borohydride added in portions with cooling in a water bath over about 5 minutes. After 10 min. an additional 1.30 g of sodium borohydride is added. The additions are accompanied by some foaming. After two hours another 1.30 g of sodium borohydride is added and then the reaction mixture stirred for one day at room temperature under nitrogen. The reaction mixture is evaporated in vacuo and then treated cautiously with 90 ml of 30 percent acetic followed by 70 ml of 2.5 percent HCl and enough additional water to make a total volume of about 200 ml. Concentrated HCl is then added to pH = 1 or 2, and the whole extracted twice with ether. The ether layer is evaporated and the resulting mixture of acetic acid and product treated with excess 5 percent $Na_2CO$ and extracted with ether. The ether extract is washed with 5 percent aqueous $NaHCO_3$, dried and evaporated, to give 8.51 g (79 percent) of pyrazolidine 50 as a colorless oil; $R_f$ (as above) 0.50; HRMS calcd for $C_{20}H_{40}N_2O_3$: 356.3037, measured 356.3058.

D)
N(6-Carboxy-n-hexyl)N'-(3'-hydroxy-n-octyl)-pyrazolidine sodium salt (52)

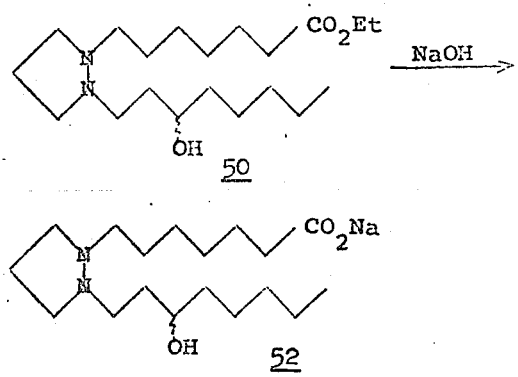

Pyrazolidine 50 10.0 g (28 mmoles) in 50 ml of ethanol and 14 ml of 2.0N sodium hydroxide is heated at reflux temperature for 4 hrs., allowed to stand overnight, and then evaporated to dryness at 60° in vacuo. The residue is taken up in a little water, extracted twice with ether, and then the aqueous phase evaporated to dryness at 60° in vacuo to give sodium salt 52 as a colorless powder.

Acidification of 52 with one or two equivalents of mineral acid HX gives, respectively, the corresponding carboxylic acid (53) and the corresponding carboxylic acid salt (54)

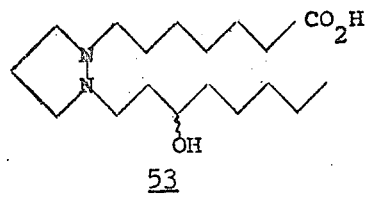

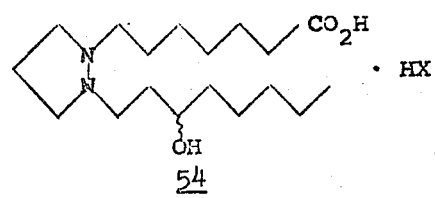

If a ketone Col. Col. A of Table V is substituted for amyl vinyl ketone in the above Example (Part A) there is obtained the keto alkyl pyrazole of Col. B instead of N(3'-oxo-n-octyl)pyrazole. Reduction of the keto alkyl pyrazole of Col. B with $NaBH_4$ yields the hydroxyalkyl pyrazole of Col. C. Substitution of the hydroxyalkyl pyrazole of Col. C for N-(3-oxo-n-octyl)-pyrazole and substitution or the omega-haloalkanoic acid ester of Col. D for ethyl 7-iodoheptanoate in Part B provides the pyrazolium salt of Col. E. Substitution or the pyrazolium salt of Col. E for the pyrazolium salt of Part C, in the first or second (improved) procedure gives the N,N'-disubstituted pyrazolidine of Col. F. Saponification of the ester of Col. F with NaOH (or the hydroxide of any other physiological acceptable alkali metal) as in Part NaOH. corresponding metal salt; in the case of NaOH this salt being the salt of Col. G.

If the ketoalkyl pyrazole of Col. B is treated with the corresponding organometallic reagent of Col. H by a procedure analogous to the procedure used in Examples 8–10, the corresponding tertiary carbinol pyrazole of Col. I is obtained. Alkylation of the pyrazole of Col. I with the corresponding omega-haloalkanoic acid ester of Col. D as in Part B of the above Example affords the pyrazolium salt which can be reduced with $NaBH_4$ as in (A) and then saponified to the carboxylate salt of Col. J by treatment with one equivalent of NaOH.

TABLE V

| Col. A | Col. B |
|---|---|
| a) $CH_2=CHCO(CH_2)_7CH_3$ | a) 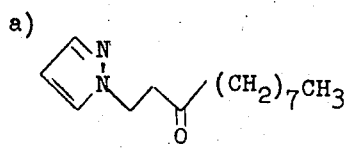 |
| b) $CH_2=CHCO(CH_2)_4CH_3$ | b) 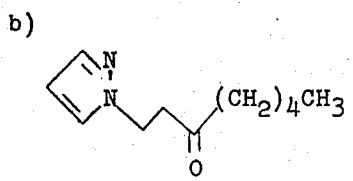 |
| c) $CH_2=CHCOCF_2CH_2CH_3$ | c) 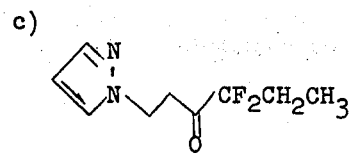 |
| d) $CH_2=CHCO(CH_2)_3CF_2CH_3$ | d) 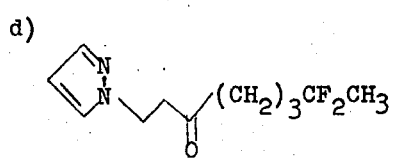 |
| e) $CH_2=CHCO(CH_2)_4CF_3$ | e) 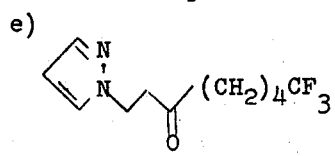 |
| f) $CH_2=C-CO(CH_2)_6CH_3$<br>　　　$\overset{|}{C_2H_5}$ | f) 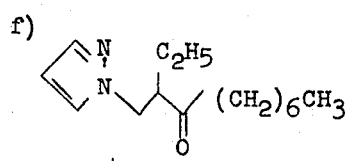 |
| g) $CH_2=CHCO(CH_2)_4CF_3$ | g) 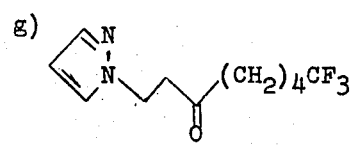 |
| h) $CH_2=CHCO(CH_2)_6CH_3$ | h) 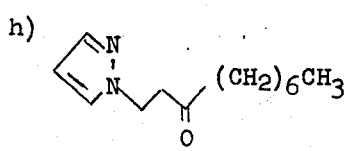 |

TABLE V (continued)
| Col. A | Col. B |
|---|---|
| i) CH$_2$=CHCOCF$_2$(CH$_2$)$_4$CH$_3$ | i) 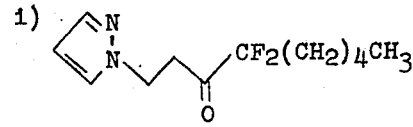 |
| j) CH$_2$=CHCOCHFCH$_2$CF$_2$CH$_3$ | j) 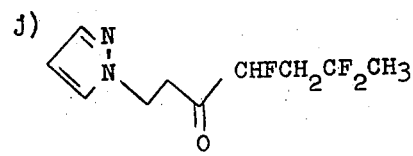 |
| k) CH$_2$=CHCOCF$_2$CH$_2$CH$_3$ | k) 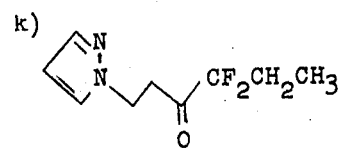 |
| l) CH$_2$=C-COC(CH$_3$)$_2$(CH$_2$)$_5$CH$_3$<br>     CH$_3$ | l) 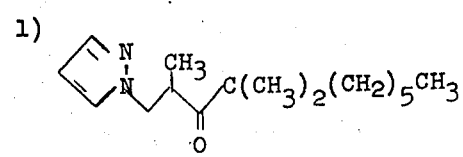 |
| m) CH$_2$=CHCOC(C$_2$H$_5$)$_2$CH$_2$CH$_3$ | m) 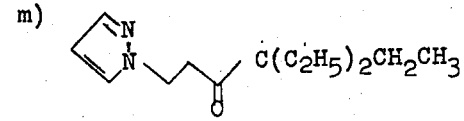 |
| n) CH$_2$=CHCOCH$_3$ | n) 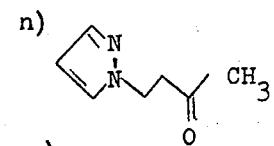 |
| o) CH$_2$=CHCO(CH$_2$)$_4$CF$_3$<br>     CH$_3$ | o) 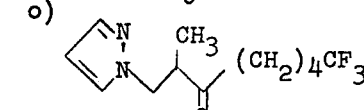 |
| p) CH$_2$=CHCO(CH$_2$)$_2$CF$_3$ | p) 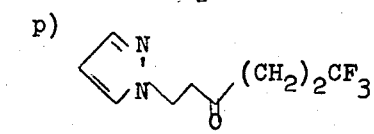 |
| q) CH$_2$=CHCOCF$_2$C$_2$H$_5$ | q) 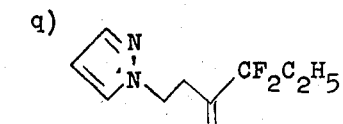 |
| r) CH$_2$=C-COCHF(CH$_2$)CF$_3$<br>     C$_2$H$_5$ | r) 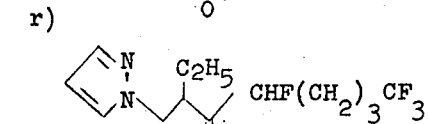 |
| s) CH$_2$=CHCO(CH$_2$)$_4$CH$_3$ | s) 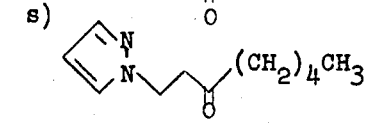 |

TABLE V (continued)
| Col. C | Col. D |
|---|---|
| a) 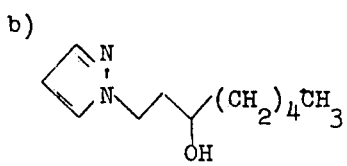 | a) I(CH$_2$)$_6$CO$_2$tBu |
| b) 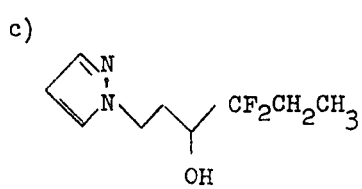 | b) " |
| c) 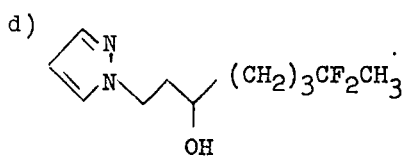 | c) BrCH$_2$CH=CH(CH$_2$)$_3$CO$_2$C$_2$H$_5$ |
| d) 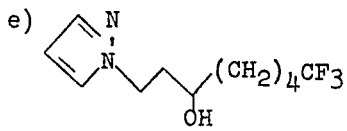 | d) " |
| e) 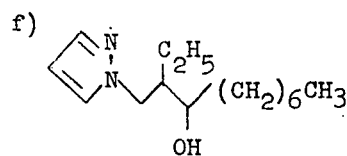 | e) ICH$_2$C≡C(CH$_2$)$_3$CO$_2$CH$_3$ |
| f) 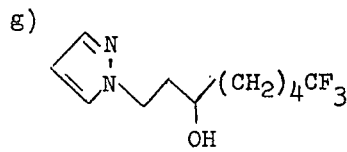 | f) ICH$_2$C≡C(CH$_2$)$_3$CO$_2$CH$_3$ |
| g) 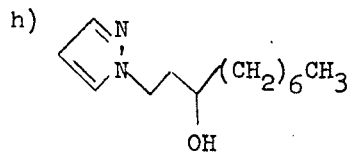 | g) I(CH$_2$)$_6$CO$_2$—⬠ |
| h) 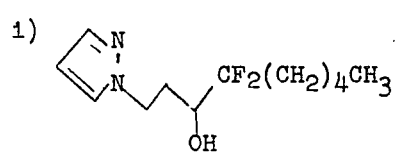 | h) " |
| i) 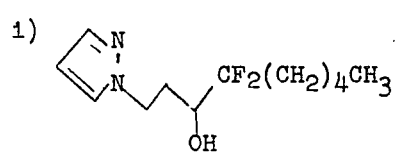 | i) ClCH$_2$—⌬—(CH$_2$)$_4$CO$_2$CH$_3$ |

TABLE V (continued)
| Col. C | Col. D |
|---|---|
| j) 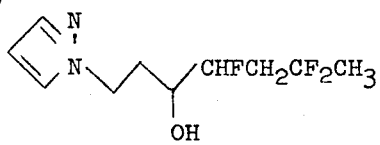 | j) ClCH$_2$—C$_6$H$_4$—(CH$_2$)$_4$CO$_2$CH$_3$ |
| k) 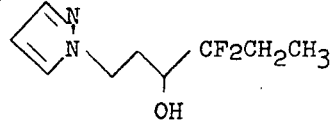 | k) 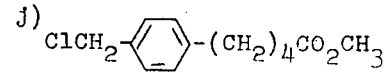 |
| l) 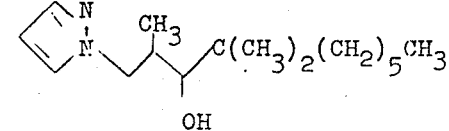 | l) " |
| m) 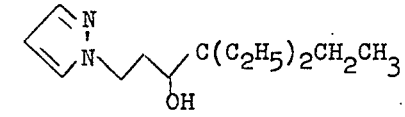 | m) 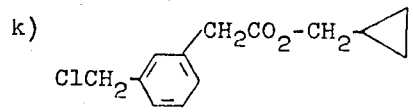 |
| n) 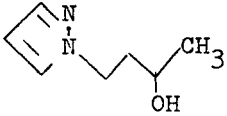 | n) BrCH$_2$—C$_6$H$_4$—(CH$_2$)$_4$CO$_2$tBu |
| o) 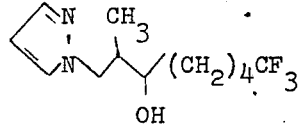 | o) " |
| p) 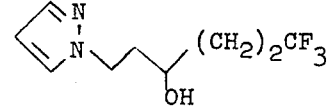 | p) ICH$_2$CH=CH(CH$_2$)$_3$CO$_2$CH$_3$ |
| q) 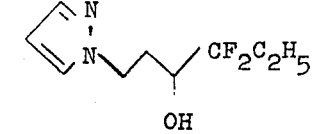 | q) " |
| r) 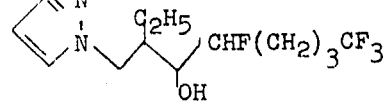 | r) I(CH$_2$)$_3$CO$_2$—cyclopentyl |

TABLE V (continued)
Col. C
s) 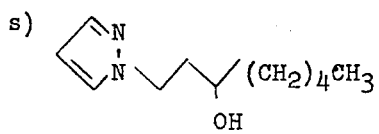
Col. E
a) 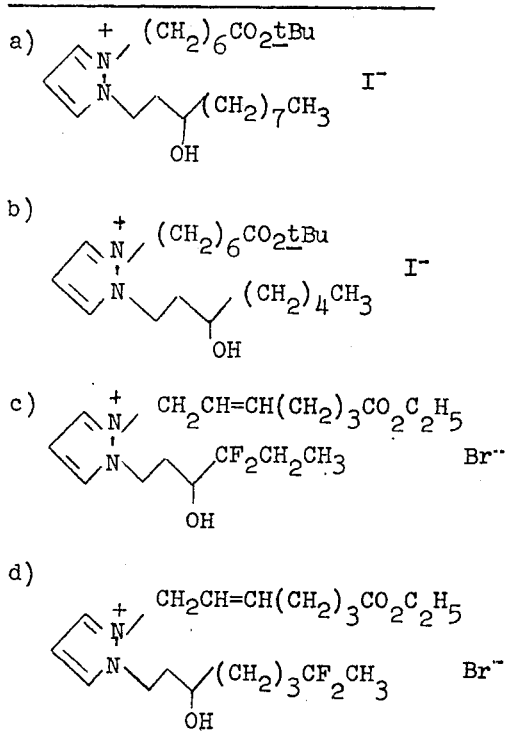
b)
c)
d)
e) 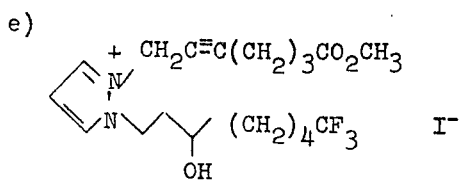
f) 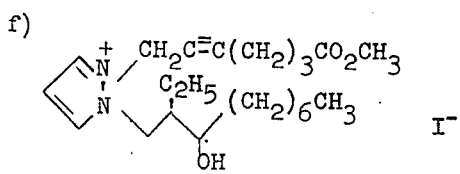
g) 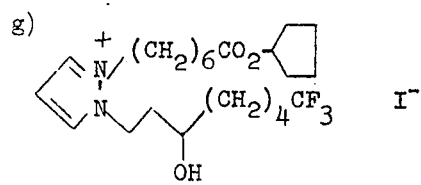
Col. D
s) $I(CH_2)_6CO_2C_{10}H_{11}(n)$
Col. F
a) 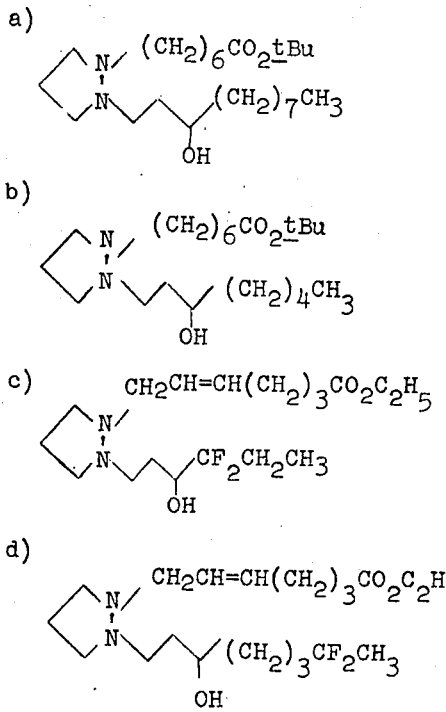
b)
c)
d)
e) 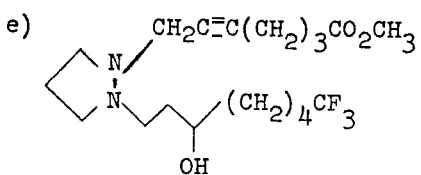
f) 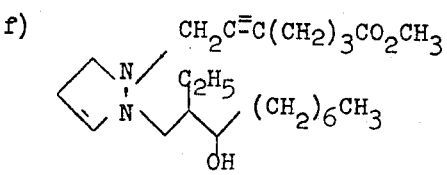
g) 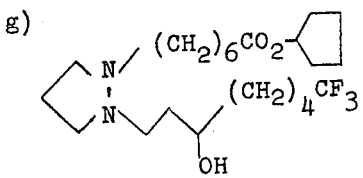

TABLE V (continued)
| Col. E | Col. F |
|---|---|
| h) 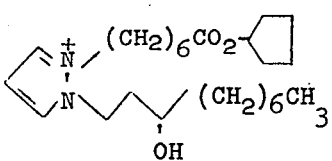 | h) 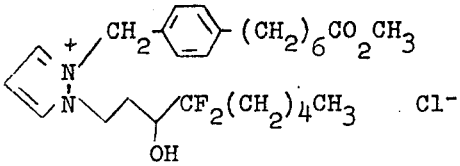 |
| i) 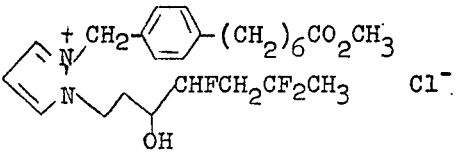 | i) 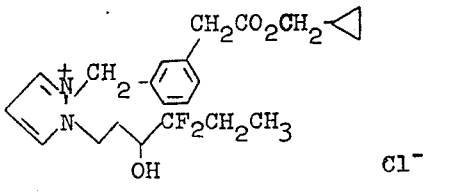 |
| j) 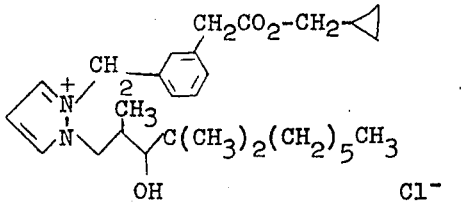 | j) 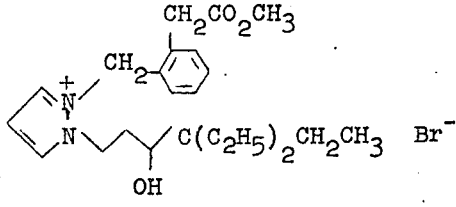 |
| k) 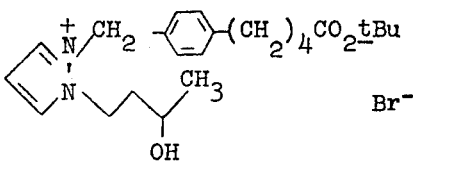 | k) 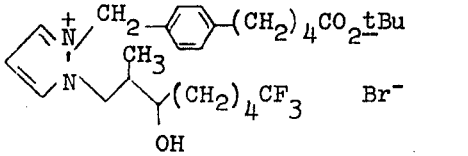 |
| l) 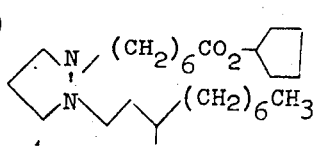 | l) 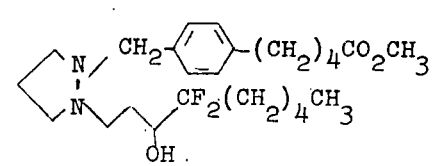 |
| m) 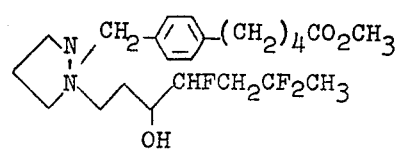 | m) 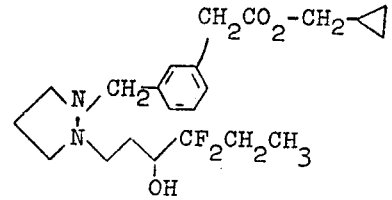 |
| n) 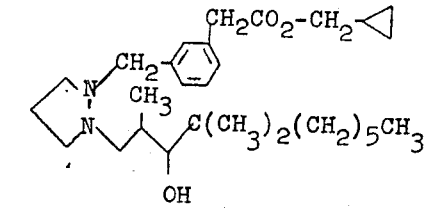 | n) 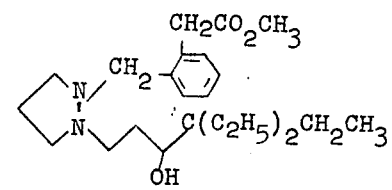 |
| o) 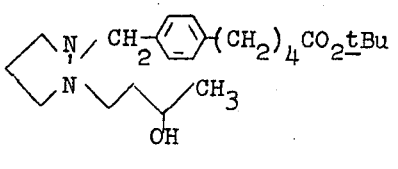 | o) 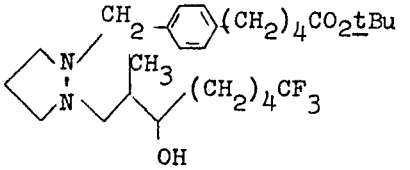 |

TABLE V (continued)
Col. E
p) 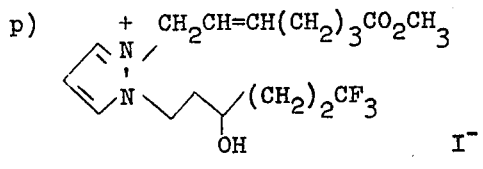 I⁻
q) 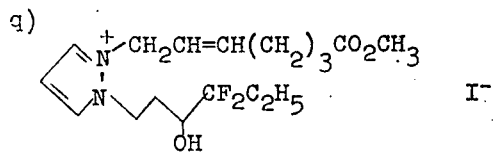 I⁻
r) 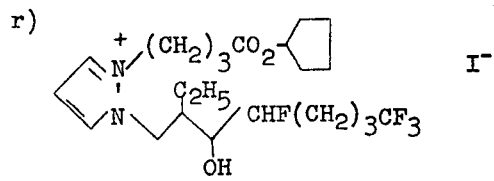 I⁻
s) 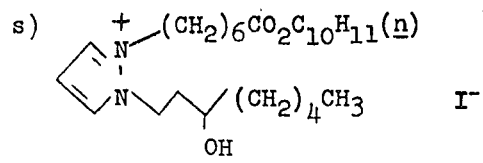 I⁻
Col. F
p) 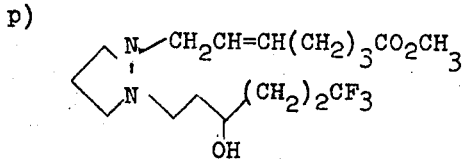
q) 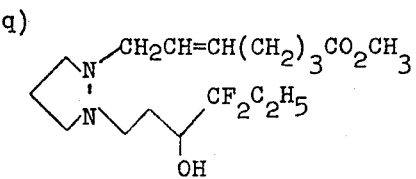
r) 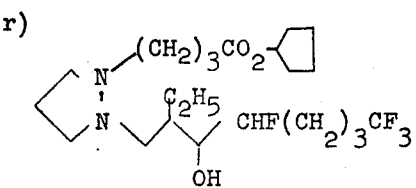
s) 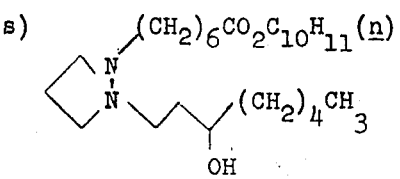
Col. G
a) 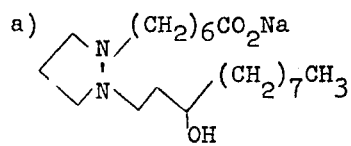
b) 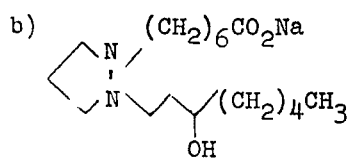
c) 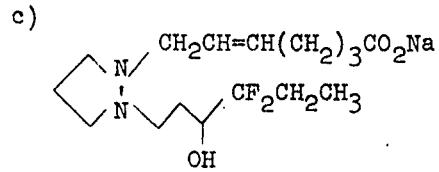
d) 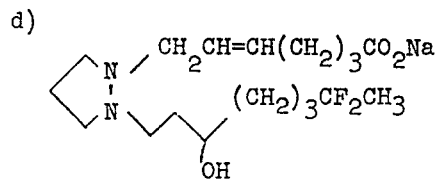
Col. H
a) 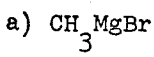
b) 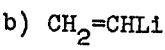
c) 
d) 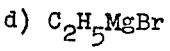

TABLE V (continued)
| Col. G | Col. H |
|---|---|
| e) 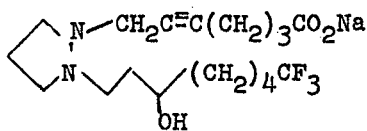 | e) HC≡CNa·EDA |
| f) 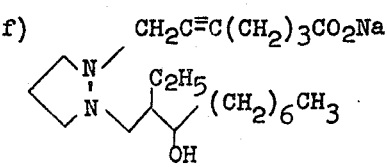 | f) -- |
| g) 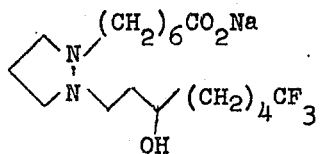 | g) CH$_3$MgBr |
| h) 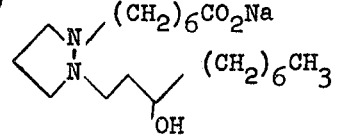 | h) CH$_2$=CHLi |
| i) 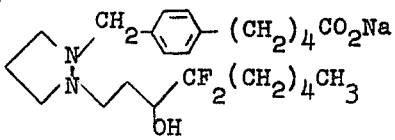 | i) -- |
| j) 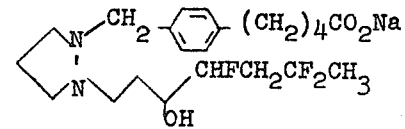 | j) -- |
| k) 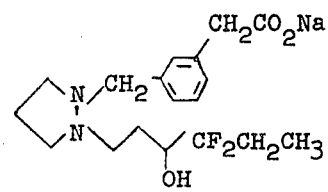 | k) -- |
| l) 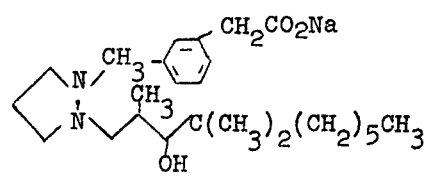 | l) -- |

TABLE V (continued)
Col. G
m) 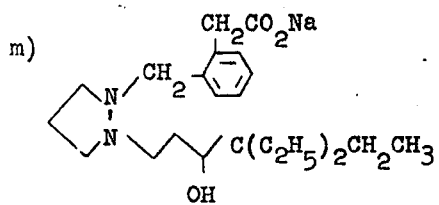
n) 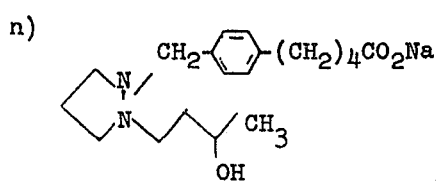
o) 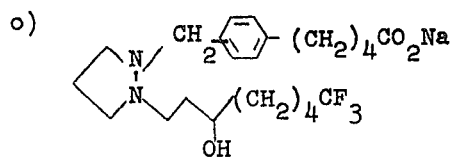
p) 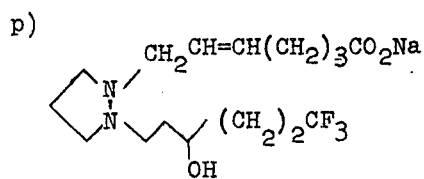
q) 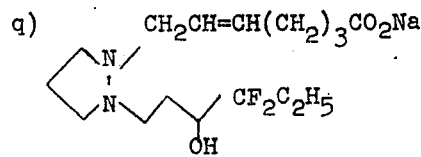
r) 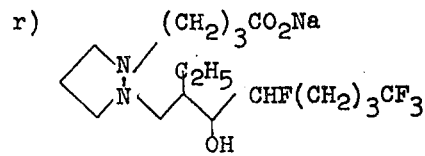
s) 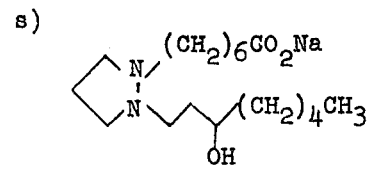
Col. I
a) 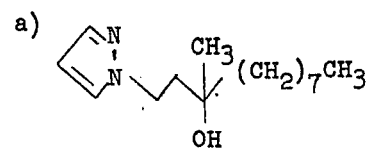
Col. H
m) --
n) HC≡CNa
o) --
p) $C_2H_5MgBr$
q) --
r) --
s) $CH_3MgBr$
Col. J
a) 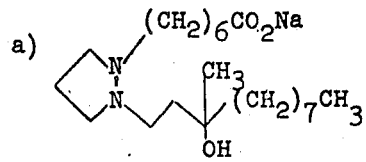

TABLE V (continued)
| Col. I | Col. J |
|---|---|
| b) 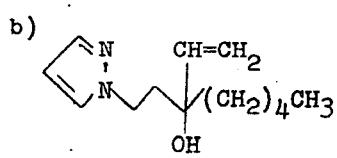 | b) 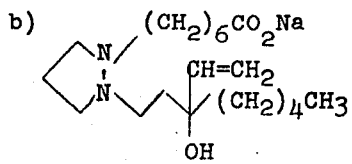 |
| c) -- | c) -- |
| d) 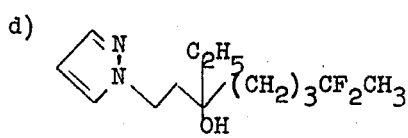 | d) 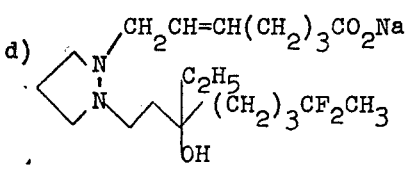 |
| e) 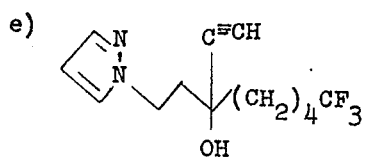 | e) 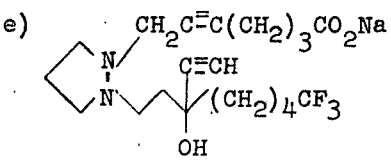 |
| f) -- | f) -- |
| g) 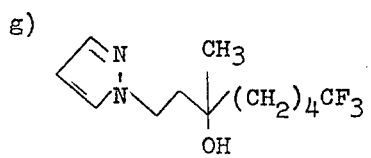 | g) 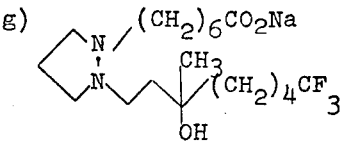 |
| h) 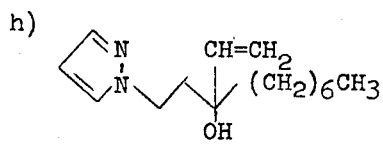 | h) 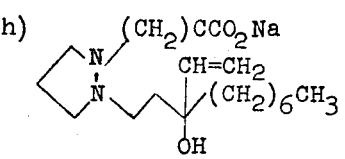 |
| i) - m) -- | i) - m) -- |
| n) 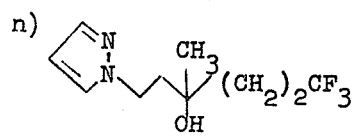 | n) 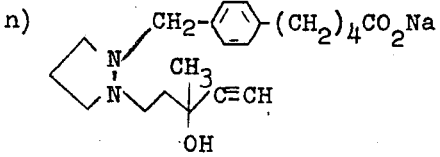 |
| o.) -- | o) -- |
| p) 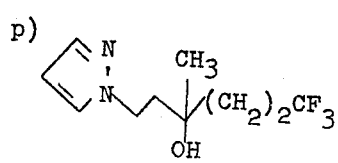 | p) 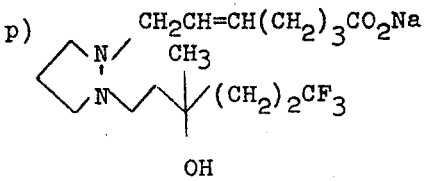 |

TABLE V (continued)

Col. I q) -- r) -- s) 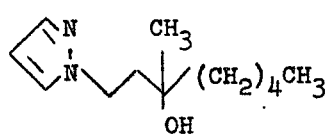

Col. J q) -- r) -- s) 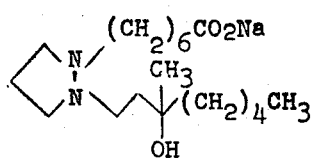

Alternatively many of the pyrazolidines of this invention can be made by reduction of the corresponding 3-pyrazolidinone. The reagent of choice for effecting this reduction is diborane.

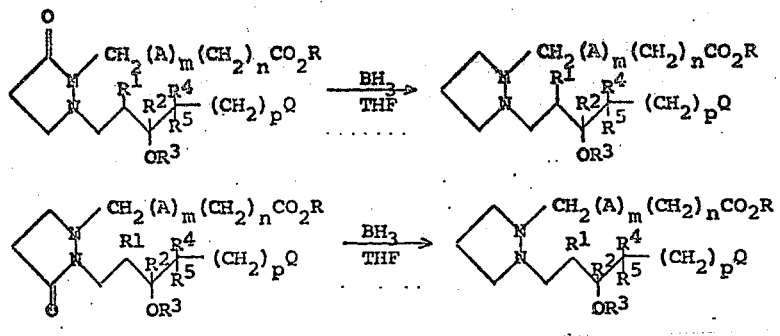

EXAMPLE 20

N(6-Carboxy-n-hexyl)N'-(3'-hydroxy-8',8',8'-trifluoro-n-octyl)pyrazolidine hydrochloride (55) Y = Z = $H_2$, m = 0, n = 5, R = $R^1$ = $R^2$ = $R^3$ = $R^4$ = $R^5$ = H, Q = $CF_3$, p = 3

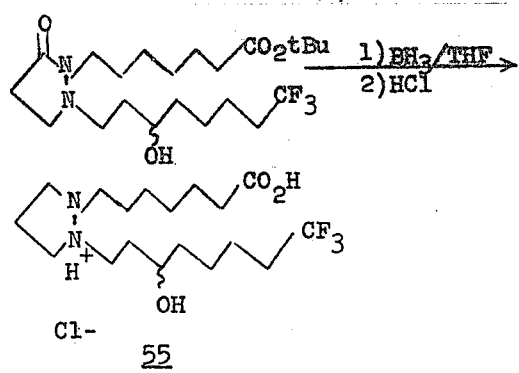

To a solution of 0.226 g of 7[3'-oxo-1'(3''-hydroxy-8'',8'',8''-trifluoro-n-octyl)]heptanoic acid t-butyl ester (Example 11) in 5 ml of dry tetrahydrofuran is added 1.5 ml of 1M diborane in tetrahydrofuran. The reaction mixture is refluxed for 1 hr, cooled, and 1.0 ml of 2.0M aqueous HCl is added. The resulting mixture is refluxed for 1 hr and then stirred at room temperature overnight. Evaporation of the mixture to dryness under a vacuum gives a solid. Extraction of the solid with ethanol and evaporation of the clear ethanolic solution gives a colorless oil which is mainly the desired carboxylic acid 55. HRMS on the silylated product in pyridine shows a parent ion with m/e 526.3208; calcd for the disilyl derivative $C_{24}H_{49}F_3O_3N_2Si_2$ 526.3331.

When a carbinol of Col. A of the following Table VI is treated with an excess of the corresponding alkanoic anhydride of Col. B, the ester of Col. C is obtained. When the carbinol is a secondary alcohol the reaction is conveniently carried out in pyridine at room temperature for 12–24 hrs. When the carbinol is a tertiary alcohol a mixture of the tertiary alcohol and alkanoic anhydride in benzene is treated with a 2-molar excess of 4-dimethylaminopyridine at room temperature until thin layer chromatography indicates that the esterification is complete. In both processes the excess alkanoic anhydride is decomposed by stirring the reaction mixture with 50 percent aqueous pyridine and then the ester is isolated by conventional means such as extraction and column chromatography.

TABLE VI
| Col. A | Col. B |
|---|---|
| a) 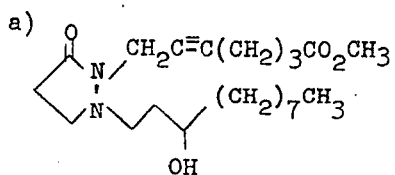 | a) $(CH_3CO)_2O$ |
| b) 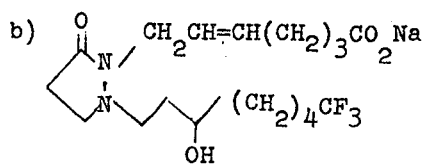 | b) $(CH_3CH_2CO)_2O$ |
| c) 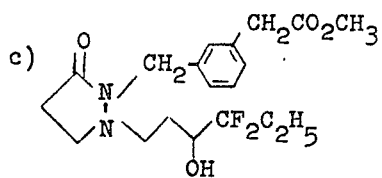 | c) $(CH_3(CH_2)_2CO)_2O$ |
| d) 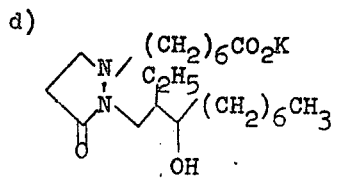 | d) $((CH_3)_2CHCO)_2O$ |
| e) 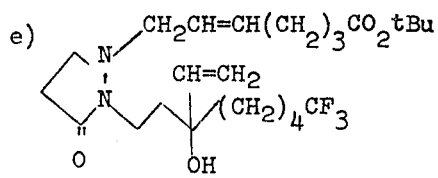 | e) $(CH_3O)_2O$ |
| f) 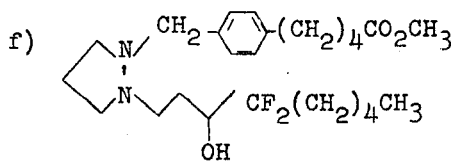 | f) $(CH_3CH_2CO)_2O$ |
| g) 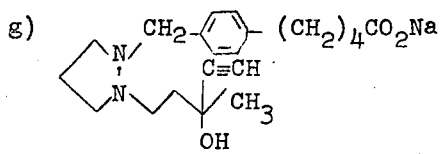 | g) $(CH_3CO)_2O$ |
| Col. C | Col. C |
|---|---|
| a) 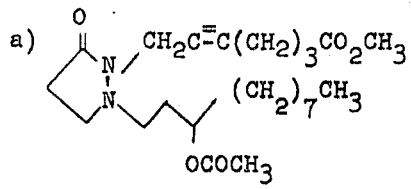 | b) 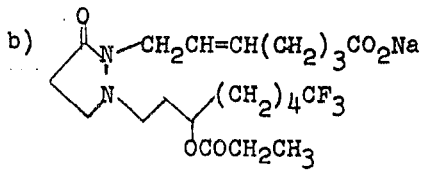 |

TABLE VI (continued)

Col. C c) 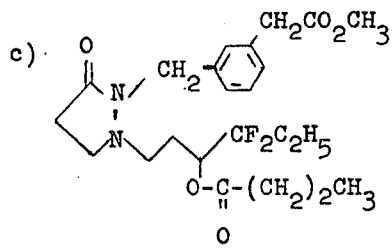

d) 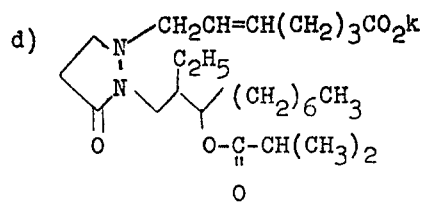

e) 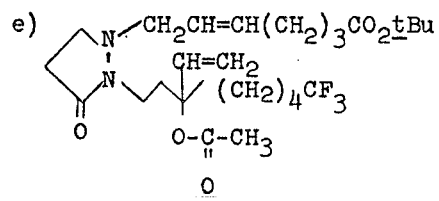

Col. C f) 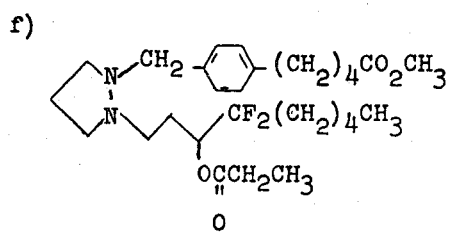

g) 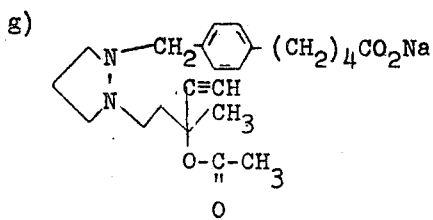

The new compounds wherein Y=O, Z=H$_2$ and R$^2$=R$^3$=H are obtained by

A. contacting a 3-pyrazolidinone of the formula

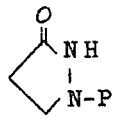

wherein P is a blocking group with a substantially equimolar amount of an Ω-halogenated carboxylate of the formula $$XCH_2(A)_m(CH_2)_nCO_2R$$

wherein X is chlorine, bromine or iodine, in the presence of a base and solvent, to produce a compound of the formula

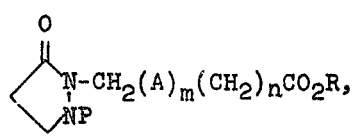

B. removing the blocking group P from the product of step (A) under mild conditions such as hydrogenation or by hydrolysis with a molar equivalent of base, e.g., an alkali metal hydroxide, to produce a compound of the formula

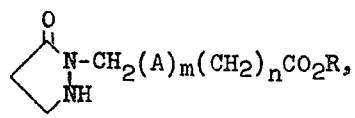

(C) contacting the product of step (B) with a substantially equimolar amount of an unsaturated ketone having a formula selected from the group consisting of (1) 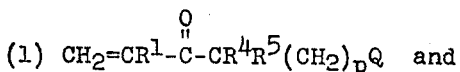 and (2) 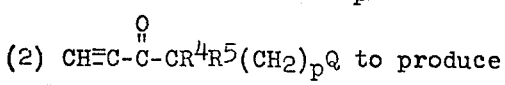 to produce a product having a formula selected from the group consisting of (3) 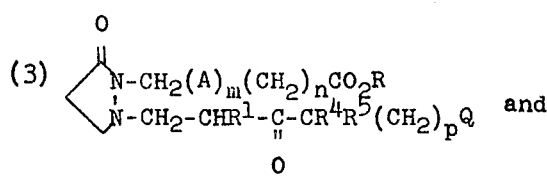 and (4) 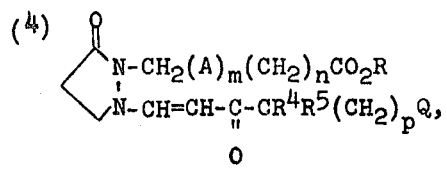

(D)(a) reducing the keto group of the product of step (C)(3) to give the corresponding alcohol of the formula (5) 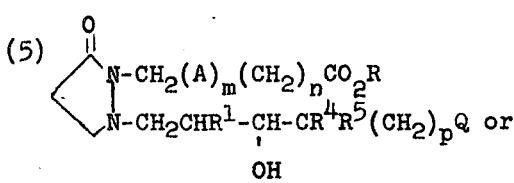 or b. reducing the keto group and the conjugated ethylenic group of the product of step (C)(4) to give the corresponding alcohol of the formula (6)
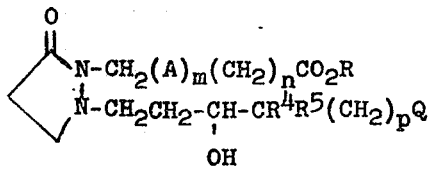

wherein the values for R, $R^1$, $R^4$, $R^5$, A, m, n, p and Q are as stated above.

To produce a compound in which Y=O, Z=$H_2$, $R^1$=$R^3$=$R^4$=$R^5$=H, and $R^2$ is other than hydrogen, the ketone compound

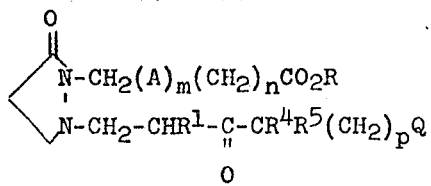

is reacted with a metal hydrocarbyl compound such as a Grignard reagent $R^2MgX$, or an alkyl lithium compound, $R^2Li$ to give the alcohol.

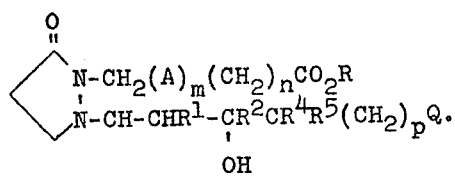

To produce a compound in which Y=O, Z=$H_2$ and $R^3$ is other than hydrogen, a hydroxy compound selected from the group

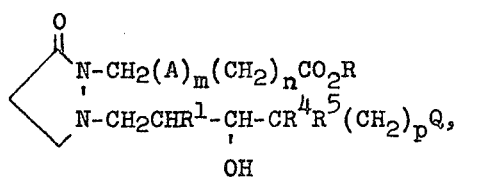

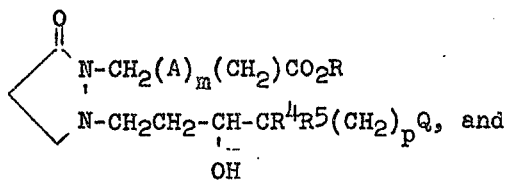

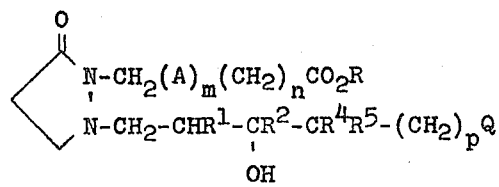

is reacted with an acylating compound having the formula $R^3X$ or $(R^3)_2O$ in which $R^3$ is an alkanoyl group of 2 to 4 carbon atoms and X is chlorine bromine or iodine. The OH group is thus converted to the ester group $OR^3$.

The compounds wherein Z=O, Y=$H_2$ and $R^2$=$R^3$=H are obtained by essentially the same reactions except that the sequence of steps (B) and (D) above are reversed; that is, a 3-pyrazolidinone of step (A) above is reacted with an unsaturated ketone of step (D), removing the blocking group and then reacting with omega-halogenated carboxylate of step (B).

The above compounds where $R^2$ is other than hydrogen are obtained by reacting the corresponding ketone compounds with a metal hydrocarbyl compound as shown with the compounds where Y=O and Z=$H_2$.

Likewise, the above compounds where $R^3$ is other than hydrogen are obtained by reacting the corresponding hydroxy compound with an acylating agent, in the same fashion as those compounds where Y=O and Z=$H_2$.

A compound wherein Y=Z=$H_2$ is obtained by the process which comprises

A. treating pyrazole at 20°–150°C. with an equimolar amount of an unsaturated ketone having the formula

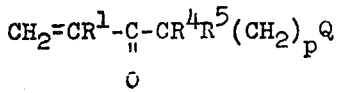

to produce a mono N-alkylated pyrazole of the formula

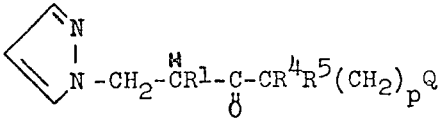

B. reducing the keto group of the product of step (A),
C. heating the product of step (B) with a compound of the formula

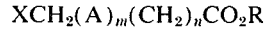

wherein X is chlorine, bromine or iodine to give a pyrazolium salt of the formula

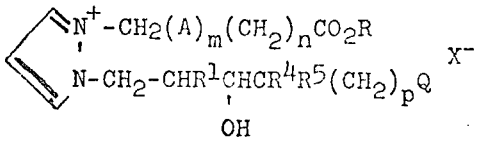

D. reducing the pyrazolium salt of step (C) to give an N,N'-disubstituted pyrazolidine, and
E. optionally acylating the OH group of the product of step (D) with an acylating agent selected from the group consisting of $R^3X$ and $(R^3)_2O$ as stated above. Compounds of the formula

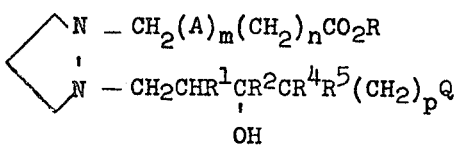

wherein R² is other than H are obtained by reacting the N-alkylated pyrazole of step A with a metal hydrocarbyl such as a Grignard reagent or an alkyl lithium in place of step B followed by heating the reaction product as in step C with a halocarboxylate followed by step D and optionally acylation as in E.

Compounds of the formulas

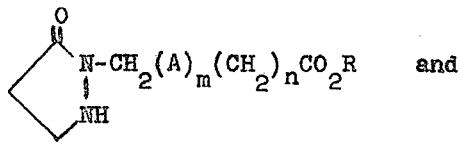

and

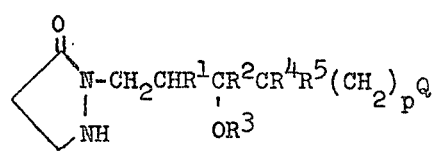

wherein the values for A, R, R¹, R², R³, R⁴, R⁵, m, n, p and Q are as previously stated, are valuable intermediates to the end products of the invention.

The halocarboxylates have the XCH structure $XCH_2(A)_m(CH_2)_nCO_2R$ wherein X is a chlorine, bromine or iodine and A, m, n and R have the values previously stated.

Some of these esters are commercially available, others can be made from the corresponding omega-bromo acids and the appropriate alcohol using conventional methods for esterification (see for example C. Buehler, D. Pearson, Survey of Organic Synthesis, Wiley-Interscience, N.Y. 1970, Chap. 14).

| n | $XCH_2(CH_2)_nCO_2R$ |
|---|---|
| 0 | methyl iodoacetate |
| 1 | ethyl β-bromopropionate |
| 2 | t-butyl 4-bromopropionate |
| 2 | t-butyl 4-chloropropionate |
| 2 | p-chlorobenzyl 4-bromobutyrate |
| 3 | methyl 5-bromobutyrate |
| 3 | n-octyl-5-bromovalerate |
| 3 | iso-octyl-5-chlorovalerate |
| 4 | isopropyl 6-bromohexanoate |
| 4 | valeryl 6-bromohexanoate |
| 4 | tert-butyl 6-bromohexanoate |
| 5 | ethyl 7-bromoheptanoate |
| 5 | t-butyl 7-iodoheptanoate |
| 5 | cyclopentyl 7-bromoheptanoate |
| 5 | cyclohexyl 7-bromoheptanoate |
| 5 | 3-phenylpropyl 7-bromoheptanoate |
| 5 | n-dodecyl 7-bromoheptanoate |
| 6 | t-butyl-8-bromooctanoate |

The iodo esters are made by Finkelstein-halide interchange (Buehler and Pearson, ibid., page 339) (NaI in acetone) with the corresponding bromo ester or, the bromo esters can be used directly for the preparation of the 2-alkanoate derivatives in the presence of sodium iodide, which generates the more reactive iodo ester in situ. The bromo esters also alkylate 1 of Example 1 in the absence of sodium iodide, but more slowly. Dimethylsulfoxide can be used as the solvent, but hexamethylphosphoric triamide (HMPA) is preferred when there is a protective group present that is to be removed by hydrogenolysis in the next step.

The acids $XCH_2(C_6H_4)(CH_2)_nCO_2H$ are prepared by chloromethylation or bromomethylation of the Ω-arylalkanoic acids.

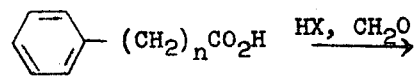

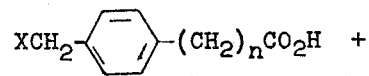

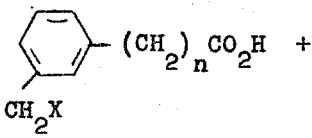

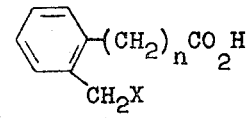

Mixtures of the o, m, and p-isomers are produced by these reactions [I. N. Nazarov et al., Bull. Acad. Sci. USSR, Div. Chem. Sci. 103 (1957)] and the preferred p-isomers are readily isolated by fractional crystallization. From the mother liquors of such crystallizations the corresponding ortho and meta isomers can be isolated by column chromatography or, in the case of their methyl ester derivatives, by preparative gas chromatography.

Chloromethylation is best carried out in the presence of zinc chloride (see G. A. Olah and W. S. Tolygyese in Olah, Friedel-Crafts and Related Reactions, Vol. II, part 2, Chapter XXI, Interscience, 1964). The benzyl chlorides are readily converted to the corresponding benzyl iodides by the action of NaI in acetone.

Although bromomethylation is reported to give less satisfactory yields than chloromethylation (Organic Reactions, Vol. I, Chap. 3, p. 72, Wiley and Sons, N.Y. 1942), in the case of the Ω-phenylalkanoic acids, bromomethylation has been found more convenient. The benzyl bromides obtained are better N-alkylating agents than the corresponding benzyl chlorides, and they need not be converted to the corresponding relatively unstable benzyl iodides before reaction with amines of type 4. Better yields of bromomethylation products are obtained when the reactions are carried out in the absence of added zinc salts.

The Ω-halomethyl alkanoic acids can be converted to their alkyl esters for example by reaction with diazoalkanes in ether or by Fischer (acid catalyzed) esterification with alcohols:

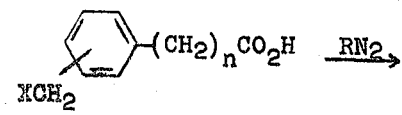

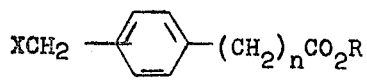

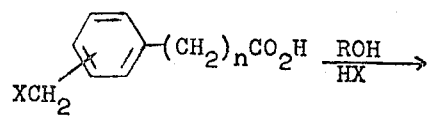

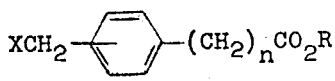

In the latter case yields are increased by using an excess of the alcohol and a drying agent, e.g., 3A or 4A molecular sieves, can be used. t-Butyl esters can be made from reaction of the acids with isobutylene in the presence of sulfuric acid.

Carboxylic containing moieties wherein A is C $\equiv$ C and CH=CH (i.e., m=1) are obtainable as follows. By using homologs of the known acetylenic ester methyl 7-iodoheptynoate $XCH_2C \equiv C(CH_2)_nCO_2CH_3$; X = I, n = 3, R = $CH_3$) [Ferdinandi and Just, Can. J. Chem. 49, 1070 (1971)] the 2-substituted pyrazolidinone acetylenic and ethylenic analogs can be prepared. Starting with an ester of the first column below gives by the analogous sequence of reactions a corresponding acetylenic ester of the second column below, where the halogen is either bromo or iodo depending on whether the metal halide is LiBr or NaI.

| Ester | Acetylenic ester |
|---|---|
| n = 1 ethyl bromoacetate | ethyl 5-halopent-3-ynoate |
| n = 2 ethyl 3-bromopropionate | propyl 6-halohex-4-ynoate |
| n = 3 ethyl 4-bromobutyrate | methyl 7-halohept-5-ynoate |

For the synthesis of ethyl 4-halobut-2-ynoate, the case where n is O, the following synthetic sequence can be used, starting with ethyl propiolate.

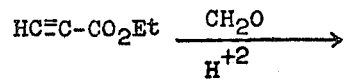

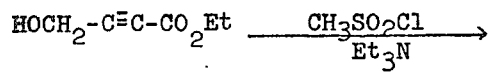

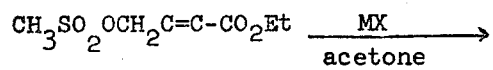

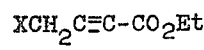

Acetylenic halosubstituted esters of the above general structure are used to prepare the acetylenic and ethylenic analogs (the latter by reduction over $Ni_2B$ or the Lindlar catalyst) by the following sequences of reactions (P is a protective group):

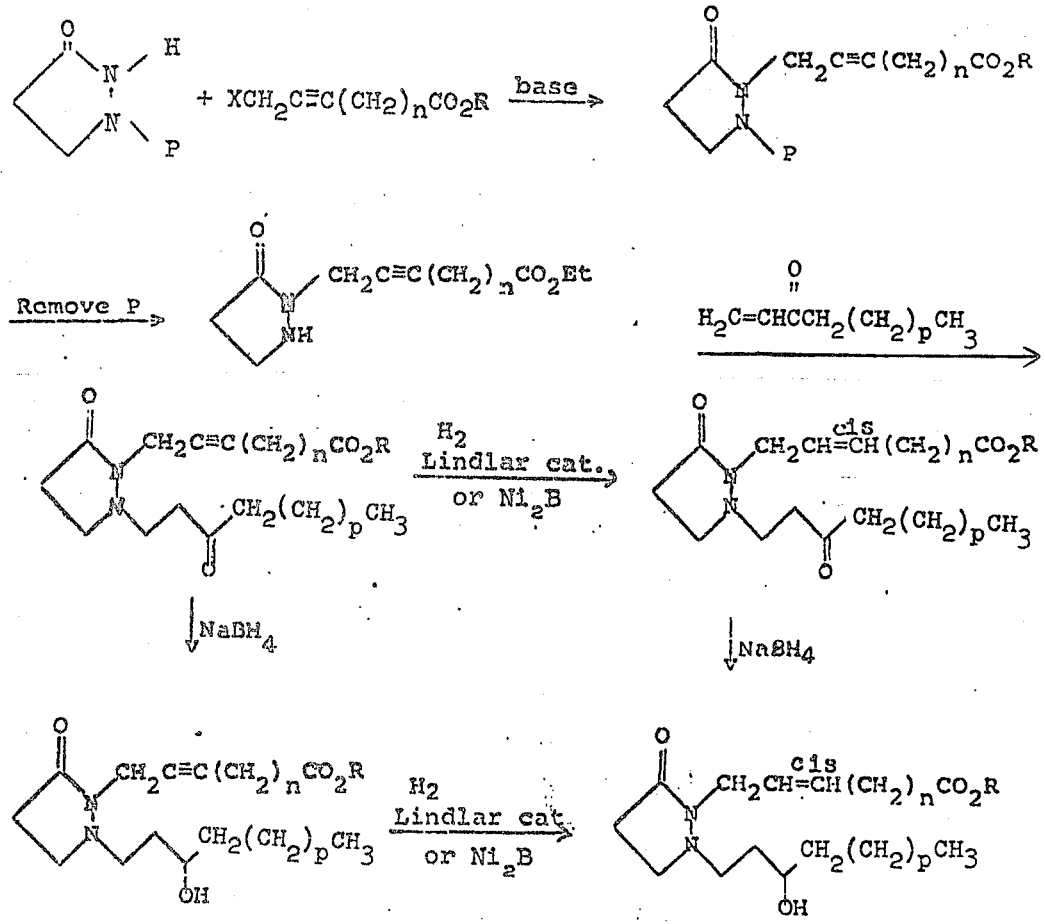

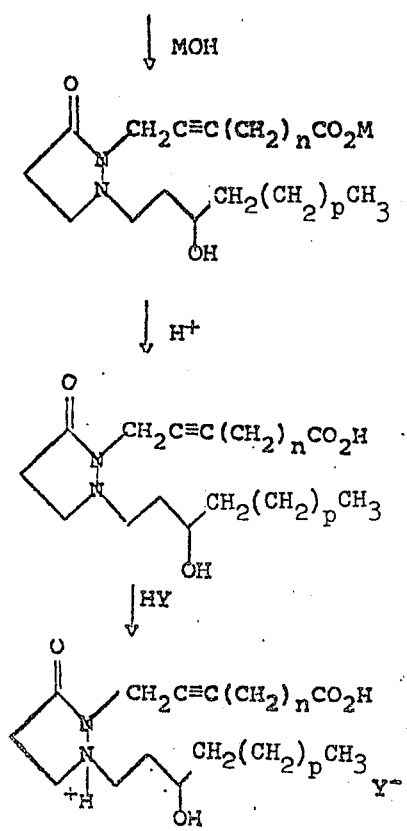

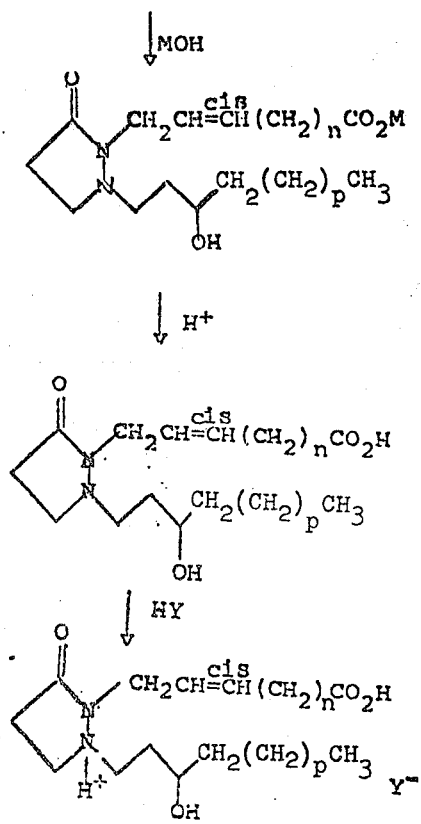

Lindlar catalyst [H. Lindlar, Helv. Chim. Acta 35, 446 (1952)] is palladium on calcium carbonate which has been deactivated by addition of lead acetate and quinoline. This catalyst is inactive toward hydrogenation of olefins and the hydrogenation of acetylenes over this material practically stops after absorption of one mole of hydrogen. Palladium on barium sulfate with synthetic quinoline is a similar catalyst but it is somewhat superior in reproducibility and ease of preparation [D. J. Cram and N. L. Allinger, J. Am. Chem. Soc. 78, 2518 (1956)]. Both catalysts give olefins of the cis configuration. Alternatively nickel boride catalyst ($Ni_2B$), especially that designated P-2 [H. C. Brown and C. A. Brown, JACS 85, 1005 (1963)] can be used to effect catalytic reduction of the acetylenic compounds to cis olefins. The other reactions indicated above are carried out analogously to those described for the preparations given earlier.

The cis-ethylenic analogs represented in the scheme above can also be made by a series of reactions analogous to those described in Example 1 using the cis allylic ω-halo esters $XCH_2CH=CH(CH_2)_nCO_2R$ rather than the saturated ω-haloalkanoate ester $XCH_2(CH_2)_nCO_2R$. For example, reaction of pyrazolidinone hydrochloride with β,β,β-trichloroethylchloroformate gives 1-(β,β,β-trichloroethoxycarbonyl)-3-pyrazolidinone (m.p. 151°–152°) as described earlier. Treatment of the compound with ethyl 7-bromo-5-heptenoate (German Offenlegunschrift 2121361) in the presence of sodium carbonate in hexamethylphosphoric triamide by a procedure analogous to that described in Example 1b, gives 1-(β,β,β-trichloroethoxycarbonyl)-2(6'-ethoxycarbonyl-2'-hexenyl)-3-pyrazolidinone as an oil.

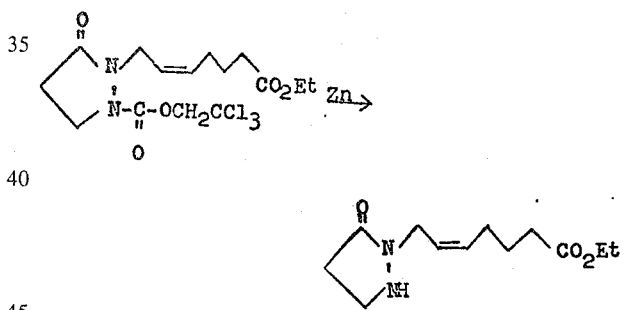

The protective group is smoothly removed by treating a solution of this oil in 90 percent acetic acid with powdered zinc at room temperature for 3 hours and then isolating the 2(6'-ethoxycarbonyl-2-hexenyl)-3-pyrazolidinone through its water-soluble hydrochloride salt as described in Example 1c. The free amine is obtained by careful distillation under high vacuum as described in Example 1c.

This amine can then be treated with one equivalent of 1-octyn-3-one in ethanol as described in Example 1d to give 7[3'-oxo-1'(3''-oxooct-1''-enyl)pyrazolidin-2'-yl]hept-5-en-1-oic acid ethyl ester as an orange-amber oil.

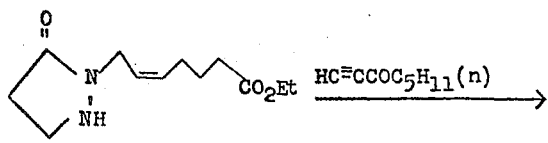

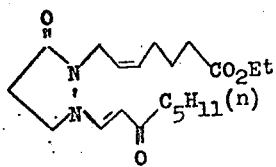

The corresponding mono-unsaturated ketone is obtained by treating the amine with amyl vinyl ketone in ethanol as described in Example Ie-3, giving 7[3'-oxo-1'(3''-oxooctyl)pyrazolidin-2-yl]hept-5-en-1-oic acid ethyl ester, a viscous oil which is colorless when pure. This oil is reduced by sodium borohydride in ethanol as described in Example Ie-3, to give alcohol 7[3'-oxo-1'-(3''-hydroxyoctyl)-pyrazolidin-2'-yl]hept-5-en-1-oic acid ethyl ester.

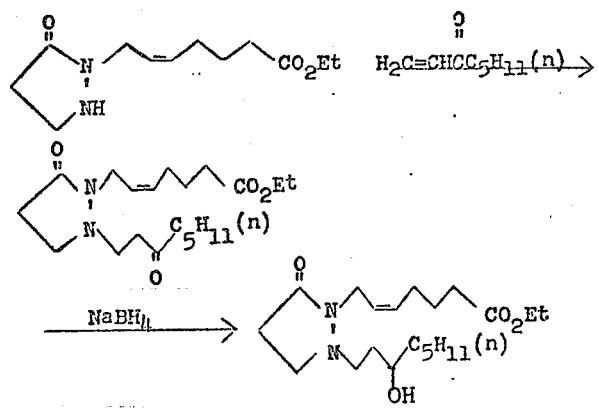

This ester can be converted quantitatively to the corresponding sodium salt of the acid, i.e., 7[3'-oxo-1'(3-hydroxyoctyl)pyrazolidin-2'-yl]hept-5-en-1-oic acid, sodium salt, by treating its solution in methanol with exactly one equivalent of 1.0 N sodium hydroxide. Evaporation of the reaction to dryness after standing at room temperature for several days (under nitrogen) gives the pure sodium salt.

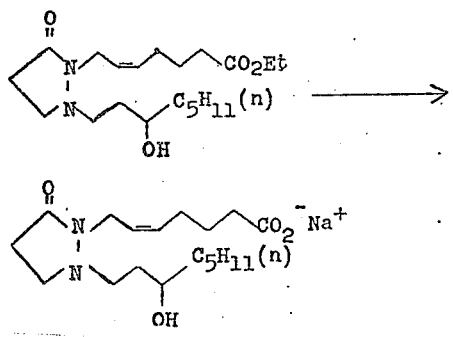

The 3-oxy-aliphatic chain moiety that is present in the novel pyrazolidones and pyrazolidines of this invention are derived from reaction of a vinyl or acetylenic ketone with a pyrazolidone or pyrazole having hydrogen on a nuclear nitrogen to give a 3-oxo compound. If an acetylenic ketone is used, catalytic reduction of the latter compounds over Pd/C or preferably Rh/C affords the corresponding saturated ketones. Alternatively reduction can be carried out by using one equivalent of lithium aluminum hydride in tetrahydrofuran or ether, or by other aluminum hydrides, for example, by sodium bis(2-methoxyethoxy)aluminum hydride in benzene or ether. Preferential reduction of the double bond instead of the keto group, by catalytic reduction or lithium aluminum hydride reduction, is typical of many "vinylogous amides" (Martin, J. Org. Chem,, 31, 943(1966), Walker ibid 27, 4227 (1962)).

When N-alkylation is effected by acetylenic ketones of the formula

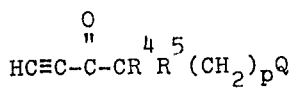

the resulting pyrazole or pyrazolidone has the group

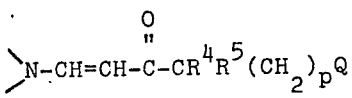

which upon subsequent reduction of the ethylenic double bond gives the group

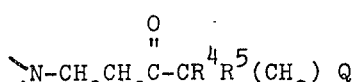

wherein H has replaced R' of the generic formula.

Suitable acetylenic ketones that can be used include those of the above formula wherein $R^4$ and $R^5$ are H and Q is $CH_3$, e.g., p = 0 ethyl ethynyl ketone
p = 1 ethnyl propyl ketone
p = 2 ethynyl butyl ketone
p = 3 amyl ethynyl ketone
p = 4 hexyl ethynyl ketone
p = 5 heptyl ethynyl ketone
p = 6 octyl ethynyl ketone The reduction of the $\alpha,\beta$-double bond is avoided when vinyl ketones are used in place of acetylenic ketones. Vinyl ketones are generally preferred for the reaction. These have the structure

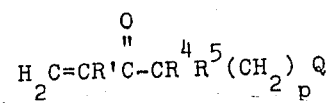

and include, when $R^1 = R^4 = R^5 = H$ and Q = H and $CH_3$, p = 0 methyl vinyl ketone (Q = H)
p = 0 ethyl vinyl ketone (Q = $CH_3$)
p = 1 propyl vinyl ketone
p = 2 butyl vinyl ketone
p = 3 amyl vinyl ketone
p = 4 hexyl vinyl ketone
p = 5 heptyl vinyl ketone
p = 6 octyl vinyl ketone The first two ketones are commercially available; the others are readily prepared by oxidation (e.g., by a Jones' reagent) of the corresponding vinyl alkyl carbinols, e.g., as described above for the preparation of amyl vinyl ketone and heptyl vinyl ketone.

Vinyl ketones of the preceding formula where $R^1$ is H, $CH_3$, or ethyl; $R^4$ is H, $CH_3$, or ethyl, $R^5$ is H, $CH_3$, or ethyl; p is 0–6; and Q is $CH_3$, $CF_2CH_3$, $CF_3$ are prepared by a sequence of reactions represented by the following equations, where X is halogen (Cl, Br, or I):

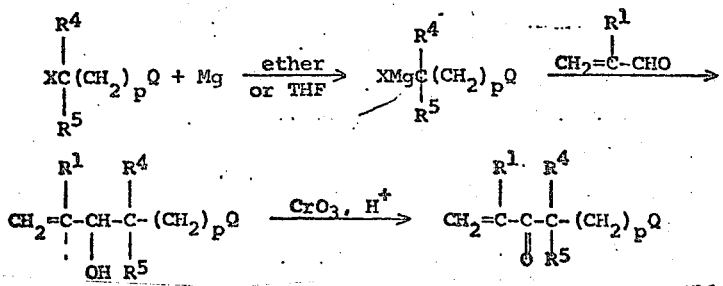

Thus the Grignard reagent derived from the halo compound $XCR^4(R^5)(CH_2)_pQ$ is treated with an unsaturated aldehyde $CH_2=C(R^1)CHO$ to give a carbinol that on oxidation gives the vinyl ketone. The starting halo compounds are either known or available by conventional synthetic methods. Some typical syntheses of $XCR^4(R^5)(CH_2)_pQ$ are:

$Br(CH_2)_7CF_3$ — from reaction of $Br(CH_2)_7CO_2H$ and $SF_4$. (See Example 11).

$BrC(CH_3)_2(CH_2)_5CH_3$ — from reaction of HBr with 2-methyl 2-heptanol.

$I(CH_2)_6CF_3$ — from reaction of $I(CH_2)_6CO_2H$ and $SF_4$. (See Example 11)

$ClC(CH_3)_2(CH_2)_3CF_3$ from reaction of the Grignard reagent derived from $CF_3(CH_2(CH_3 Br$ with acetone followed by reaction of the resulting tertiary carbinol with HCl.

$ICH(CH_2)(CH_2)_2CF_2CH_3$ — from the reaction of 4-chloro-2-butanone with $SF_4$ to give 2,2-difluoro-4-chlorobutanone, followed by reaction of the Grignard reagent of the latter with acetaldehyde and conversion of the resulting secondary alcohol to the mesylate; treatment of the mesylate with sodium iodide in acetone gives the difluoroalkyl iodide.

$BrCH(CH_3)(CH_2)_3CH_3$ — from the action of carbon tetrabromide and triphenylphosphine on 2-pentanol.

$ClC(C_2H_5)_2CH_2CH_3$ — from the action of HCl on triethylcarbinol.

Conversion of halo comounds such as these to the Grignard reagents by reaction with magnesium in ether or tetrahydrofuran, or alternatively to the alkyl lithium derivatives, followed by reaction of the organometallic derivative with the olefinic aldehydes acrolein, methacrolein, or ethacrolein [2-ethyl-2-propenal (column A)] gives vinyl carbinols which are readily oxidized by chromic acid to give the corresponding vinyl ketones, of which the following (column B) are typical.

fluoroacyl chloride with ethylene followed by dehydrochlorination (method 1) or by reaction of the appropriate fluoroaldehyde with vinyl lithium followed by oxidation of the resulting carbinol to the ketone (method 2).

Method 1

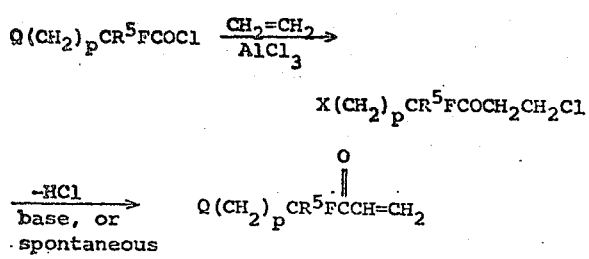

where $R^5$ is H, $CH_3$, or ethyl

The synthesis of alkyl vinyl ketones by this kind of process is well known to take place in the presence of aluminum chloride, stannic chloride, or zinc chloride. The β-chloroketone addition product readily loses HCl either spontaneously or on mild alkaline treatment [Catch et al., J. Chem. Soc. 278 (1948); Colonge and Mostafavi, Bull. Soc. Chim. France, 6 (5), 341 (1939)]. The fluoroacids from which the acylchlorides are prepared are either reported in the literature or easily prepared by methods analogous to those described for the synthesis of closely-related fluoroacids. Several general methods for preparing α-fluoroacids are known [E. L. M. Patteson, et al., Can. J. Chem., 43, 1700 (1965); E. Elkirk et al., Compt. Rend. Ser C, 262 (9), 763 (1966); E. Elkirk, Bull. Soc. Chim. France, 2254 (1964)]

TABLE VII

| Halo Compound | A | B |
|---|---|---|
| $Br(CH_2)_7CF_3$ | methacrolein | $CH_2=C(CH_3)CO(CH_2)_7CF_3$ |
| $BrC(CH_3)_2(CH_2)_5CH_3$ | acrolein | $CH_2=CHCOC(CH_3)_2(CH_2)_5CH_3$ |
| $BrC(CH_3)_2(CH_2)_5CH_3$ | methacrolein | $CH_2=C(CH_3)CO-C(CH_3)_2(CH_2)_5CH_3$ |
| $I(CH_2)_6CF_3$ | ethacrolein | $CH_2=C(C_2H_5)CO(CH_2)_6CF_3$ |
| $ClC(CH_3)_2(CH_2)_3CF_3$ | acrolein | $CH_2=CHCOC(CH_3)_2(CH_2)_3CF_3$ |
| $I(CH_2)_4CH_3$ | ethacrolein | $CH_2=C(C_2H_5)CO(CH_2)_4CH_3$ |
| $Br(CH_2)_6CH_3$ | ethacrolein | $CH_2=C(C_2H_5)CO(CH_2)_6CH_3$ |
| $ICH(CH_3)(CH_2)_2CF_2CH_3$ | methacrolein | $CH_2=C(CH_3)COCH(CH_3)(CH_2)_2CF_2CH_3$ |
| $BrCH(CH_3)(CH_2)_3CH_3$ | acrolein | $CH_2=CHCOCH(CH_3)(CH_2)_3CH_3$ |
| $ClC(C_2H_5)_2CH_2CH_3$ | acrolein | $CH_2=CHCOC(C_2H_5)_2CH_2CH_3$ |

The vinyl ketones $CH_2=CR^1COCR^4(R^5)(CH_2)_pQ$ where $R^4$ and $R^5$ include fluorine are prepared by two alternate methods: by reaction of the appropriate These acids are in turn smoothly converted to the corresponding acyl chlorides (for use in the Friedel-Crafts addition to ethylene) by the action of well-known reagents such as $SOCl_2$ or $PCl_5$ (see for example, Buehler and Pearson, "Survey of Organic syntheses," Wiley-Interscience, 1970, Chap. 15).

α,α-Difluoropropionic acid and α,α-difluorobutyric acid are examples of known α,α-difluoroalkanoic acids. The α,α-difluoro alkanoic acids can be made from reaction of sulfur tetrafluoride with the appropriate α-ketoalkanoic acid or the ester. If the reaction is carried out under mild conditions, e.g., at about 10° in $CH_2Cl_2$ solvent in the presence of HF catalyst, the keto group of the α-ketoalkanoic acid is converted to a gem-difluoro group while the carboxylic acid group, and to a lesser extent the ester group, is converted to an acyl fluoride group. Hydrolysis of the α,α-difluoroacyl fluoride and/or the α,α-difluoroalkanoic ester, gives the α,α-difluoroalkanoic acid.

Using method 1 the acids of column A are converted through their acid chlorides to the vinyl ketones of column B.

| Col. A | Col. B |
|---|---|
| n—$C_5H_{11}CF_2CO_2H$ | n—$C_5H_{11}CF_2COCH=CH_2$ |
| n—$C_4H_9CF(CH_3)CO_2H$ | n—$C_4H_9CF(CH_3)COCH=CH_2$ |
| $CF_3(CH_2)_3CHFCO_2H$ | $CF_3(CH_2)_3CHFCOCH=CH_2$ |
| $CH_3CF_2CH_2CHFCO_2H$ | $CH_3CF_2CH_2CHFCOCH=CH_2$ |
| $C_2H_5CF_2CO_2H$ | $C_2H_5CF_2COCH=CH_2$ |

Method 2

This synthesis of fluoroalkyl vinyl ketones can be represented by the following equations.

$$Q(CH_2)_pCFR^5CHO \xrightarrow{LiCH=CH_2}$$

$$Q(CH_2)_pCFR^5\underset{OH}{\overset{|}{C}}HCH=CH_2$$

$$\xrightarrow{CrO_3} Q(CH_2)_pCFR^5\underset{O}{\overset{\|}{C}}CH=CH_2$$

The starting fluoroaldehydes $Q(CH_2)_pCFR^5CHO$ can be made by conventional methods of organic synthesis. For example, reduction of fluoroalkanoic acids with $LiAlH_4$ with $NaAlH(OCH_2CH_2OCH_3)_2$ provides the aldehydes (or their hydrates). Other methods for making α-fluoroaldehydes are known (e.g. J. Cantacuzine and D. Ricard, Bull. Soc. Chim. France, 1967(5), 1507; F. L. M. Pattison, loc. cit.), and in some cases these methods are more convenient than reduction of the fluoroalkanoic acids.

Using the vinyl lithium method of method 2 the aldehydes of column A are converted in two steps to the vinyl ketones of column B.

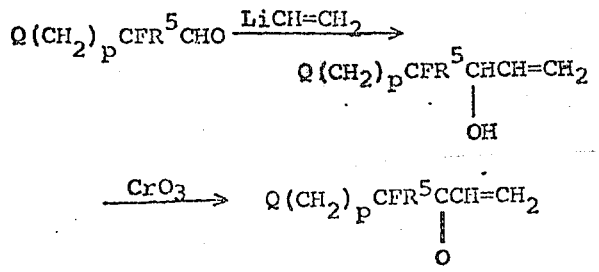

The 3-hydroxyaliphatic moiety of the N,N-substituted pyrazolidine or pyrazolidone is obtained after reaction of the monosubstituted pyrazole or pyrazolidone with the vinyl ketone

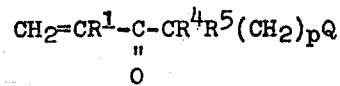

to give the grouping

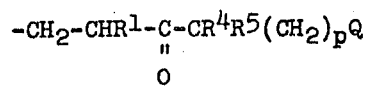

attached to nuclear nitrogen. The carbonyl of the latter can be reduced to hydroxyl or reacted with a 1 to 2 carbon metal hydrocarbyl to form the

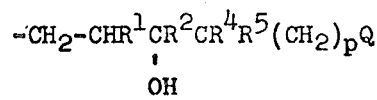

group. The hydroxyl can then be acylated as set out above with lower alkanoyl halides or anhydrides to give the

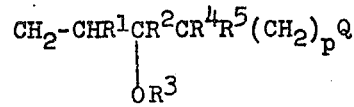

moiety, e.g., with acetic, propionic, or n-butyric anhydrides or acid chlorides. The reaction is most conveniently carried out in warm pyridine.

A removable protective group (P), also called "blocking group" is generally employed in the synthesis sequence to direct the bonding of a second group to the less reactive nuclear nitrogen. Particularly useful is the benzyloxycarbonyl group. This group of the 2-alkanoate derivatives can be removed conveniently by hydrogenation in a solvent such as ethanol over palladium on carbon catalyst under mild conditions. Alternately the benzyloxycarbonyl group can be removed by treatment with hydrogen bromide in glacial acetic acid, but this is less convenient because the ester grouping of the molecule is hydrolyzed under these conditions. Other protective groups of the kinds well known in peptide chemistry can be used for the conversion of pyrazolidinone hydrochloride to 2-carbalkoxyalkyl-3-pyrazolidinones. For example, reaction of 3-pyrazolidinone with β,β,β-trichloroethyl chloroformate (Windholz and Johnston, Tet. Letters, 2555 (1967) under Schotten-Baumann conditions gives 1-(β,β,β-trichloroethyloxycarbonyl)-3-pyrazolidinone, as follows:

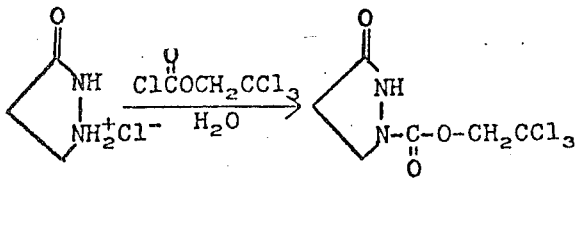

3-Pyrazolidinone hydrochloride, 49.6 g (0.4 mole) in 400 ml of water is stirred in a creased round bottomed flask while 42.4 g (0.4 mole) of sodium carbonate is added in portions. To the resulting solution cooled with an ice bath and stirred vigorously with a paddle stirrer is added 86.4 g (408 mole) of β,β,β-trichloroethylchloroformate dropwise over 0.5 hr. The reaction mixture is stirred over night without cooling and the solid is collected by filtration. The white solid is washed thoroughly with water and then with ether-hexane (1:1 v/v) to give after drying 94 g (90 percent) of 1-(β,β,β-trichloroethoxycarbonyl)-3-pyrazolidinone; crystallization from chloroform (about 350 ml) gives about 84 g of pure material. Another sample prepared similarly had mp 151°–152°.

Anal. Calcd. for $C_8H_7Cl_3N_2O_3$: C, 27.55; H, 2.70; N, 10.70; Found C, 27.34; H, 2.64; N, 10.90; $\lambda_{max}$ (CHCl$_3$): 2.95 sharp (NH) and 5.84μ (C=O).

Treatment of this compound with $XCH_2(CH_2)_nCO_2R$ gives the ester. The protective group is removed by the action of zinc in acetic acid or in hot methanol to give the pyrazolidinone as shown by the equation Another protective group is p-nitrobenzoyl. This group can be removed by saponification with one equivalent of base. R. Boissanas (Advances in Org. Chem. 3, 175 (1963)) and Fieser and Fieser (Reagents for Organic Synthesis, Wiley-Interscience, N.Y., Vols. I, II and III0 describe a number of other N-protecting groups, many of which can be used for the above conversion.

Removal of the protective group (P) is accomplished under mild conditions, that is, conditions which remove the (P) group but do not cause other parts of the molecule to undergo undesirable changes. These conditions include hydrolysis, hydrogenation, or the use of zinc in acetic acid or methanol at 0° to 50°C. or higher.

The following schemes further illustrate the manufacture of both isomeric configurations of the asymmetrical pyrazolidinones of this invention. In these "P" represents a "Protective Group" and the other variables are as defined previously with R generally being lower alkyl or cycloalkyl. The R$^1$, R$^2$, R$^3$, R$^4$R$^5$ and Q groups preferably are hydrogen and so specified in these equations.

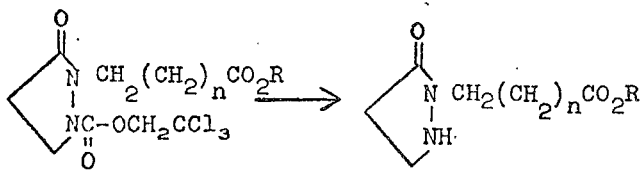

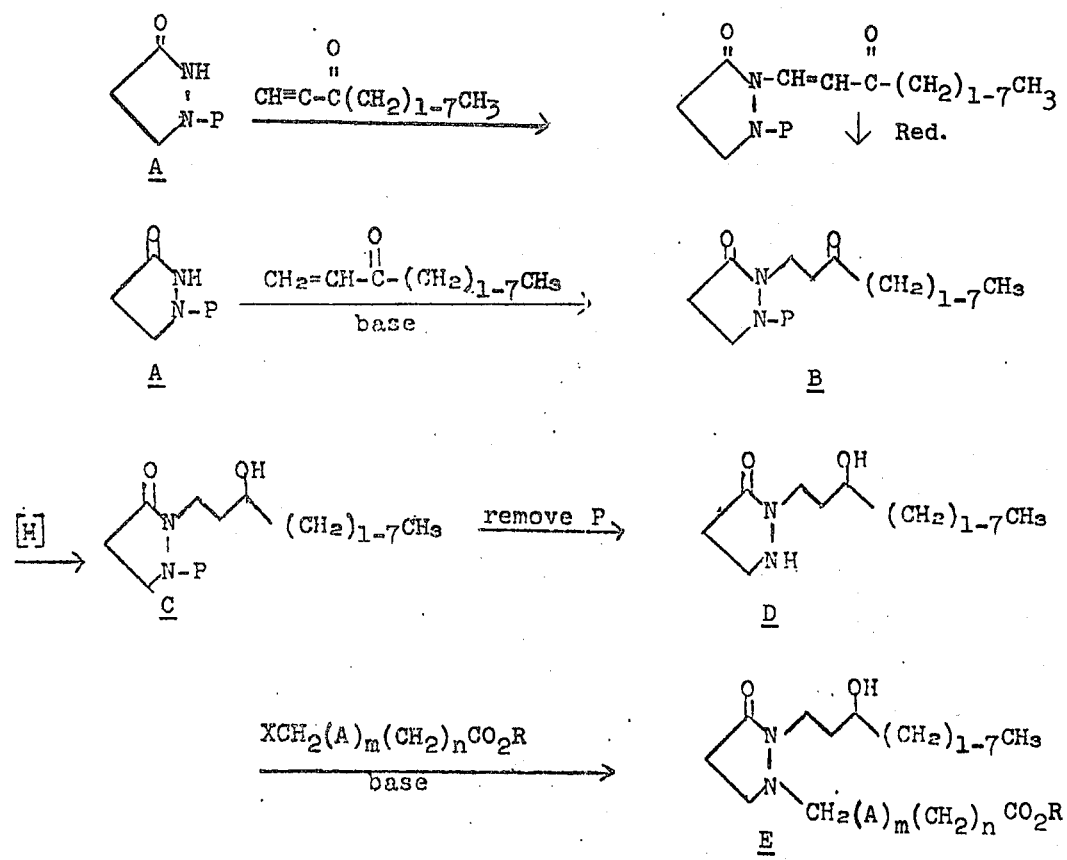

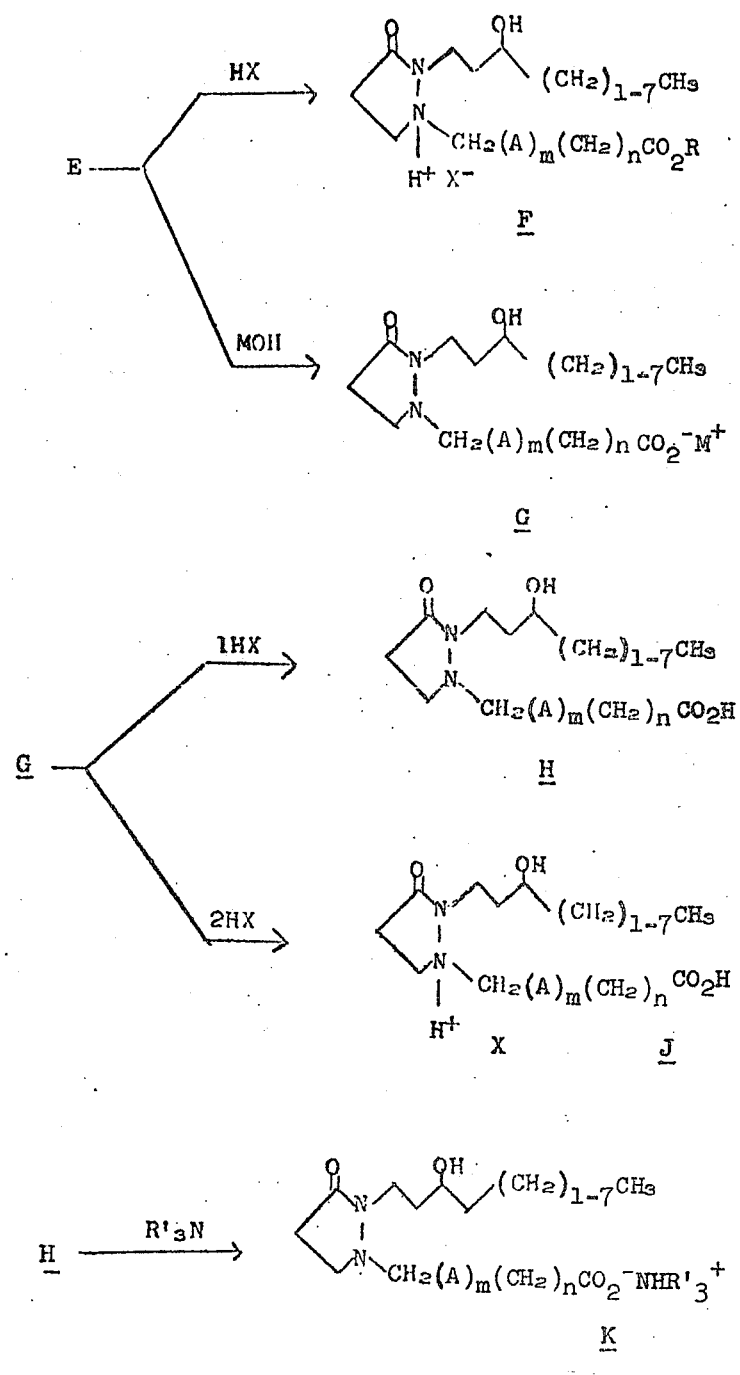
The preparation of the isomeric 3-pyrazolidinones having a carboxylic acid group on the 2-position is further illustrated as follows. "P" represents a "Protective Group" and the other variables are as defined previously.
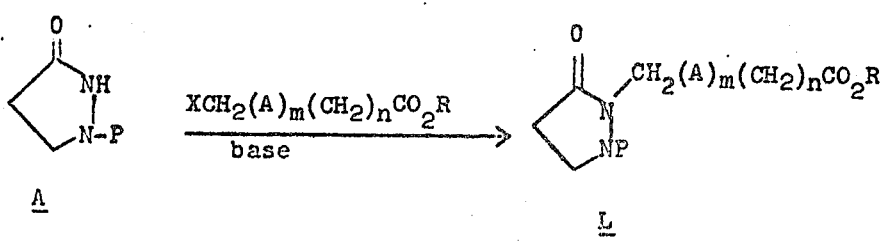

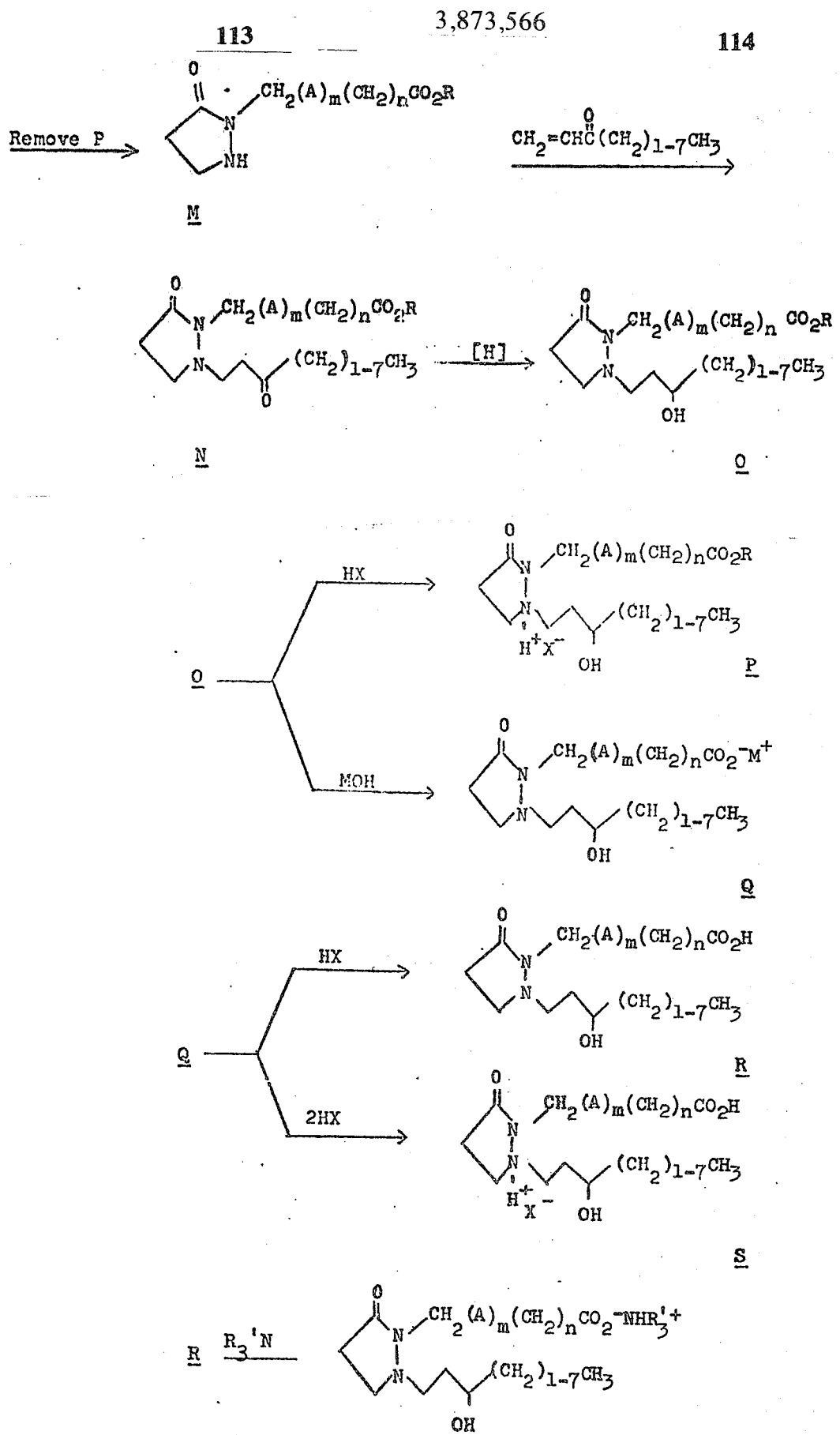

Compounds A are made by reaction of 3-pyrazolidinone hydrochloride with the appropriate protecting group reagent e.g. of the kinds well known in peptide chemistry. The use in the synthetic sequence and the exact method for removal of the protective group (P) will depend on the nature of P, but in general groups which can be removed by reduction or mild alkaline hydrolysis are removed after reaction with the ω-haloalkanoate, $XCH_2(A)_m(CH_2)_nCO_2R$, or Michael addition of the vinyl ketone $CH_2=CR^1COCR^4R^5(CH_2)_pQ$, e.g., $CH_2=CHCO(CH_2)_{2-6}CH_3$ and reduction of the ketone side chain.

The choice of protective group P will depend somewhat on the nature of the side chains attached in intermediates B or L. For example, when the group A is phenylene, the side chain of L has a benzylic-nitrogen bond that is susceptible to hydrogenolysis. In this case it is advantageous to use a protective group such as β,β,β-trichloroethoxycarbonyl which can be removed by reagents that do not cleave the benzylic function, e.g., zinc in methanol (cf. Ex. 18). Other nitrogen-protective groups P that can be used and cleaved, for example, by treatment with acids, include tertiary butyloxycarbonyl, tertiary amyloxycarbonyl, triphenylmethyl ("trityl"), tritylsulfenyl, p-toluenesulfonyl, 2-(p-toluenesulfonyl)ethoxycarbonyl, and p-nitrocarbobenzoxy. The most generally useful protective groups is, however, the "carbobenzoxy" or benzyloxycarbonyl group.

Michael addition of A and M to the alkyl vinyl ketones can be carried out in alcohol or a nonprotic solvent such as ether using a catalytic amount of a base such as hydroxide ion or tertiary amine.

Reduction of the ketones B and N is carried out with a reducing agent such as a boron or aluminum hydride that does not cleave off the protective group before reducing the keto group. Sodium borohydride is preferred for this purpose. If, however, the reduction of B is carried out with hydrogen over a rhodium catalyst, for example, hydrogenolysis of the protective group occurs in competition with reduction of the carbonyl group and reductive cycloalkylation occurs to give

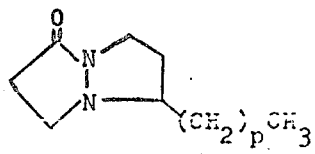

Amine D, obtained after removal of the protective group from C, is then N-alkylated with the appropriate halogen compound $XCH_2(A)_m(CH^2)_nCO_2R$, where X is chloro, bromo, or iodo, and R is as previously defined but preferably is an alkyl group of 1–12 carbons atoms.

Alkylation of D proceeds slowly at room temperature, although elevated temperatures (50°–125°) are preferred. The alkylation can be run in ethanol, but the preferred solvent is tetramethylenesulfone. The presence of a base, such as $NaHCO_3$ or $Na_2CO_3$, increases the yield of alkylation product E.

Alkylation product E is conveniently separated from by-products, e.g., unchanged halo ester or olefinic ester resulting from dehydrohalogenation of the halo ester, by precipitating it from ether as the hydrochloride salt. E can be regenerated by treatment with aqueous $NaHCO_3$ and be converted to a new salt F, e.g., by treatment with maleic acid or perchloric acid, or it can be hydrolyzed to a carboxylate salt G with one equivalent of an alkali metal hydroxide. G can in turn be converted to the free acid H (inner salt) by neutralization to pH 6 in an aqueous system, or on further acidification it can be converted to J, the HX salt of the carboxylic acid. If R is tert-butyl, E can be converted to the corresponding acid or hydrohalide salts of the acid by treatment with one or more equivalents of strong acid HX in water or chloroform. Amine salts can be prepared by reaction of the acids H with pharmaceutically acceptable amines.

By using homologs of the acetylenic ester methyl 7-iodohept-5-ynoate $XCH_2C \equiv C(CH_2)_nCO_2CH_3$; X = I, n = 3, R = $CH_3$) [Ferdinandi and Just, loc cit] the 1-substituted pyrazolidinone acetylenic and ethylenic analogs can be prepared. The preparation of these esters where n is 1–3 is given previously.

N-Alkylation of the amines "D" by $XCH_2(A)_m(CH_2)_nCO_2R$ to give E can be carried out in the absence of solvent, or in solvents such as ethanol, dimethylformamide, or hexamethylphosphoric triamide. However, for this purpose tetramethylenesulfone gives good results particularly at room temperature or at slightly elevated temperatures, e.g., 50°–110°, and in the presence of proton acceptors such as $NaHCO_3$ or $Na_2CO_3$. Compounds D and E are conveniently purified by precipitation from ether as their hydrochloride salts. The free amines E and O are regenerated by treatment with aqueous base, e.g., $NaHCO_3$. Saponification of the esters E and D is carried out in the presence of one equivalent of aqueous base MOH, where M is generally an alkali metal, to give the carboxylate salts G and Q which in turn can be converted to acid (inner salt) H or R, or the acid hydrohalide J and S by treatment with one or two equivalents of a halogen acid, HX. In addition to the HCl salt, other pharmaceutically acceptable acid addition salts such as the sulfate, phosphate, acetate, citrate, tartrate, etc. can be prepared by using the appropriate acid. Treatment of H and R with a pharmaceutically acceptable amine such as tris(hydroxymethyl)aminomethane or triethanolamine gives the amine salts K and T.

The N,N'-disubstituted pyrazolidines described are made by the following sequence of reactions.

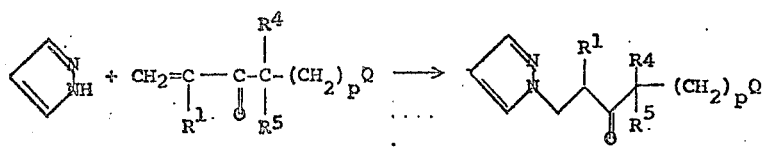

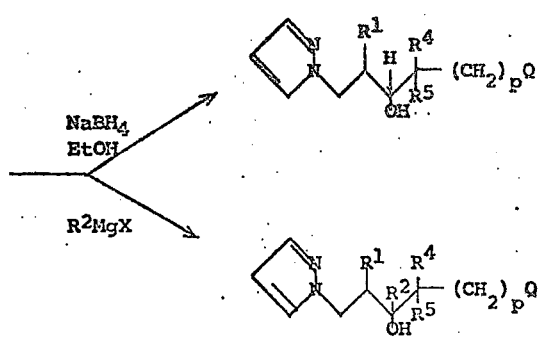

Horton, British Journal of Pharmacology 24, 472 (1956). The smooth muscle stimulation by prostaglandins is also discussed by J. E. Pike, et al., in "Prostaglandins", Nobel Symposium No. 2, S. Bergstrom and B. Samuelsson, ed., Interscience, Stockholm, 1967, p. 161. The stimulation of smooth muscle by this diazaprostanoic acid is not inhibited by compounds which block receptors for neurotransmitters when such compounds are used at concentrations which are sufficient to block neurotransmitters. At much higher concentrations, however, some of the neurotransmitter blockers will block the effects of the diazaprostanoic acid.

Compounds 9c and 29 have smooth muscle stimulating properties similar to those of compound 8, although

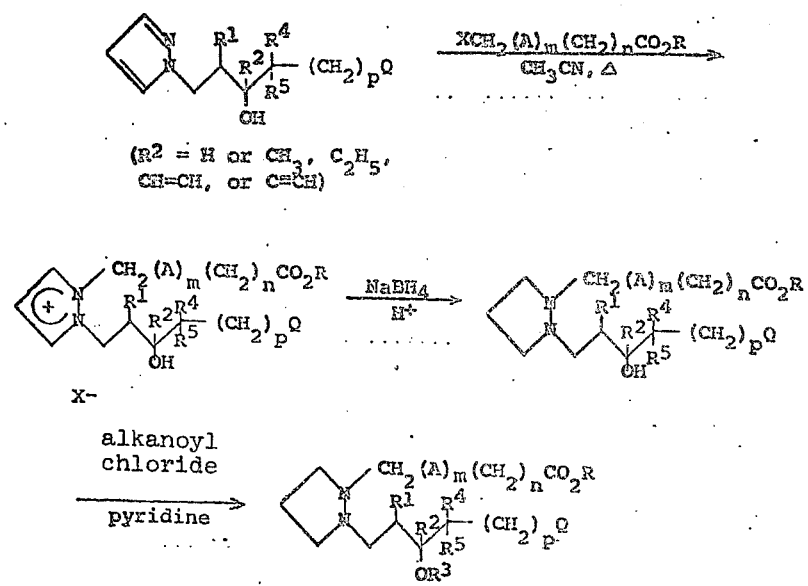

The compounds of this invention are surfactants (emulsifying agents or detergents) in acidic, neutral, or basic aqueous systems by virtue of their polar carboxylic and amine functionalities combined with lypophilic hydrocarbon chains. In dilute acid, the amine function forms a water soluble salt, permitting dissolution of even the ester form of these compounds. The alkali metal or amine salts of the carboxylic acids are compatible with and soluble in weakly basic aqueous solutions. The carboxylic acids themselves are essentially neutral because they exist as inner salts with the amine portion of the molecule and these inner salts are slightly soluble in water under conditions of neutral pH.

Compound 8 of part (g) of Example 1, i.e., the sodium salt of 7[3'-oxo-1'-(3''-hydrox-n-octylprazolidin-2'-yl]heptanoic acid (also named as the sodium salt of 8,12-diaza-9-keto-15(±) hydroxyprostanoic acid) has prostaglandin-like activity. For example, stimulation of rat ileum (smooth muscle) occurred when the concentration of the compound was above about 50 micrograms per ml of perfusion bath with rhythmic pulses of contraction each 2-3 seconds. Acetylcholine ($10^{-5}$M) induces strong contraction which rises to a maximum tension in 2-3 seconds and maintains that tension for one to several seconds before relaxing. When the above described pyrazolidinone derivative is employed with acetylcholine, the tension falls to half the peak value and remains there for a long period. This effect has been reported for prostaglandins $PGE_1$ and $PGF_{2\alpha}$ by 9c is more potent than 8.

Lowering of blood pressure is also typical of prostaglandins, especially the prostaglandins of the E series (Pike, loc cit) and A series (J. Lee, et al., in Ann. N.Y. Acad. Sciences, Vol. 180, Ramwell and Shaw, N.Y. Acad. Sciences, 1971, 218). When compound 8 is administered by intravenous injection to anesthetized DOCA (desoxycorticosterone acetate treated) hypertensive rats, the $ED_{30}$ is 0.2 mg/kg., where $ED_{30}$ is the dosage necessary to lower blood pressure in a group of rats by the mean value of 30 mm of mercury.

Some of the esters are prostaglandin antagonists in in vitro tests employing strips of rate uterus. For example, a concentration of 80 μg/ml of ethyl ester 17 causes a 50 percent inhibition of the contraction caused by a test dose of a natural prostaglandin, either $PGE_1$ or $PGE_2$. The test dose of the natural prostaglandin is adjusted to the concentration required to give about 75 percent maximum stimulation of the smooth muscle. Under similar conditions the corresponding t-butyl ester 21 causes 50 percent inhibition at 40μg/ml. Generally the compounds having a phenylene group ($A=C_6H_4$) are prostaglandin antagonists. The methyl ester 30 causes 50 percent inhibition at 50 μg/ml and ester 31 requires 60μg/ml. Methyl ester 33 and the corresponding acid 35a cause 50 percent inhibition at concentrations of 25 μg/ml. The methyl ester hydrochloride 37 causes 50 percent inhibition at 15 μg/ml. and the acid 39 at 75-80 μg/ml. Ester 40 causes 50 percent inhibition of the rat fundus muscle at about 80μg/ml.

The metal salts and amine salts of these carboxylic acids have biological properties very similar to those of the corresponding acids, Prostaglandins appear to be involved in inflammation, fever and pain processes. Aspirin, for example, apparently exerts its favorable drug effects on such processes by virtue of its ability to inhibit the synthesis of prostaglandins in vivo. Prostaglandin antagonistic activities are therefore recognized as being of potential value as anti-inflammatory agents or antipyretics or analgesics or for the treatment of some forms of diarrhea or shock.

Some of the esters and acids of this invention inhibit or prevent experimentally-induced ulcers in rats.

The acids, their metal or amine salts and their hydrohalide salts, have other prostaglandin-like properties. Salt 38 at 25 μg/ml has smooth muscle stimulating activity in vitro on rat uterus; at lower concentrations it sensitizes the muscle toward the stimulating effects of prostaglandin $E_1$. Salt 52 inhibits epinephrine-induced lipolysis in rat fat cells.

Prostaglandin-like compounds are well recognized for their pharmacological value, e.g., as nasal decongestants, bronchodilators, absortifacients, labor inducers, antihypertensives, etc. For example, the compounds show potential value as bronchodilators. Guinea pigs were placed in a closed chamber which had been sprayed for 60 seconds with a 0.2 percent (2 mg/ml) histamine diphosphate solution. At the onset of respiratory distress and convulsions the animal was removed from the chamber and the time recorded as the control time. Only animals with a control prostration time in the range of 32–110 seconds were used in the test. After a 4 hour recovery period the animals were exposed in a second chamber to test compounds for 2 minutes and allowed an additional 1 minute in the chamber before being exposed again to the histamine aerosol in the first chamber. The onset of respiratory distress and convulsions on second exposure to histamine was recorded as the test time. "Protection" was calculated as the test time divided by control time. The data are presented in Table VIII.

Table VIII

| Compound | Concentration | | Protection |
|---|---|---|---|
| $PGE_1$ | 0.7 | μg/ml | 1.7 |
| isoproterenol | 11.1 | μg/ml | 2.4 |
| N-(6-Carboxy-n-hexyl) N'-(3'-hydroxy-n-octyl) Pyrazolidine (Compd. 52) | 24 | mg/ml | 1.6 |
| 7[3'-Oxo-1'-(3''-hydroxy-8'',8'',8'', -trifluoro-n-octyl)] heptanoic acid, sodium salt (Compd. 29) | 10 | mg/ml | 1.5 |
| 7[3'-Oxo-1'-(3''-hydroxy-n-octyl)pyrazolidin-2'-yl] heptanoic acid, sodium salt (Compd. 8) | 2.0 | mg/ml | 1.7 |
| 7[3'-Oxo-1'-(3''-hydroxy-n decyl)pyrazolidin-2'-yl] heptanoic acid, sodium salt (Compd. 9c) | 3.0 | mg/ml | 2.0 |

The relationship of prostaglandin-like or antagonist properties can be dependent on concentration, e.g., salt 7 in the rat uterus has prostaglandin antagonist activity at 50 μg/ml but at concentrations greater than 75 μg/ml mimics the action of prostaglandin $E_2$. Usually the acids and salts of the compounds of this invention are prostaglandin mimics while the esters are prostaglandin antagonists.

The compounds of this invention can be formulated into the usual pharmaceutical dosage forms for administration to humans and animals by any of the known routes, e.g., nasel, oral parenteral, anal or topical application. The compounds can also be formulated in polymeric matrices for sustained release. Particularly useful are biodegradable polymer matrices, such as homopolymers of lactic acid or glycolic acid, mixtures thereof, or their copolymers. These drug-polymer compositions can be injected as small particles in suspension, implanted as pellets, or sprayed on skin or lesions as films. The active component is then released slowly and the polymers is degraded to physiologically normal substances.

The embodiments of the invention in which an exclusive property or privilege is claimed are defined as follows:

1. A compound of the formula

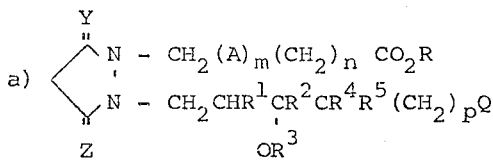

wherein
A is CH=CH, C ≡ C, or $C_6H_4$;
R is H, alkali metal, amine salt, alkyl, or cycloalkyl each of up to 12 carbon atoms;
$m$ is 0 or 1;
$n$ is 0 to 6;
$p$ is 0 to 6;
Y and Z are O or $H_2$, with the proviso that where one is O, the other is $H_2$;
$R^1$ is H, $CH_3$ or $C_2H_5$;
$R^2$ is H, $CH_3$, $C_2H_5$, $CH=CH_2$, or C ≡ CH,
$R^3$ is H or alkanoyl of 2 to 4 carbon atoms;
$R^4$ is H, F, $CH_3$ or $C_2H_5$;
$R^5$ is H, F, $CH_3$ or $C_2H_5$; and
Q is H, $CH_3$, $CF_2CH_3$ or $CF_3$; and
with the proviso that
$R^1$, $R^4$ and $R^5$ are each H when $R^2$ is other than H; and b) a salt of (a) with a pharmaceutically acceptable acid.

2. A compound of claim 1 in which Y = O.
3. A compound of claim 1 in which Z = O.
4. A compound of claim 1 in which Y = Z = $H_2$.
5. A compound of claim 1 in which $m$ = 0.
6. A compound of claim 1 in which $m$ = 1.
7. A compound of claim 1 in which p is 3 to 5.
8. A compound of claim 1 in which R is H.
9. A compound of claim 1 in which R = tertiary butyl.
10. A compound of claim 1 in which R is an alkali metal.
11. A compound of claim 10 in which R is sodium.
12. A compound of claim 1 in which R = $R^1$ = H.
13. A compound of claim 7 in which $m$ = O, $n$ is 4 to 6, $R^1$, $R^2$, $R^3$, $R^4$ and $R^5$ are each H, and Q is $CH_3$.
14. A compound of claim 7 in which $m$ = 1, $n$ is 0 to 4, $R^1$, $R^2$, $R^3$, $R^4$ and $R^5$ are each H, and Q is $CH_3$.
15. 7[3'-Oxo-1'-(3''-hydroxy-n-octyl)pyrazolidin-2'-yl]-heptanoic acid; the compound of claim 2 where $m$ = O, $n$ = 5, $p$ = 4, R = $R^1$ = $R^2$ = $R^3$ = $R^4$ = $R^5$ = Q = H.

16. The tertiary butyl ester of the acid of claim 15.
17. The sodium salt of the acid of claim 15.
18. 7[3'-Oxo-1'-(3''hydroxy-n-decyl)pyrazolidin-2'-yl] heptanoic acid; the compound of claim 2 where $m = O$, $n = 5$, $p = 6$, $R = R^1 = R^2 = R^3 = R^4 = R^5 = Q = H$.
19. The tertiary butyl ester of the acid of claim 18.
20. The sodium salt of the acid of claim 18.
21. 7[3'-Oxo-1'-(3''-hydroxy-3''-methyl-n-octyl)pyrazolidin-2'-yl] heptanoic acid; the compound of claim 2 where $m = O$, $n = 5$, $p = 3$, $R = R^1 = R^3 = R^4 = R^5 = H$, $R^2 = CH_3$ and Q is $CH_3$.
22. The tertiary butyl ester of the acid of claim 21.
23. 7[3'-Oxo-1'-(3''-hydroxy-3''-methyl-n-decyl)pyrazolidin-2'-yl] heptanoic acid; the compound of claim 2 where $m = O$, $n = 5$, $p = 3$, $R = R^1 = R^3 = R^4 = R^5 = H$, $R^2 = CH_3$ and Q is $CH_3$.
24. The tertiary butyl ester of the acid of claim 23.
25. 7[3'-Oxo-1'-(3''-ethynyl-3''-hydroxy-n-octyl)pyrazolidin-2'-yl] heptanoic acid; the compound of claim 2 where $m = O$, $n = 5$, $p = 3$, $R = R^1 = R^3 = R^4 = R^5 = H$, $R^2 = C\equiv CH$ and Q is $CH_3$.
26. The tertiary butyl ester of the acid of claim 25.
27. 7[3'-Oxo-1'-(3''-hydroxy-8'',8'',8''-trifluoro-n-octyl)-pyrazolidin-2'-yl] heptanoic acid; the compound of claim 2 where $m = O$, $n = 5$, $p = 3$, $R = R^1 = R^2 = R^3 = R^4 = R^5 = H$ and $Q = CF_3$.
28. The tertiary butyl ester of the acid of claim 27.
29. The hydrochloride salt of the acid of claim 27.
30. The sodium salt of the acid of claim 27.
31. $\beta$-[p-[[3-Oxo-1(3'-hydroxy-n-octyl)pyrazolidin-2-yl]methyl]phenyl] propionic acid; the compound of claim 2 where m = 1, n = 2, p = 3, A = p-$C_6H_4$, $R^1 = R^2 = R^3 = R^4 = R^5 = H$ and Q = $CH_3$.
32. The isopropyl ester of the acid of claim 31.
33. The sodium salt of the acid of claim 31.
34. 7[3'-Oxo-2'-(3''-hydroxy-n-octyl)pyrazolidin-1'-yl] heptanoic acid; the compound of claim 3 where m = O, $n = 5$, $p = 3$, $R = R^1 = R^2 = R^3 = R^4 = R^5 = H$ and $Q = CH_3$.
35. The tertiary butyl ester of the acid of claim 34.
36. The hydrochloride salt of the ester of claim 35.
37. The sodium salt of the acid of claim 34.
38. 5[3'-Oxo-2'-(3''-hydroxy-n-octyl)pyrazolidin-1'-yl] pentanoic acid; the compound of claim 3 where $m = O$, $n = 3$, $p = 3$, $R = R^1 = R^2 = =3 = R^4 = R^5 = H$ and Q is $CH_3$.
39. The ethyl ester of the acid of claim 38.
40. The hydrochloride salt of the ester of claim 39.
41. 4[3'-Oxo-2'-(3''-hydroxy-n-octyl)pyrazolidin-1'-yl] butyric acid; the compound of claim 3 where $m = O$, n = 2, p = 3, $R = R^1 = R^2 = R^3 = R^4 = R^5 = H$ and Q is $CH_3$.
42. The ethyl ester of the acid of claim 41.
43. The hydrochloride salt of the ester of claim 42.
44. p-[[3-Oxo-2-(3'-hydroxy-n-octyl)pyrazolidin-1-yl]methyl] benzoic acid; the compound of claim 3 where m = 1, $n = 0$, $p = 3$, A = p-$C_6H_4$, $R = R^1 = R^2 = R^3 = R^4 = R^5 = H$, and Q = $CH_3$.
45. The methyl ester of the acid of claim 44.
46. The sodium salt of the acid of claim 44.
47. p-[[3-Oxo-2(3'-hydroxy-n-octyl)pyrazolidin-1-yl]methyl] phenylacetic acid; the compound of claim 3 where $m = n = 1$, $p = 3$, A = $p$-$C_6H_4$, $R = R^1 = R^2 = R^3 = R^4 = R^5 = H$ and Q is $CH_3$.
48. The methyl ester of the acid of claim 47.
49. The hydrochloride of the ester of claim 48.

50. The sodium salt of the acid of claim 47.
51. $\beta$-[p-[[3-Oxo-2(3'-hydroxy-n-octyl)pyrazolidin-1-yl]methyl]phenyl] propionic acid; the compound of claim 3 where $m = 1$, $n = 2$, $p = 3$, A = p-$C_6H_4$, $R = R^1 = R^2 = R^3 = R^4 = R^5 = H$ and Q is $CH_3$.
52. The methyl ester of the acid of claim 51.
53. The sodium salt of the acid of claim 51.
54. $\gamma$ [p[[3-Oxo-2(3'-hydroxy-n-octyl)pyrazolidin-1-yl]methyl]phenyl] butyric acid; the compound of claim 3 where $m = 1$, $n = 3$, $p = 3$, A = p-$C_6H_4$, $R = R^1 = R^2 = R^3 = R^4 = R^5 = H$ and Q is $CH_3$.
55. The methyl ester of the acid of claim 54.
56. The hydrochloride salt of the ester of claim 55.
57. The isopropyl ester of the acid of claim 54.
58. The hydrochloride of the ester of claim 57.
59. The tert-butyl ester of the acid of claim 54.
60. The sodidum salt of the acid of claim 54.
61. N-(6-Carboxy-n-hexyl)-N'-(3'-hydroxy-n-octyl) pyrazolidine; the compound of claim 4 where $m = O$, $n = 4$, $p = 3$, $R^1 = R^2 = R^3 = R^4 = R^5 = H$ and Q is $CH_3$.
62. The ethyl ester of the acid of claim 61.
63. The sodium salt of the acid of claim 61.
64. N-(6-Carboxy-n-hexyl)-N'-(3'-hydroxy-8',8',8'-trifluoro-n-octyl) pyrazolidine; the compound of claim 4 where $m = O$, $n = 5$, $p = 3$, $R = R^1 = R^2 = R^3 = R^4 = R^5 = H$ and Q is $CF_3$.
65. The hydrochloride salt of the acid of claim 64.
66. A compound of the formula

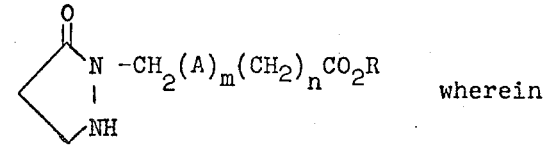

wherein

A is CH=CH, C $\equiv$ C or $C_6H_4$;
R is H, alkali metal, amine salt, alkyl or cycloalkyl each of up to 12 carbon atoms;
m is 0 or 1; and
n is 0 to 6.
67. A compound of the formula

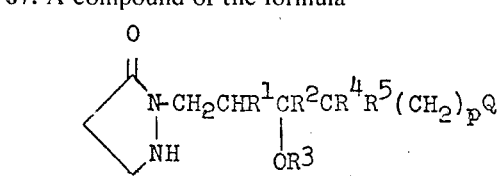

wherein
p is 0 to 6;
$R^1$ is H, $CH_3$ or $C_2H_5$;
$R^2$ is H, $CH_3$, $C_2H_5$, CH=$CH_2$ or C $\equiv$ CH;
$R^3$ is H or alkanoyl of 2 to 4 carbon atoms;
$R^4$ is H, F, $CH_3$ or $C_2H_5$;
$R^5$ is is F, $CH_3$ or $C_2H_5$;
Q is H, $CH_3$, $CF_2CH_3$ or $CF_3$; and with the proviso that $R^1$, $R^4$ and $R^5$ are each H when $R^2$ is other than H.
68. The process of preparing a compound of claim 1 where Y=O, Z=$H_2$ and $R^2$=$R^3$=H which comprises the sequential steps of
A. contacting a 3-pyrazolidinone of A. formula

wherein

P is a blocking group with a substantially equimolar amount of an omegahalogenated carboxylate of the formula $$XCH_2(A)_m(CH_2)_nCO_2R$$

wherein X is chlorine, bromine or iodine, in the presence of a base and solvent at 0°–150°C. to produce a compound of the formula

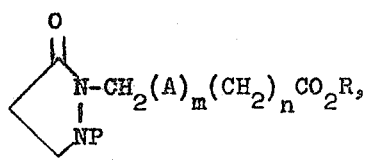

B. removing the blocking group P from the product of step (A) under mild conditions such as by hydrogenation or hydrolysis at 0°–50°C. to produce a compound of the formula

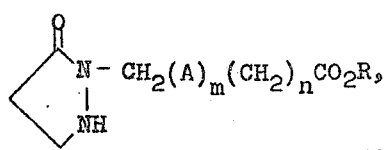

C. treating the product of step (B) at 0°–100°C., in the presence or absence of a solvent, with a substantially equimolar amount of an unsaturated ketone having a formula selected from the group consisting of (1) 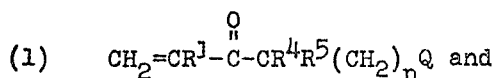

(2) 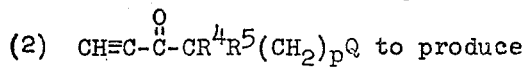 to produce a product having a formula selected from the group consisting of (3) 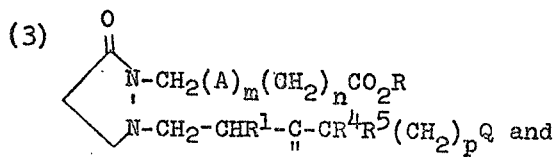

(4) 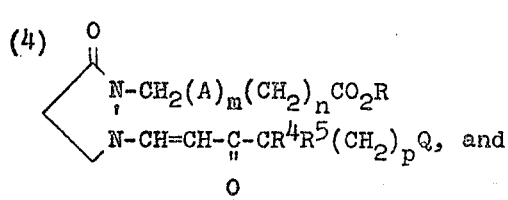

D. reducing the keto side chains of the product of step (C) to give an alcohol of the formula selected from the group (5) 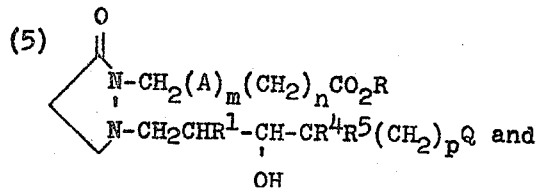

(6) 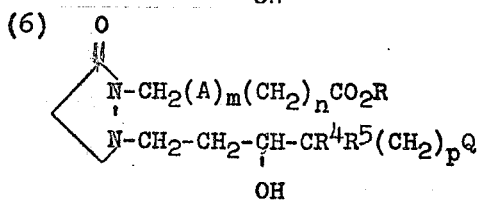

wherein the values for R, R¹, R⁴, R⁵, A, m, n, p and Q are as stated in claim 1.

69. The process of preparing a compound of claim 1 where Y=O, Z=H₂, R³=H and R² is other than H which comprises contacting a compound of the formula

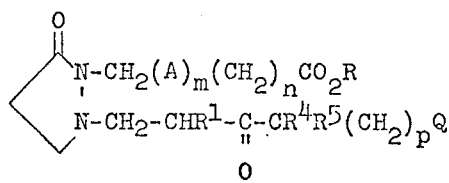

with a metal hydrocarbyl compound selected from the group consisting of Grignard reagents R²MgX and lithium alkyls R²Li to give the alcohol

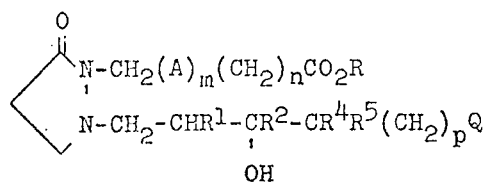

wherein the values for R, R¹, R², R⁴, R⁵, A, m, n, p and Q are as stated in claim 1.

70. The process of preparing a compound of claim 1 where Y=O, Z=H₂ and R³ is other than H which comprises contacting a compound having a formula selected from the group consisting of

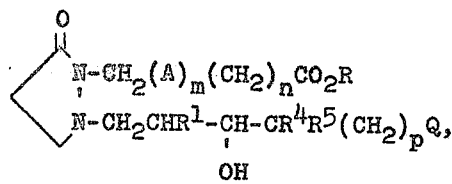

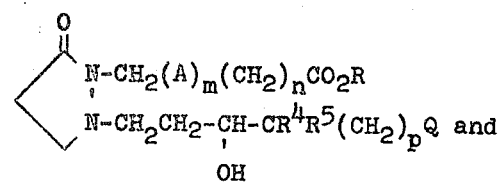

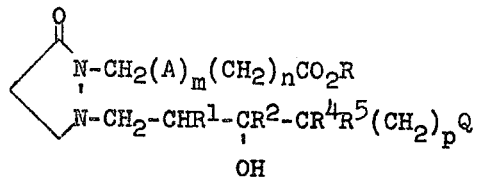

with an acylating compound selected from the group consisting of R³X and (R³)₂O in which X is chlorine, bromine or iodine, and recovering a compound in which the OH group has been converted to -OR³, the values of R, R¹, R², R³, R⁴, R⁵, A, m, n, p and Q being as stated in claim 1.

71. The process of preparing a compound of claim 1 where Z=O, Y=H₂ and R²=R³=H which comprises the sequential steps of A. contacting a 3-pyrazolidinone of the formula

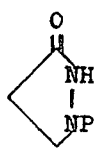

wherein

P is a blocking group at 0°–100°C. with a substantially equimolar amount of an unsaturated ketone having a formula selected from the group consisting of (1) $CH_2=CR^1-\overset{O}{\underset{\|}{C}}-CR^4R^5(CH_2)_pQ$ and (2) $CH\equiv C-\overset{O}{\underset{\|}{C}}-CR^4R^5(CH_2)_pQ$ to produce a product having a formula selected from the group (3) 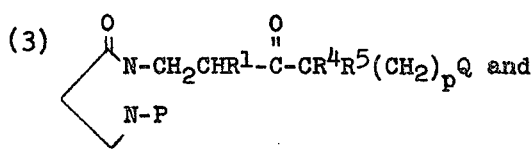 and (4) 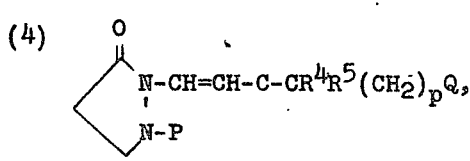

B. removing the blocking group P from the product of step (A) under mild conditions such as by hydrogenation or hydrolysis at 0°–50°C. to produce a product where the P group is replaced by H, C. contacting the product of step (B) with a substantially equimolar amount of an omegahalogenated carboxylate of the formula

XCH₂(A)ₘ(CH₂)ₙCO₂R wherein X is chlorine, bromine or iodine, in the presence of a base and solvent at 0°–150°C. to produce a compound having a formula selected from the group (5) 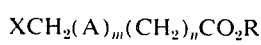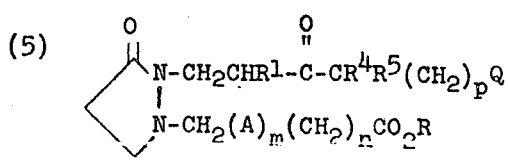

and (6) 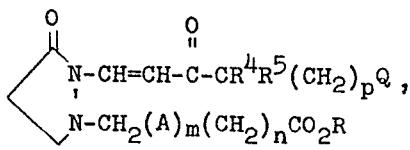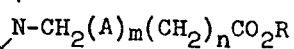

D. reducing the keto side chains of the product of step (C) to give an alcohol having a formula selected from the group (7) 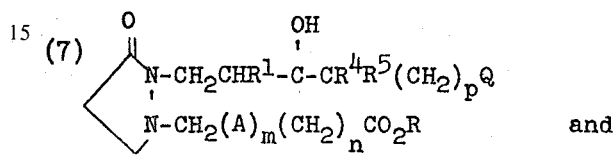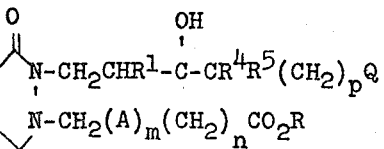 and (8) 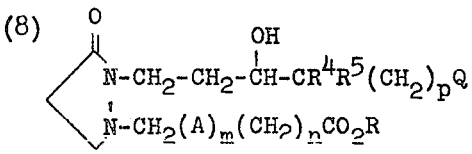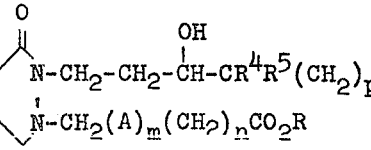

wherein the values for R, R¹, R⁴, R⁵, A, m, n, p and Q are as stated in claim 1.

72. The process of preparing a compound of claim 1 where Z=O, Y=H₂, R³=H and R² is other than hydrogen which comprises contacting a compound of the formula

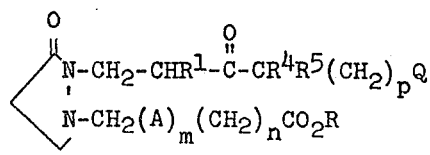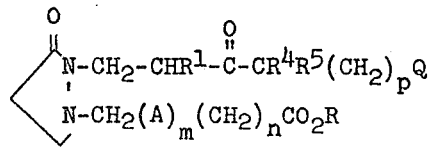

with a metal hydrocarbyl compound selected from the group consisting of Grignard reagent R²MgX and lithium alkyl R²Li to give the alcohol

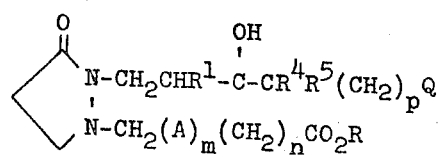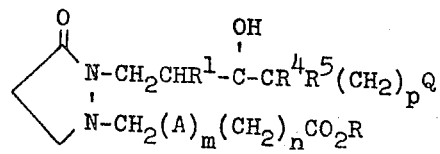

wherein the values for R, R¹ mono R², R⁴, R⁵, A, m, n, p and Q are as stated in claim 1.

73. The process of preparing a compound of claim 1 where Z=O, Y=H₂ and R³ is other than hydrogen which comprises contacting a compound having a formula selected from the group consisting of

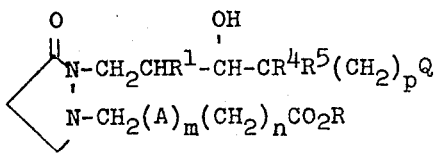

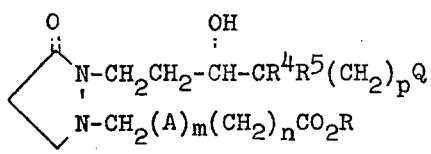 and

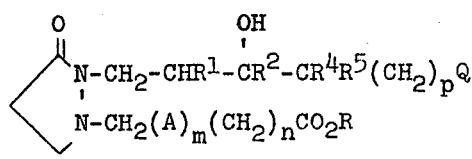

and with an acylating compound selected from the group consisting of $R^3X$ and $(R^3)_2O$ in which X is chlorine, bromine or iodine, and recovering a compound in which the OH group has been converted to $-OR^3$, the values of R, $R^1$, $R^2$, $R^3$, $R^4$, $R^5$, A m, n, p and Q being as stated in claim 1.

74. The process of preparing a compound of claim 1 wherein $Y=Z=H_2$ which comprises A. treating pyrazole at 20°–150°C. with an equimolar amount of an unsaturated ketone having the formula

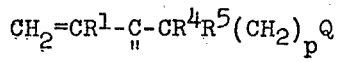

to produce a mono N-alkylated pyrazole,

B. reducing the keto group of the mono N-alkylated pyrazole,

C. heating the said N-alkylated pyrazole with a compound of the formula

wherein X is chlorine, bromine or iodine to give a pyrazolium salt,

D. reducing the pyrazolium salt of (C) to give the N,N'-disubstituted pyrazolidine, and E. optionally acylating the hydroxyl group of the pyrazolidine from (D) with an acrylating compound selected from the group consisting of $R^3X$ and $(R^3)_2O$ in which X is as stated above and recovering a product of claim 1, the values for R, $R^1$, $R^3$, $R^4$, $R^5$, A, m, n, p and q being same as in claim 1.

* * * * *

UNITED STATES PATENT OFFICE
CERTIFICATE OF CORRECTION

PATENT NO. : 3,873,566
DATED : March 25, 1975
INVENTOR(S) : Richard M. Scribner

It is certified that error appears in the above-identified patent and that said Letters Patent are hereby corrected as shown below:

Column 26 line 54 "p=3,ethyl" should be --p=3.--

Column 41 line 10 "or" should be --of--

Column 47 line 52 "$R^2$=C=CH" should be --$R^2$=C≡CH--

Column 121 line 16 "p=3" should be --p=5--

Column 121 line 22 "$R^2$=C CH" should be --$R^2$=C≡H--

Column 121 line 47 "$R^2$==3" should be --$R^2$=$R^3$--

Column 122 line 17 "sodidum" should be --sodium--

Column 122 line 55 "$R^5$ is F," should be --$R^5$ is H, F--

Column 122 line 62 "of A. formula" should be --of the formula--

Column 126 line 61 "R' mono" should be --R'--

Column 128 line 26 "q" should be --Q--

Signed and Sealed this thirtieth Day of September 1975

[SEAL]

Attest:

RUTH C. MASON
Attesting Officer

C. MARSHALL DANN
Commissioner of Patents and Trademarks